(12) United States Patent
Frederiksen et al.

(10) Patent No.: US 6,520,286 B1
(45) Date of Patent: *Feb. 18, 2003

(54) SILENCER AND A METHOD OF OPERATING A VEHICLE

(75) Inventors: Svend Frederiksen, Copenhagen (DK); Eyvind Frederiksen, Soborg (DK); Lars Frederiksen, Gentofte (DK); Spencer C. Sorenson, Lyngby (DK)

(73) Assignee: Silentor Holding A/S, Hedehusene (DK)

( * ) Notice: Subject to any disclaimer, the term of this patent is extended or adjusted under 35 U.S.C. 154(b) by 0 days.

This patent is subject to a terminal disclaimer.

(21) Appl. No.: 09/675,010

(22) Filed: Sep. 29, 2000

Related U.S. Application Data

(63) Continuation of application No. PCT/DK99/00192, filed on Mar. 30, 1999, and a continuation-in-part of application No. 09/147,883, filed on Jun. 24, 1999, now Pat. No. 6,332,510, which is a continuation of application No. PCT/DK97/00417, filed on Sep. 30, 1997.

(30) Foreign Application Priority Data

| Sep. 30, 1996 | (DK) | ............................................ | 1996 1070 |
| Jul. 4, 1997 | (DK) | ............................................ | 1997 0816 |
| Mar. 30, 1998 | (DK) | ............................................ | 1998 0443 |

(51) Int. Cl.$^7$ ................................................. F01N 1/24
(52) U.S. Cl. ........................................ 181/256; 181/272
(58) Field of Search .......................... 181/252, 255, 181/256, 258, 269, 272, 282

(56) References Cited

U.S. PATENT DOCUMENTS

| 1,015,698 A | 1/1912 | Maxim |
| 1,289,856 A | 12/1918 | Maxim |
| 1,510,791 A | 10/1924 | Martel |

(List continued on next page.)

FOREIGN PATENT DOCUMENTS

| CH | 313447 | 5/1956 |
| CH | 313645 | 6/1956 |
| DE | 189988 | 10/1907 |

(List continued on next page.)

OTHER PUBLICATIONS

"Der er forskel pa lyddaempere og lydpotter . . . ", Silentor Novum A/S, Nov. 1993.

"Noise and Vibration Control", Leo L. Beranek, MIT, pp. 393–394, undated.

"Report 1192: Theoretical & Experimental Investigation Of Mufflers With Comments On Engine–Exhaust Muffler Design", Don D. Davis, Jr., et al., Langley Aeronautical Laboratory, pp. 1–13 and pp. 28–31, with Appendix A (1950's).

(List continued on next page.)

Primary Examiner—Khanh Dang
(74) Attorney, Agent, or Firm—Birch, Stewart, Kolasch & Birch, LLP

(57) ABSTRACT

A device for silencing a flow includes at least one acoustic chamber through-flowed by gas, e.g., exhaust gas, at least one inlet pipe and at least one pipe or passage interconnecting two chambers or a chamber and an exterior environment or chamber and is designed with such cross-sectional area transitions, between passages and the chambers that the sound attenuation achieved by the device is high while the pressure drop across the silencer is low and that high attenuation at low characteristic frequencies of flow systems are obtained. The device may contain at least one of diffusers, monolithic bodies and catalysts. The passages may be curved or helical so as to allow for a low natural frequency. Embodiments with resonance chambers attenuating at selected frequencies are disclosed. A method for operating a vehicle including a combustion engine and a silencing system is disclosed. The engine may be a spark ignited combustion engine or a gas turbine engine, and the method may include controlling at least one of fuel injection, excess air ration and spark timing, or adjusting vane guides in a turbine or a turbo charger.

285 Claims, 20 Drawing Sheets

U.S. PATENT DOCUMENTS

| | | |
|---|---|---|
| 1,874,326 A | 8/1932 | Faure |
| 2,017,748 A | 10/1935 | Bourne |
| 2,075,316 A | 3/1937 | Tyden |
| 2,841,235 A | 7/1958 | Curioni |
| 3,018,841 A | 1/1962 | Gerlich et al. |
| 3,563,340 A | 2/1971 | Duthion et al. |
| 3,642,095 A | 2/1972 | Fujii |
| 3,692,142 A | 9/1972 | Stemp |
| 3,852,042 A | 12/1974 | Wagner |
| 3,897,853 A | 8/1975 | Frederiksen |
| 3,899,303 A | 8/1975 | Gaysert |
| 4,046,219 A | 9/1977 | Shaikh |
| 4,064,962 A | 12/1977 | Hunt |
| 4,094,645 A | 6/1978 | Bailey |
| 4,105,089 A | 8/1978 | Judd |
| 4,126,205 A | 11/1978 | Bauerschmidt |
| 4,203,503 A | 5/1980 | Franco et al. |
| 4,209,493 A | 6/1980 | Olson |
| 4,317,502 A | 3/1982 | Harris et al. |
| 4,392,549 A | 7/1983 | Wrobel et al. |
| 4,485,890 A | 12/1984 | Harris et al. |
| 4,579,195 A | 4/1986 | Nieri |
| 4,601,168 A | 7/1986 | Harris |
| 4,601,363 A | 7/1986 | Harris et al. |
| 4,605,092 A | 8/1986 | Harris et al. |
| 4,635,753 A | 1/1987 | Itani |
| 4,715,179 A | 12/1987 | Muller et al. |
| 4,848,513 A | 7/1989 | Csaszar |
| 5,016,438 A | 5/1991 | Harris |
| 5,043,147 A | 8/1991 | Knight |
| 5,150,573 A | 9/1992 | Maus et al. |
| 5,184,464 A | 2/1993 | Harris |
| 5,220,789 A | 6/1993 | Riley |
| 5,355,973 A | 10/1994 | Wagner et al. |
| 5,403,557 A | 4/1995 | Harris |
| 5,408,828 A | 4/1995 | Kreucher et al. |
| 5,426,269 A | 6/1995 | Wagner et al. |
| 5,484,575 A | 1/1996 | Steenackers |
| 5,578,277 A | 11/1996 | White et al. |
| 5,902,970 A | 5/1999 | Ferri |
| 5,936,210 A | 8/1999 | Borneby et al. |

FOREIGN PATENT DOCUMENTS

| | | |
|---|---|---|
| DE | 463156 | 7/1928 |
| DE | 467515 | 10/1928 |
| DE | 469259 | 12/1928 |
| DE | 557140 | 8/1932 |
| DE | 570630 | 2/1933 |
| DE | 614930 | 2/1936 |
| DE | 634222 | 8/1936 |
| DE | 736635 | 6/1943 |
| DE | 2715053 | 10/1978 |
| DE | 2612421 | 3/1979 |
| DE | 4130113 | 3/1992 |
| DE | 3039742 | 5/1992 |
| DE | 3641942 | 10/1992 |
| DE | 9314441 | 2/1994 |
| DE | 2307215 | 6/1999 |
| DE | 2428964 | 6/1999 |
| DE | 2429002 | 6/1999 |
| DK | 128427 | 9/1974 |
| DK | 169823 | 3/1995 |
| EP | 0131350 | 1/1985 |
| EP | 0158625 | 10/1985 |
| EP | 0184060 | 6/1986 |
| EP | 0410924 | 1/1991 |
| EP | 0475398 | 3/1992 |
| EP | 0556846 | 8/1993 |
| EP | 0643799 | 3/1995 |
| EP | 0683849 | 11/1995 |
| EP | 0744536 | 11/1996 |
| EP | 0728832 | 1/1997 |
| FR | 728003 | 6/1932 |
| FR | 2221618 | 10/1974 |
| GB | 426769 | 5/1935 |
| GB | 495576 | 12/1938 |
| GB | 829012 | 2/1960 |
| JP | 07301134 | 11/1995 |
| JP | 08061203 | 3/1996 |
| NO | 169581 | 7/1992 |
| WO | 9321428 | 10/1993 |
| WO | 24744 | 12/1993 |
| WO | 9410430 | 5/1994 |
| WO | 9418438 | 8/1994 |
| WO | 9632572 | 10/1996 |

OTHER PUBLICATIONS

"XP–002056193: Program For The Computation Of Absorptive Silencers In Straight Duets", Frommhold, et al., pp. 19–38, 1994.

"XP–002055498: Acoustical Filters And Mufflers", David, Jr., National Advisory Committee for Aeronautics, undated.

"Volvo Original Buskatalysator: A Simple Solution For A Better Town Environment" 19092US1.MO1/MH/BV/1998.

"Reflection–Type Silencers For Internal Combustion Engine" Prof. Dr. Frederiksen, vol. 6, pp. 17–25, undated.

"XP–002055497: Prime Movers" pp. 251, 252, 254, and 256, undated.

"NY Volvo–Katalysator Til Busser Miljotilpasser Den Killektive Trafik", p. 19, Imagasian, Jan. 10, 1995.

"Rene Busser Er Til Gavin For Bade Dig Og Miljoet!", Volvo Truck Parts Corporation, Sweden, undated.

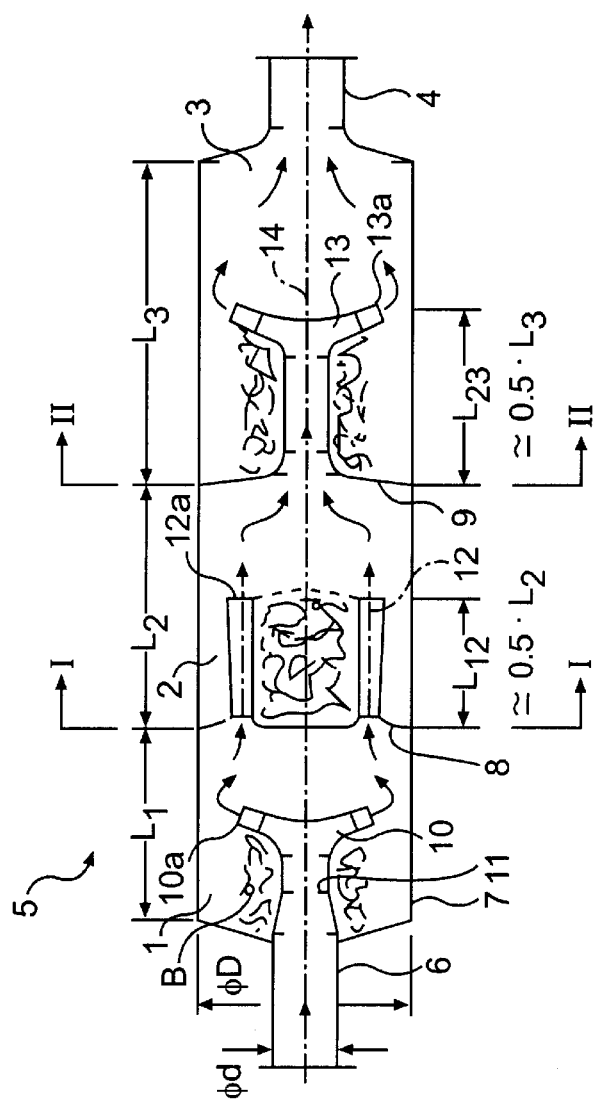
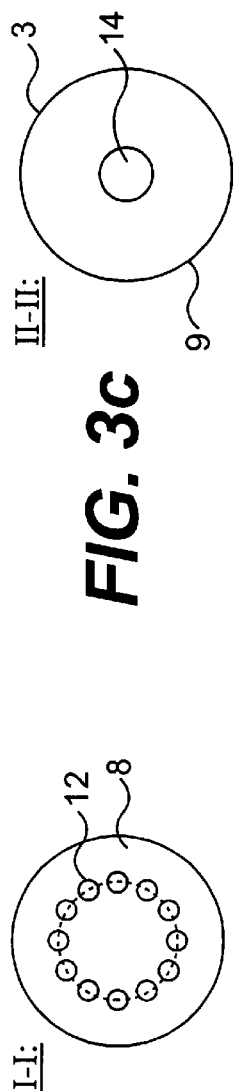
*FIG. 3a*
*FIG. 3b*
*FIG. 3c*

A-A:

B-B:

VARIATION OF BACK PRESSURE AT FULL POWER

| COOLANT TEMP. °C | OIL TEMP. °C | OIL PRESSURE BAR | CHARGE PRESSURE BAR | BACK PRESSURE MBAR | EXHAUST TEMP. °C | INTAKE TEMP. °C | TORQUE UNCORR. N | POWER kW | POWER LOSS kW | RPM | FUEL FLOW g/sek | FUEL CONSUMP. g/kWh | BOSCH SMOKE NO. |
|---|---|---|---|---|---|---|---|---|---|---|---|---|---|
| 80,7 | 95,6 | 4,2 | 1,3 | 12 | 427 | 22,0 | 731,7 | 146,5 | 0,0 | 2002 | 9,04 | 222,1 | 0,5 |
| 80,6 | 98,0 | 4,2 | 1,2 | 46 | 440 | 23,2 | 726,6 | 145,5 | 1,0 | 2002 | 9,12 | 225,8 | 0,6 |
| 80,9 | 98,0 | 4,2 | 1,1 | 98 | 454 | 24,0 | 720,0 | 144,0 | 2,5 | 2000 | 9,09 | 227,2 | 0,9 |
| 80,0 | 97,9 | 4,2 | 1,1 | 150 | 462 | 24,5 | 717,1 | 143,7 | 2,8 | 2004 | 9,10 | 228,0 | 1,1 |
| 81,0 | 98,0 | 4,2 | 1,0 | 202 | 474 | 24,6 | 710,0 | 142,0 | 4,4 | 2000 | 9,07 | 229,9 | 1,4 |
| 80,0 | 95,8 | 4,3 | 1,0 | 15 | 432 | 21,6 | 759,5 | 129,2 | 0,0 | 1701 | 7,71 | 214,7 | 0,6 |
| 80,0 | 94,8 | 4,3 | 0,9 | 44 | 441 | 21,0 | 755,1 | 128,1 | 1,1 | 1697 | 7,74 | 217,4 | 0,9 |
| 80,0 | 94,5 | 4,3 | 0,9 | 99 | 461 | 21,5 | 748,5 | 127,1 | 2,1 | 1698 | 7,75 | 219,5 | 1,2 |
| 80,0 | 94,5 | 4,3 | 0,8 | 149 | 474 | 21,8 | 739,5 | 125,6 | 3,6 | 1698 | 7,82 | 224,3 | 1,7 |
| 80,0 | 94,0 | 4,3 | 0,7 | 202 | 486 | 21,9 | 729,1 | 123,7 | 5,5 | 1697 | 7,77 | 226,1 | 1,9 |
| 80,0 | 87,4 | 4,1 | 0,6 | 15 | 452 | 20,1 | 787,0 | 94,3 | 0,0 | 1198 | 5,70 | 217,5 | 1,9 |
| 80,0 | 89,0 | 4,0 | 0,5 | 46 | 462 | 20,3 | 778,3 | 93,3 | 1,1 | 1200 | 5,60 | 216,0 | 2,3 |
| 80,0 | 89,4 | 4,0 | 0,5 | 99 | 470 | 20,5 | 768,3 | 92,0 | 2,3 | 1198 | 5,66 | 221,6 | 2,9 |
| 80,0 | 89,7 | 4,0 | 0,5 | 148 | 478 | 20,7 | 759,0 | 90,9 | 3,4 | 1197 | 5,70 | 225,7 | 3,3 |
| 80,0 | 89,3 | 4,0 | 0,4 | 167 | 483 | 20,8 | 754,9 | 90,3 | 4,0 | 1197 | 5,64 | 224,7 | 3,4 |
| 80,0 | 85,0 | 3,4 | 0,4 | 13 | 447 | 20,3 | 776,0 | 77,4 | 0,0 | 998 | 4,74 | 220,3 | 2,8 |
| 79,7 | 84,5 | 3,4 | 0,4 | 42 | 447 | 20,3 | 770,8 | 76,6 | 0,8 | 993 | 4,79 | 225,0 | 3,2 |
| 80,0 | 84,8 | 3,4 | 0,4 | 97 | 450 | 20,5 | 763,7 | 75,7 | 1,7 | 991 | 4,84 | 230,2 | 3,6 |
| 80,0 | 84,3 | 3,4 | 0,3 | 111 | 452 | 20,5 | 760,6 | 75,3 | 2,1 | 990 | 4,78 | 228,5 | 3,7 |
| 80,0 | 83,1 | 3,1 | 0,3 | 29 | 448 | 20,1 | 746,5 | 65,1 | 0,0 | 873 | 4,21 | 232,6 | 3,5 |
| 80,0 | 82,4 | 3,1 | 0,3 | 47 | 445 | 19,9 | 740,6 | 64,4 | 0,7 | 870 | 4,26 | 238,1 | 4,3 |
| 80,0 | 82,0 | 3,1 | 0,2 | 82 | 453 | 19,8 | 731,1 | 63,6 | 1,5 | 870 | 4,25 | 240,3 | 4,6 |
| 80,0 | 81,5 | 3,1 | 0,3 | 11 | 412 | 19,7 | 729,6 | 58,2 | 0,0 | 797 | 3,56 | 220,6 | 2,9 |
| 80,0 | 81,0 | 3,1 | 0,3 | 42 | 419 | 19,3 | 716,2 | 57,2 | 1,0 | 798 | 3,71 | 233,4 | 3,5 |
| 80,0 | 80,0 | 3,1 | 0,2 | 79 | 430 | 19,8 | 705,1 | 56,3 | 1,8 | 799 | 3,75 | 239,4 | 4,0 |

FIG. 13

VARIATION OF BACK PRESSURE AT FULL LOAD WITH CONSTANT FUEL/AIR RATIO

| COOLANT TEMP. °C | OIL TEMP. °C | OIL PRESSURE BAR | CHARGE PRESSURE BAR | BACK PRESSURE MBAR | EXHAUST TEMP. °C | INTAKE TEMP. °C | TORQUE UNCORR. N | POWER kW | POWER LOSS kW | RPM | FUEL FLOW g/sek | FUEL CONSUMP. g/kWh | BOSCH SMOKE NO. |
|---|---|---|---|---|---|---|---|---|---|---|---|---|---|
| 80,0 | 98,0 | 4,2 | 1,3 | 7 | 381 | 20,8 | 732,3 | 146,6 | 0,0 | 2002 | 9,15 | 224,6 | 0,4 |
| 80,9 | 98,5 | 4,2 | 1,1 | 95 | 395 | 20,7 | 690,6 | 138,1 | 8,5 | 2000 | 8,73 | 227,4 | 0,7 |
| 80,0 | 97,3 | 4,3 | 0,8 | 188 | 404 | 20,9 | 604,0 | 120,7 | 25,9 | 1998 | 7,90 | 235,5 | 1,0 |
| 80,0 | 96,7 | 4,3 | 1,0 | 11 | 389 | 20,6 | 759,0 | 129,3 | 0,0 | 1703 | 7,76 | 216,1 | 0,5 |
| 80,0 | 95,0 | 4,3 | 0,8 | 91 | 398 | 21,2 | 681,9 | 116,0 | 13,3 | 1702 | 7,15 | 221,9 | 1,1 |
| 80,0 | 94,9 | 4,4 | 0,5 | 194 | 408 | 20,9 | 607,0 | 103,2 | 26,1 | 1700 | 6,57 | 229,2 | 1,5 |
| 80,0 | 88,3 | 4,0 | 0,5 | 12 | 420 | 18,1 | 781,1 | 93,6 | 0,0 | 1199 | 5,73 | 220,1 | 1,9 |
| 80,0 | 88,0 | 4,1 | 0,4 | 98 | 421 | 18,3 | 737,5 | 88,0 | 5,7 | 1193 | 5,32 | 217,8 | 2,7 |
| 80,0 | 88,0 | 4,1 | 0,4 | 152 | 421 | 18,8 | 706,5 | 84,3 | 9,3 | 1193 | 5,32 | 227,1 | 2,6 |
| 80,0 | 84,8 | 3,4 | 0,4 | 11 | 409 | 18,7 | 783,6 | 78,1 | 0,0 | 997 | 4,83 | 222,4 | 2,6 |
| 80,0 | 84,0 | 3,4 | 0,4 | 42 | 407 | 19,8 | 759,0 | 75,3 | 2,9 | 992 | 4,65 | 222,2 | 2,7 |
| 80,0 | 83,5 | 3,4 | 0,4 | 98 | 406 | 20,3 | 736,3 | 72,8 | 5,3 | 989 | 4,51 | 222,8 | 3,2 |
| 80,0 | 82,0 | 3,1 | 0,3 | 26 | 403 | 20,7 | 752,5 | 65,8 | 0,0 | 874 | 4,20 | 229,8 | 3,6 |
| 80,0 | 82,0 | 3,1 | 0,2 | 46 | 393 | 20,9 | 730,8 | 62,4 | 3,4 | 854 | 3,93 | 227,0 | 4,2 |
| 80,0 | 81,0 | 3,1 | 0,2 | 80 | 394 | 21,0 | 702,7 | 61,1 | 4,6 | 870 | 4,05 | 238,3 | 4,2 |
| 80,0 | 80,6 | 3,1 | 12 | 0,3 | 369 | 20,6 | 730,7 | 57,7 | 0,0 | 789 | 3,62 | 225,7 | 3,0 |
| 80,0 | 80,0 | 3,1 | 43 | 0,2 | 366 | 20,4 | 696,5 | 55,2 | 2,5 | 792 | 3,58 | 233,8 | 3,4 |
| 79,9 | 79,6 | 3,1 | 77 | 0,2 | 364 | 20,2 | 669,1 | 53,2 | 4,5 | 795 | 3,42 | 231,6 | 3,6 |

*FIG. 14*

VARIATION OF BACK PRESSURE AT PART LOAD

| COOLANT TEMP. °C | OIL TEMP. °C | OIL PRESSURE BAR | CHARGE PRESSURE BAR | BACK PRESSURE MBAR | EXHAUST TEMP. °C | INTAKE TEMP. °C | TORQUE UNCORR. N | POWER kW | POWER LOSS kW | FUEL FLOW g/sek | FUEL CONSUMP. g/kWh | BOSCH SMOKE NO |
|---|---|---|---|---|---|---|---|---|---|---|---|---|
| 79,0 | 84,7 | 4,8 | 0,2 | 6 | 223 | 21,5 | 230,6 | 39,2 | 1699 | 3,02 | 277,8 | 0,3 |
| 79,0 | 86,0 | 4,8 | 0,2 | 45 | 227 | 21,7 | 227,8 | 38,6 | 1696 | 3,00 | 279,5 | 0,4 |
| 79,0 | 87,0 | 4,8 | 0,2 | 100 | 234 | 20,4 | 228,1 | 38,6 | 1694 | 3,05 | 283,7 | 0,5 |
| 79,0 | 87,0 | 4,8 | 0,2 | 152 | 242 | 21,9 | 227,4 | 38,5 | 1692 | 3,02 | 282,2 | 0,7 |
| 78,0 | 80,1 | 4,6 | 0,1 | 11 | 200 | 20,6 | 235,6 | 28,2 | 1198 | 1,96 | 249,7 | 0,2 |
| 78,0 | 80,8 | 4,6 | 0,1 | 45 | 203 | 21,3 | 239,3 | 28,6 | 1197 | 2,03 | 255,4 | 0,3 |
| 78,0 | 81,0 | 4,6 | 0,1 | 84 | 208 | 21,4 | 238,1 | 28,5 | 1196 | 2,02 | 255,0 | 0,4 |
| 78,0 | 77,0 | 3,9 | 0,0 | 13 | 186 | 19,3 | 227,2 | 22,7 | 1000 | 1,60 | 253,8 | 0,2 |
| 78,0 | 77,0 | 3,9 | 0,0 | 57 | 187 | 19,2 | 227,5 | 22,7 | 999 | 1,61 | 255,6 | 0,3 |

FIG. 15

SILENCER AND A METHOD OF OPERATING A VEHICLE

This application is a Continuation of PCT International Application No. PCT/DK99/00192 filed on Mar. 30, 1999 and a Continuation-in-Part of U.S. Ser. No. 09/147,883 filed May 24, 1999, now U.S. Pat. No. 6,332,510 which is a Continuation of PCT. International Application No. PCT/DK97/00417 filed Sep. 30, 1997 both of which International Applications designated the United States and on which priority is under 35 U.S.C. §120, the entire contents of all of these applications are hereby incorporated by reference.

The present invention relates to devices for silencing a flow of gas such as exhaust gasses originating from a combustion device, a method for silencing such a flow, a vehicle comprising one or more such devices and a stationary power generating installation comprising one or more such devices. The invention also relates to a system comprising an engine and a silencer, as well as a method for operating such a system, in which method the combination of an efficient sound attenuation and a low back pressure is used to achieve hitherto unattainable advantages with respect to engine performance and economy.

While a number of silencer designs are known, most of these are not particularly beneficial with respect to flow dynamic properties. As a result of intensive studies of the flow dynamic behaviour and requirements of silencer systems, the invention provides both basic physical principles to be complied with by silencer designs in order to obtain hitherto unattainable combinations of effective noise damping, low back pressure (pressure drop across the silencer device) and small size—and specific novel mechanical design features, such as physical conformations of the passages or bodies involved in the flow path—which co-operate with a suitable overall design to provide superior combinations of performance results.

It is well known within the art to silence a flow of gas by directing the flow into an inlet passage to a container, through one or more chambers in said container intercommunicating by means of passages, through a diffuser associated with one of said passages and into an outlet passage from said container.

In the case of tailor-made solutions for one-off installations or very small production series, application of the traditional method has not been able to provide optimal solutions except in exceptional cases where the element of luck has been a factor. This is due to the fact that the economical and practical possibilities for carrying out experiments and consequent design and/or dimensioning modifications and changes are not at hand.

Furthermore, the large number of parameters and considerations having implications for the sound attenuation in a silencing device have in the past prevented those skilled in the art from designing and dimensioning such a device simply and reliably in such a manner that a desired sound attenuation with an acceptable loss of pressure through the device and acceptable overall dimension were consistently achieved.

One aspect of the present invention, to be discussed in greater detail in the following, relates to a device having a curved passage for interconnecting an acoustic chamber with another acoustic chamber or with an exterior volume. A number of devices having curved passages are known. Thus, U.S. Pat. No. 4,317,502, U.S. Pat. No. 4,635,753, DE 463 156, DE 467 515, DE 570 630, DE 614 930, U.S. Pat. No. 4,579,195, U.S. Pat. No. 3,692,142, DE 26 12 421, DE 27 15 053, U.S. Pat. No. 4,126,205, CH 313 645, U.S. Pat. No. 4,046,219, DE 736 635, SU 165 634, DE 557 140 and DE 469 259 disclose various types of devices having one or more curved passages.

It is characteristic of the devices according to the present invention that they are based on design principles which are aimed at obtaining desired sound attenuation characteristics and at the same time low or very low back pressures. The design principles involve observing certain general physical/mathematical principles in connection with the particular given parameters relating to at least space constraints and the design, the design including of one or more passages leading the flow into and/or out of one or more chambers of the device, as well as one or more diffusers diffusing at least a part of the gas flow through one or more of the passages. Important parameters in this regard are the number and extent of changes of geometric configuration and arrangement and the relative dimensions of one ore more chambers and the passage or passages connecting the chambers or connecting chambers with an exterior volume. as well as the number of changes of cross-sectional are of the gas flow and the values of the individual changes in cross-sectional area. Hereby, very interesting silencer designs have been obtained which combine small size with effective sound attenuation and low back pressure.

One aspect of the invention relates to a device for silencing a gas flow directed therethrough and being adapted for installation in a flow system, said device comprising:

a casing,
at least one acoustic chamber and contained in the casing, said chamber being through-flowed by gas,
at least one inlet pipe for leading gas into one of said at least one acoustic chamber,
at least one passage of a length L and of a representative cross-sectional area a for leading gas from each one of the at least one acoustic chamber to another of the at least one acoustic chamber or to an exterior environment or an exterior chamber,
optionally one or more monolithic bodies comprised in each of one or more of said at least one acoustic chamber, said device showing at least two through-flowed transitions of cross-sectional area for the flow of the gas between a relatively lower cross-sectional area $a_i$ and a relatively higher cross-sectional area $A_i$,
the device fulfilling the following criteria:
(i) the average sound attenuation $\overline{\Delta dB}$ conferred by each transition of cross-sectional area, approximated by the following expression:

$$\overline{\Delta dB} = \frac{1}{n} k \sum_{i=1}^{n} \log_{10} \frac{A_i}{a_i}, \qquad (1)$$

n being the total number of transitions of cross-sectional area of the device, $A_i$ being the relatively higher cross-sectional area at the i'th transition of cross-sectional area of the gas flow, $a_i$ being the relatively lower cross-sectional area at the i'th change of cross-sectional area of the gas flow, k being a constant of the value 6.25 dB,
is at least
8.0 dB when the device comprises no more than two acoustic chambers,
6.0 dB when the device comprises three acoustic chambers,
5.0 dB when the device comprises 4 or more acoustic chambers, (ii) the pressure loss across each acoustic chamber expressed as the dimensionless parameter $\zeta_j'$, defined as the ratio between the static pressure loss over the chamber and the dynamic pressure at a location in said passage:

$$\zeta_j' = \frac{\Delta p_j}{\frac{1}{2}\rho u^2}, \quad (2)$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is at the most 1.0.

Another aspect of the invention is the above-mentioned aspect comprising a curved passage connecting two acoustic chambers or connecting an acoustic chamber with an exterior environment. This aspect can be defined as a device for silencing a gas flow directed therethrough and being adapted for installation in a flow system, said device comprising:

a casing, at least one acoustic chamber contained in the casing, said chamber being through-flowed by gas, at least one inlet pipe for leading gas into one of said at least one acoustic chamber, at least one passage of a length L and of a representative cross-sectional area a for leading gas from each one of the at least one acoustic chamber to another of the at least one acoustic chamber or to an exterior environment or an exterior chamber, optionally one or more monolithic bodies comprised in each of one or more of said at least one acoustic chamber, said device showing at least two transitions of cross-sectional area for the flow of the gas between a relatively lower cross-sectional area $a_i$ and a relatively higher cross-sectional area $A_j$, at least one passage selected from said at least one passage being curved, wherein the following applies to at least one selected chamber selected from said at least one acoustic chamber:

the mean cross-sectional area $A_j$ of each of said selected chamber is at least four times the largest of:
the sum of all cross-sectional areas of passages leading gas to the selected chamber, $a_1$, and
the sum of all cross-sectional areas of passages leading gas from the selected chamber, $a_2$, the mean cross-sectional area, $A_j$, being defined as the mean value of all cross-sectional areas along a mean trajectory for sound waves travelling from across the selected chamber, the volume of the at least one selected chamber, $V_j$, is at least $8(\sqrt{(a_1+a_2)/2})^3$, $a_1$ and $a_2$ being defined as stated above, the cross-sectional area, $A_j$, and the volume, $V_j$, including any elements belonging to sound absorptive material inside the selected chamber and any other parts which are in acoustic communication with the selected chamber, said at least one passage being curved having an acoustically effective length L which is at least 1.50 times the direct and straight distance in space between passage inlet and passage outlet, such as at least 1.75 times, such as at least 2 times or more, such as at least 3 times, at least 4 times, at least 5 times or at least 6 times, the direct and straight distance in space between passage inlet and passage outlet.

As will be discussed in greater detail in the following, at least part of the at least one curved passage will preferably extend over an angle of more than 180 degrees. Whenever extension of the curved passage over an angle is discussed herein, it is to be understood as the total angular turn of the curved passage, i.e. the sum of absolute turn angles which the curved passage defines. The curved passage is preferably closer to the envelope part of the silencer or of a chamber than to the center part of the silencer or the chamber, i.e., the straight-line perpendicular distance from the center line of the curved passage to the center axis of the silencer is preferably longer than the straight-line distance from the center line of the curved passage to the envelope.

The at least one passage being curved will often have an acoustically effective length L which is at least 2 times the direct and straight distance in space between passage inlet and passage outlet.

At least part of the at least one curved passage may extend over an angle of more than 180 degrees and closer to the envelope part of the silencer or of a chamber than to the center part of the silencer or the chamber, and in many embodiments adjacent to the envelope part of the silencer or of a chamber.

When the at least one curved passage connects a chamber with the exterior environment, it preferably occupies a volume which is smaller than the volume of said chamber, and when the at least one curved passage connects two chambers, it preferably occupies a volume which is smaller than the volume of the smaller of the two chambers.

In all practical embodiments of this devise envisaged so far, substantially all cross-sections of said at least one curved passage are of such a shape that the cross-section in no direction extends over the full extension of the silencer in the particular direction, and substantially no cross-section of the at least one curved passage is of such a shape that the ratio between the smallest cross-section dimension and the largest cross-section dimension is very small. Thus, substantially no cross-section of the at least one curved passage is of such a shape that the ratio between the smallest cross-section dimension and the largest cross-section dimension is 1/50 or less. The ratio between the smallest cross-section dimension of the at least one curved passage and the largest cross-section dimension of the passage is at least 0.1.

Another aspect of the invention relates to a device for silencing a gas flow directed therethrough and being adapted for installation in a flow system, said device comprising:

a casing, at least two acoustic chambers contained in the casing, said chambers being through-flowed by gas, at least one inlet pipe for leading gas into one of said at least two acoustic chambers, at least one passage of a length L and of a representative cross-sectional area a for leading gas from each one of the at least two acoustic chambers to another of the at least two acoustic chambers or to an exterior environment or an exterior chamber, optionally one or more monolithic bodies comprised in each of one or more of said at least two acoustic chambers, said device showing at least two through-flowed transitions of cross-sectional area for the flow of the gas between a relatively lower cross-sectional area $a_i$ and a relatively higher cross-sectional area $A_j$, said inlet pipe being continued by a flow deflecting element causing the gas to flow with a radial component and for causing pressure recovery to the flow upstream of a first one of said at least two acoustic chambers, wherein said passage comprises at least one diffuser for leading the gas flow into a second one of said at least two acoustic chambers, the diffuser of said passage being of a different type than a radial diffuser,
wherein the average sound attenuation $\overline{\Delta dB}$ conferred by each transition of cross-sectional area, approximated by the following expression:

$$\overline{\Delta dB} = \frac{1}{n} k \sum_{i=1}^{n} \log_{10} \frac{A_i}{a_i}, \quad (1)$$

n being the total number of transitions of cross-sectional area of the device, $A_i$ being the relatively higher cross-sectional area at the i'th transition of cross-sectional area of the gas flow, $a_i$ being the relatively lower cross-sectional area at the i'th change of cross-sectional area of the gas flow, k being a constant of the value 6.25 dB,
at least
  6.0 dB when the device comprises no more than two acoustic chambers,
  5.0 dB when the device comprises three acoustic chambers,
  4.0 dB when the device comprises 4 or more acoustic chambers.

A device of the above-mentioned type is particularly advantageous with respect to low-frequent sound attenuation as the pressure drop across the device is low in comparison to prior art devices, Preferably, the local natural frequency, $f_e$, of at least one system comprising the gas of two consecutive acoustic chambers $AC_j$ and $AC_{j+1}$ and the gas of the passage interconnecting said two acoustic chambers, approximated by the following expression:

$$f_e = \frac{c}{2\pi} \sqrt{\frac{a}{L}\left(\frac{1}{V_j} + \frac{1}{V_{j+1}}\right)}, \quad (3)$$

$V_j$ and $V_{j+1}$ being the volumes of the chambers $AC_j$ and $AC_{j+1}$ respectively (the volume $V_{j+1}$ being set to infinite when the chamber $AC_j$ is connected to an exterior environment or an exterior chamber in a downstream direction), a being a representative cross-sectional area of the passage interconnecting the two consecutive acoustic chambers, L being the length of the passage, and c being the local sound velocity,
is at the most 0.75 times a characteristic frequency of the flow system. For many applications of the device, it is preferred that the local natural frequency, $f_e$, is at the most 0.5 times the characteristic frequency of the flow system, such as 0.4 times or 0.3 times or even 0.25 times, such as 0,2 times, 0.15 or 0.1 or even lower. However, also an interval between 0.75 and 0.95 may be interesting.

Preferably the value $\zeta_j'$ of each acoustic chamber is at the most 1.0. The value of $\zeta_j'$ of at least one acoustic chamber is preferably at the most 0.75, or even lower such as 0.5, 0.25, 0.2 or even lower. Special designs of the device allow for a value less than or equal to 0, as will be discussed below.

A device according to the invention may comprise one or more radial diffusers and/or one or more axial diffusers and/or one or more circular conical diffusers and/or one or more annular diffusers and/or a plurality of conical diffusers arranged on a substantially cylindrical surface and/or one or more diffusers for reversing the direction of flow and/or one or more double diversion diffusers, at least some of the above-mentioned diffuser types being known per se. Any other diffuser types known per se may be applied.

Each of the at least one acoustic chamber may be substantially cylindrical, and one or more outlets from said at least one diffuser may be located substantially at the axial centre of the chamber associated with said diffuser. When the chamber is substantially cylindrical it defines a cylinder axis. Preferably, one or more outlets from said at least one diffuser are located at a distance from the cylinder axis of approximately two thirds of the radius of the acoustic chamber, so as to obtain fixation of pressure nodes. This principle, known per se, is described in detail in European patent 0 683 849.

It should be understood that the above performance criteria may be fulfilled by all chambers and all passages of the device by a device according to the invention.

The sound level of self-generated noise of each one of said at least one acoustic chamber at maximum gas flow rate is preferably less than 5 dB(A) higher than the self-generated noise of a circular cylindrical reference chamber through-flowed at said gas flow rate, the cross-sectional area of the inlet passage leading gas into said acoustic chamber being $a_1$, the cross-sectional area of the passage leading gas from said acoustic chamber being $a_2$, said reference chamber:
  being of the same volume as each of said at least one acoustic chamber,
  having a length equal to its diameter,
  having flat end caps,
  being provided with centrally positioned holes in its flat end caps,
  having a first end cap which is connected to a cylindrical inlet pipe of a cross-sectional area which is approximately equal to $a_1$, the terminating surface of said cylindrical inlet pipe being aligned with said first end cap,
  having a second end cap which is connected to a cylindrical outlet pipe of a cross-sectional area which is approximately equal to $a_2$, said cylindrical outlet pipe having a rounded inner edge at its interconnection with said second end cap and being aligned with said second end cap.

The sound level of self-generated noise of each one of said at least one acoustic chamber at maximum gas flow rate may be less than 4 dB(A) higher than the self-generated noise of the reference chamber, or even less than 3 dB(A), such as 2 dB(A) or 1 dB(A). A sound level of self-generated noise which is less than the self-generated noise of the reference chamber may even be achieved with a device according to the invention.

In a device according to the invention, the distance between an inlet to a chamber and the inlet to a passage is preferably so large that substantially no unstable flow occurs in the chamber.

According to the invention, the generatrix of at least part of at least one curved passage selected from said at least one passage may be wound in a peripheral direction, at least part of the curved passage having a plane spiral form. The generatrix of at least a part of at least one curved passage selected from said at least one passage may be wound in a peripheral direction, said part of said curved passage extending in a longitudinal direction, so as to form a screw-like helical form. Thereby, all three dimensions of space are utilized in order to achieve a relatively long passage or relatively long passages.

By winding the connecting passage, i.e. by utilizing the third spatial dimension, the length of the passage may be significantly increased, the natural frequency of the silencing device thus being decreased, cf. equation (3). The flow of the passage may constitute a flow cross sectional area increase in the flow direction. Thus, a diffusing effect may be obtained for static pressure recovery. The cross sectional area increase may be two- or three-dimensional. The passage may have any cross sectional shape, such as rectangular, circular, ellipsoidal or any other shape.

The curved part of the passage may extend over an angle between 0° and 90°, or over an angle between 90° and 180°, or over an angle between 180° and 270°, or over an angle between 270° and 360°, or over an angle between 360° and 720°, or over an angle of 720° or more.

The device according to the invention may comprise at least two acoustic chambers, wherein the curved passage interconnects two chambers, a first of which surrounds a second one, the second chamber thus being 'embedded' in the first one.

The generatrix of the curved part of the passage may extend along a surface of revolution, so as to define itself a surface of revolution. The surface of revolution may have any shape, e.g., conical.

At least one monolithic body or a monolith such as a catalyst or a particle filter, may be positioned upstream or downstream of an inlet passage and/or an outlet passage of the one or more chambers, in some embodiments the monolithic body may be positioned substantially immediately upstream or substantially immediately downstream of said inlet passage and/or said outlet passage of the one or more chambers. The monolithic body may be of an annular form.

In the present context, the term "monolithic body" or "monolith" designates, as is customary in the art, a body of an overall or macroscopic monolithic appearance, often a cylindrical body, which has a structure allowing an overall axial gas flow through the body. The term "monolithic" does not rule out that the body could be made from a plurality of segments joined or arranged together. The structure allowing an overall axial gas flow through the body will depend on the construction and material of the monolith; two typical relevant monolith types are:

a monolith made from a corrugated foil wound up cylindrically so that the corrugations provide axial gas flow channels, and a monolith made of a particulate ceramic material, e.g., silicon carbide particles sintered together, and having a honeycomb structure comprising axial channels constituted by a plurality of coextending throughgoing passages separated by common passage walls, the passages being closed at the inlet and the outlet end, alternately. Thus, in a filter body of this kind, the gas travels into the passages open at the inlet side, through the walls into the passages open at the outlet side and then out of the filter body.

Monoliths are sometimes inserted into silencers so as to combine silencing with gas purification, either in catalytic processes, in mechanical filtering, or in both. In most cases such monoliths are placed within one or more chambers of the silencer. Monoliths can provide significant silencing at medium and high frequencies, but less silencing at low frequencies. Obviously, monoliths cause added pressure drop to the piping system.

In case the purification relies solely on catalysis, the monolith is usually made as a honeycomb structure with straight channels, termed a through-flow monolith. The walls are thin, so that the open frontal area is typically 70–90%, depending mainly on the material (ceramic, metal, etc.).

Alternatively, a monolith may be made as a wall-flow monolith, i.e. the channels are perforated and partly blocked, so that the gas flow is forced to pass through those perforations, describing a tortuous pathway through the monolith. Such a monolith is used either for pure filtering or for combined filtering and catalytic treatment of the gas. Sometimes the open frontal area becomes less than 70%. Wall-flow monoliths cause pressure drops which are substantially higher than pressure drops of through-flow monoliths.

The silencing effects of monoliths can roughly be described as follows:

1. The flow within the thin channels causes high viscous friction which dampens mainly medium and high frequencies.
2. The porosities of the channels provide an aggregate acoustic volume which adds to the volume of the chamber in which the monolith is placed.
3. At the entrance and at the exit of the monolith there is an effective change in cross-sectional area which causes sound reflection, in the same way as occurs at flow entrances and flow exits connecting silencer chambers to passages. However, the relative change in cross sectional area is normally much smaller in the case of monoliths, in particular in connection with through-flow monoliths.

Since monoliths are usually fixed to the casing by an annular ring element, the effective change in cross section usually is somewhat bigger than what is given by the frontal area percentage of the monolith as such. This percentage is referred to as the effective frontal area percentage.

On the basis of this understanding, monoliths are handled in the following way as elements of silencers designed and dimensioned according to the invention:

when the effective frontal area percentage of the monolith placed in a chamber is bigger than approximately 50%, the porosity of the monolith is regarded as an extension to the chamber volume, when the effective frontal area percentage of the monolith is smaller than approximately 50%, the monolith is treated as a connecting passage with an effective cross sectional area roughly equalling the sum of cross sectional areas of all channels within the monolith, the pressure drop across the monolith is added to the pressure drop of the silencer without the monolith, i.e. a silencer having the same dimensions and geometry, but without the monolith. This means that when dimensioning a silencer for a given total sound attenuation, SDB, and for a given pressure drop, SDP, the pressure drop across the monolith should be subtracted from SDP to determine the residual pressure drop at disposal for silencer design.

For given flow velocities and gas temperatures, approximate pressure drops across monoliths can be calculated on the basis of formulae and experimentally based constants given in literature. More precise predictions can be made on the basis of data provided by manufacturers, or in rather simple laboratory experiments.

At least one pipe or passage may be annular, constituted by an inner cylinder and by an outer cylinder. The annular pipes or passages may be provided with means, such as e.g. walls, for segmenting the annular passage into a number of sub-passages having a rectangular or circular cross sectional outline or any other cross sectional outline. Thereby, rotating stall phenomena may be eliminated or at least reduced.

At least one of the at least one pipe or passage which is annular may be a passage connecting two chambers. The annular passage may diffuse at least part of the gas flow directed therethrough. The at least one pipe or passage being annular may thus constitute a flow cross sectional area increase in the flow direction. By applying an annular passage constituting a cross sectional area increase it is possible to achieve a relatively large cross sectional area increase over a relatively short longitudinal distance while avoiding flow separation in the passage. Thus, a relatively large pressure recovery may be achieved over a relatively short distance which is important, e.g., for applications where the available space is limited, e.g., in vehicles such as trucks.

The annular passage may comprise a constant flow area part and an outlet diffuser part. The constant flow area part contributes to the length of the connecting passage.

The inner cylinder may extend into said first chamber by a cylinder of substantially the same diameter as said inner cylinder, and said outer cylinder may be connected to a flow-guiding body with a curvature, so as to obtain optimal flow conditions through the device.

Sound absorptive material is preferably contained within said cylinder and/or within a continuation cylinder extending into said first chamber and/or within a continuation cylinder extending into said second chamber. Obviously, one aim of providing sound absorptive material is to reduce the sound level of the gas flow. Though in preferred embodiments, the sound absorptive material is comprised within said cylinders, it may additionally/alternatively be comprised at the outer periphery of the surrounding casing. Preferably, at least some of the sound absorptive material communicates with the gas flow, e.g., through a perforated wall. Thus, at least part of the continuation cylinder may be perforated. It is preferred to apply said cylinders which at least partly separate the sound absorptive material from the gas flow in order to avoid that the sound absorptive material is being damaged by the gas flow. At locations of cross-sectional increase or decrease or in the vicinity of such locations, the walls are preferably non-perforated so as to avoid damaging of the sound absorptive material and/or so as to avoid undesired flow perturbations which may increase pressure loss or generate turbulence.

In a preferred embodiment, the outflow from said connecting passage passes into an annular passage inside said second chamber, said annular passage being made up of at least a perforated portion of an inner cylinder and an outer, perforated cylinder, both said cylinders separating sound absorptive materials from gas flow within said second chamber. The outflow from the connecting passage may pass directly into an annular passage.

In order to obtain optimal flow conditions in the device, unstable flow conditions in the devices according to the invention should be avoided. Thus, for example, the distance between the inlet to the first chamber and the inlet to the annular passage should be so large that essentially no unstable flow occurs in the first chamber.

With the aim of preventing unstable flow in the first chamber and/or allowing for a rather long passage, the distance may be at least 2% larger than the distance below which unstable flow would occur. Preferably, said distance should be at least 5% larger than the distance below which unstable flow would occur, normally at least 10% larger. When the total length of the device is limited, it is not desired that the distance is more than 50% larger than the distance below which unstable flow would occur, however for some applications the distance may exceed said 50%.

The device according to the invention is adapted for being connected to a flow system, e.g., the exhaust system of a vehicle comprising an internal displacement engine and/or a turbo machine or it may be suited for being connected to the exhaust system of a stationary power generating installation comprising an internal displacement engine and/or a turbo machine.

In the present context, the vehicle may be any vehicle, such as e.g., a diesel engine powered truck, bus, a petrol or diesel driven car, a railway locomotive, an airplane, such as a piston engine powered air plane, a military vehicle, such as a tank, a petrol, a gasoline or a gas engine powered truck, bus, car or any other moveable, engine driven device. The vehicle may also be any ship or boat having a combustion device. The diesel engine may be a spark ignited or compression ignited diesel engine.

The stationary power generating installation may be a power station having one or more gas turbines driven by flow originating from suitable combustion means, such as, e.g., one or more boilers, fuel engines or other combustion means.

One major benefit of a device according to the invention is a significant reduction of pressure loss over the device compared to known devices. The reduction of pressure loss over the device reduces the fuel consumption of the combustion device and increases the power generated by the combustion device at a given fuel consumption. The pressure drop may be expressed as the dimensionless parameter $\zeta$ being defined as the ratio between the pressure loss over the device and the dynamic pressure at an appropriate location in the device or adjacent to the device, i.e.:

$$\zeta = \frac{\Delta p}{\frac{1}{2}\rho u^2} \qquad (4)$$

where:

$\Delta p$ is the pressure drop over the device, $\rho$ is the density of the gas at said location, u is a velocity of the gas at said location, preferably the mean gas velocity.

An appropriate location could be, e.g., the inlet pipe, the outlet pipe, a location upstream of the inlet pipe, a location downstream of the outlet pipe, or any appropriate position inside the device where the flow velocity corresponds to the gas flow rate originating from the combustion device. As will be illustrated in the example below, the invention provides a device for silencing a gas flow, the device having a low $\zeta$-value.

In most embodiments of the invention, $\zeta$ will be lower than 10. Typically, it will be between 0.5 and 4.

The pressure drop across a silencer of a given type is typically roughly proportional to the number of chambers. Therefore, when analyzing pressure drops, it is expedient to focus the $\zeta$-value per chamber, $\zeta'$, defined as:

$$\zeta' = \frac{p_1 - p_2 - \Delta p_m}{\frac{1}{2}\rho u_2^2}, \qquad (5)$$

where:

p₁ is the static pressure at a suitable location in the chamber inlet passage(s), p₂ is the static pressure at a suitable location in the chamber outlet passage(s), Δp_m is the static pressure drop across a monolith optionally comprised in the chamber, u₂ is the mean flow velocity in the outlet passage(s), the suitable location being, e.g., halfway between passage inlet and outlet in case of a passage connecting two chambers, substantially immediately upstream of the first chamber in case of an inlet passage to the silencer (unless when the inlet passage extends into the silencer and shows a decrease of cross-sectional area for the gas flow; in that case p₁ is the static pressure taken at the most upstream position where the mean flow velocity reaches a maximum), and substantially immediately downstream of the last chamber in case of an outlet passage of the silencer.

One reason for subtracting the pressure drop across a possible monolith is that such an element normally contributes only to a small extent to low frequency sound attenuation while causing a substantial pressure drop in addition to the pressure drop across the chamber. Provided the monolith is inserted in an appropriate way, the pressure drop across a silencing chamber having a monolith comprised therein may be expressed as the sum of the pressure drop across the monolith and the pressure drop across the chamber when having no monolith comprised therein.

In a preferred embodiment of the invention, ζ' is below 1.5. In further embodiments it may be lower than 1.0, or lower than 0.5, or even lower than 0. Negative values can be achieved when a diffuser is fitted onto the chamber inlet passage, and the flow cross-sectional area of an outlet passage is substantially larger than the flow cross-sectional area of an inlet passage, so that chamber pressure drop is rated against a rather small dynamic pressure prevailing in the outlet passage. In embodiments of the invention, ζ' is usually below 1.0, when flow cross-sectional areas of passages are of equal or almost equal size.

The combustion device/means mentioned in the present text may be an internal combustion engine, such as a diesel, petrol, gasoline or gas engine, e.g. a two or four stroke piston engine, a Wankel engine or a gas turbine connected to a boiler or any other appropriate combustion or energy extracting device, e.g., the combustion system of a stationary power generating installation, such as power station.

A suitable method for dimensioning the devices according to the invention comprises approximating:

(I) the local natural frequency, $f_e$, of one or more mass systems comprising the gas mass of two consecutive acoustic chambers, $AC_j$ and $AC_{j+1}$, by applying the following expression:

$$f_e = \frac{c}{2\pi}\sqrt{\frac{a}{L}\left(\frac{1}{V_j} + \frac{1}{V_{j+1}}\right)}, \quad (3)$$

$V_j$ and $V_{j+1}$ being the volumes of the chambers $AC_j$ and $AC_{j+1}$ respectively (the volume $V_{j+1}$ being set to infinite when the chamber $AC_j$ is connected to an exterior environment or an exterior chamber in a downstream direction), a being a representative cross-sectional area of the passage interconnecting the two consecutive acoustic chambers, L being the length of the passage, and c being the local sound velocity, (II) the sound attenuation $\Delta dB_i$ conferred by one or more of the at least one transition of cross-sectional area by applying the following expression:

$$\Delta dB_i = k \log_{10}\frac{A_i}{a_i}, \quad (6)$$

$A_i$ being the relatively higher cross-sectional area at the i'th transition of cross-sectional area of the gas flow, $a_i$ being the relatively lower cross-sectional area at the i'th transition of cross-sectional area of the gas flow, and k is an empirically determined constant for adapting two or more of the following parameters relative to each other:

(a) the length L and the representative cross-sectional area a of one or more of the at least one passage, (b) the number of changes, n, of transitions of cross-sectional area for the flow of the gas between a relatively lower cross-sectional area $a_i$ and a relatively higher cross-sectional area $A_i$, (c) the number of acoustic chambers, m, comprised in the casing, (d) the relatively lower cross-sectional area $a_i$ (i=1 . . . n) and the relatively higher cross-sectional area $A_i$ (i=1 . . . n) of each one of the n changes of cross-sectional area, (e) the volume or volumes, $V_j$ (j=1 . . . m), of each one of the m acoustic chambers comprised in the casing, (f) the natural frequency, $f_e$, of one or more domains of the device comprising two consecutive acoustic chambers $AC_j$ and $AC_{j+1}$, or (g) the total sound attenuation conferred by the device.

The adaptation of the parameters:

(a) the length L and the representative cross-sectional area a of each one of the at least one passage, (b) the number of changes, n, of cross-sectional area for the flow of the gas between the relatively lower cross-sectional area $a_i$ and the relatively higher cross-sectional area $A_i$, (c) the number of acoustic chambers, m, comprised in the casing, (d) the relatively lower cross-sectional area $a_i$ (i=1 . . . n) and the relatively higher cross-sectional area $A_i$ (i=1 . . . n) of each one of the n changes of cross-sectional area, (e) the volume or volumes, $V_j$ (j=1 . . . m), of each one of the m acoustic chambers comprised in the casing, (f) the natural frequency, $f_e$, of any domain of the device comprising two consecutive acoustic chambers $AC_j$ and $AC_{j+1}$, (g) the total sound attenuation $\Sigma\Delta dB$ conferred by the device, relative to each other may be performed by performing the steps of:

(i) restricting the values of one or more of the parameters (a)–(g) by assigning a predetermined value or a predetermined limit to each one of said one or more parameters, (ii) assigning values to the parameters a, L, $a_i$ and $A_i$ if predetermined values have not been assigned to those parameters at step (1), (iii) approximating the local natural frequency, $f_e$, of any domain of the device comprising two consecutive acoustic chambers $AC_j$ and $AC_{j+1}$ by applying the following expression:

$$f_e = \frac{c}{2\pi}\sqrt{\frac{a}{L}\left(\frac{1}{V_j} + \frac{1}{V_{j+1}}\right)}, \quad (3)$$

$V_j$ and $V_{j+1}$ being the volumes of the chambers $AC_j$ and $AC_{j+1}$ respectively (the volume $V_2$ being set to infinite when the chamber $AC_j$ is connected to an exterior environment or an exterior chamber in a downstream direction), a being a representative cross-sectional area of the passage interconnecting the two consecutive acoustic chambers, L being the length of the passage, and c being the local sound velocity, (iv) if a value or a limit for the local natural frequency has been prescribed at step (i), comparing said value or limit to $f_e$ as determined at step (iii), (v) approximating the total sound attenuation $\Sigma \Delta dB$ conferred by the device by applying the following expression:

$$\sum \Delta dB = k \sum_{i=1}^{n} \log_{10} \frac{A_i}{a_i} \quad (7)$$

n being the total number of changes of cross-sectional area of the gas flow, $A_i$ being the relatively higher cross-sectional area at the i'th change of cross-sectional area of the gas flow, $a_i$ being the relatively lower cross-sectional area at the i'th change of cross-sectional area of the gas flow, and k is an empirically determined constant, (vi) if a value or a limit for the total sound attenuation of the device has been prescribed at step (i), comparing said value or limit to $\Sigma \Delta dB$ as determined at step (v), (vii) if the comparisons performed at steps (iv) and (vi) reveal that the limitations prescribed at step (i) are not fulfilled, updating the values of the parameters set at step (ii) and repeating steps (iii)–(vii) until the limitations prescribed at step (i) are achieved.

Expressions known per se may be used for approximating the increase or decrease of static pressure at one or more of said at least one transition of cross-sectional area.

A predetermined limit or value may be assigned to the pressure loss over the device at step (i), and repeating steps (iii)–(vii) until said predetermined limit or value for the pressure loss over the device is achieved.

Steps (iii)–(vii) above may be repeated until the above-mentioned parameters are mutually optimized.

The value of k is suitably in the range 5–7, e.g., in the range 6–6.5, such as 6.25.

When the device further comprises at least one resonance chamber with or without a therein enclosed sound absorptive material, which chamber communicates with one of said at least one acoustic chamber through at least one communication passage, the method comprising adjusting the volume of the at least one resonance chamber and the geometric configuration of the at least one resonance chamber and the communication passage or passages being so as to have a selected center attenuation frequency so as to supplement the sound attenuation achieved with said acoustic chamber or chambers at frequencies of said flow system around said center attenuation frequency.

The volume of the at least one resonance chamber may be adjustable for instance by means of displaceable adjustment means, in which case the range of the volume of the at least one resonance chamber may be adjusted so as to allow for a variable center attenuation frequency within a given range.

When the device comprises one or more resonant chambers contained in said casing with the aim of providing added sound attenuation, the method comprising designing the volumes of said resonance chambers as resonators with selected center frequencies.

According to a further aspect of the invention, a vehicle comprising an internal displacement engine and/or a turbo machine and a device according to the invention is provided, the device being comprised in the exhaust system of the vehicle.

The invention further relates to a stationary power generating installation comprising an internal displacement engine and/or a turbo machine and a device according to the invention, the device being comprised in the exhaust system of the power generating installation.

In the following, embodiments of the silencing device according to the invention and of the method according to the invention for designing and/or dimensioning a silencing device will be explained with reference to the drawings, in which FIG. 1 shows a representative graph illustrating silencer performance versus unattenuated noise source spectrum, FIG. 2 shows a representative graph illustrating an example of an infrasound noise spectrum, shown linearly (unweighted) and subjected to the so-called A-weighting, respectively, FIG. 3a is a diagrammatic representation in longitudinal section and cross sections along line I—I (FIG. 3b) and II—II (FIG. 3c) of a silencer comprising elements associated with the method for designing and/or dimensioning according to the invention, FIG. 4 is a partial (lower half not shown in section) longitudinal section of a silencing device according to the invention, the design of which has been performed using the method of the invention, FIG. 5 is a longitudinal section of a somewhat generalized silencer illustrating key variables in understanding the principle of a coil-shaped, helical or curved passage and the sometimes critical distance between a chamber inlet and a chamber outlet, FIG. 6 is a longitudinal section of an interesting embodiment of a silencing device of the invention, suitable, e.g. for a truck, FIG. 7 is a longitudinal section of another interesting embodiment of a silencing device of the invention, suitable, e.g., for a truck, FIG. 8 shows sections of an interesting embodiment of a two-chamber silencing device according to the invention with a helical connecting passage between the chambers, FIG. 9 shows an interesting compact embodiment of a two-chamber silencing device according to the invention with a helical connecting passage between the chambers and incorporating a monolith, e.g., a catalyzer, FIG. 10 shows two examples of resonators added to a main silencer according to the invention, FIG. 11 shows various principles of curved/helical forms and embodiments, FIG. 12 shows a longitudinal sectional view of a further embodiment of a device according to the invention, FIGS. 13, 14 and 15 are tables containing measured data of engine performance, FIGS. 16–22 illustrate the results of a testing performed with a silencer designed according to the principles disclosed herein, cf. Example 2.

In FIG. 1, S1 shows an unattenuated noise source spectrum, e.g., after subjection to the so-called A-weighting, whereas S2 shows the spectrum of the attenuation caused by a silencer (which is to be subtracted from S1 to obtain the resulting attenuated spectrum). According to the invention, silencers are preferably designed in such a way that the lowest natural frequency, $f_e$, for passages of the silencer, is lower than a characteristic frequency, $f_{char}$, of the unattenuated noise source. In most cases, $f_{char}$ is the frequency at which the A-weighted spectrum has its maximum P1, P2 being a secondary peak. A-weighting is commonly adopted to take into account the frequency-dependent sensitivity of the human ear. Most noise limit standards are based on dB(A).

Sometimes A-weighting can be considered to cause exaggerated suppression of low frequencies. An important example of this occurs when the noise limit to be met is located inside a building at a distance from the noise source. In such cases sound is attenuated, both due to distance and due to insulation caused by walls, windows etc, so that the A-weighting underrates the low frequencies (which are not particularly attenuated in this situation). It may then be more appropriate to use dB(C)-weighting instead for the unattenuated sound source.

These years increasing concern is being raised about the possible disturbance to humans caused by infrasound, i.e. sound of lower frequencies than can be heard, roughly below 20 Hz. Although the matter is controversial, increasing medical evidence is being accumulated to support the assumption that disturbances may be real and not only imagined by overly concerned people. Drafts have been made of how to evaluate infrasound in practice, but no commonly accepted standards have yet been agreed upon. Since the present invention is particularly efficient in providing silencers with strong low-frequency attenuation to gas flow noise, it has an interesting potential for combating infrasound. FIG. 2 illustrates how, as a first suggestion, the simple linear, i.e. non-weighted, unattenuated spectrum SL, can be used to more realistically assess the infrasound contribution having a maximum peak PL which is within the infrasound frequency range. When changing over from A-weighting (which suppresses infrasound), the maximum peak is seen to shift from PA, which occurs in the audible frequency range, to the peak PL occurring at the lower (infrasound) frequency. Whatever weighting will be agreed upon for infrasound, some characteristic frequency can be established as an input for the designing and dimensioning procedure of the invention.

In general, extending the silencing range down into the infrasound range calls for bigger chambers and longer connecting passages. As with silencers for conventional audible sound alone, the various measures of the present invention offer, also for infrasound attenuation, a better trade-off between the degree of attenuation, the pressure drop, and the space requirement for the silencer, as compared to conventional technique.

Depending on the particular circumstances, various combinations of parameters may be given as the basis of the design and dimensioning of a silencer.

The following combination of data can often be considered given for a substantially cylindrical silencer for the exhaust gasses from a piston engine (see FIG. 3):

SDB (dB)=Total sound attenuation (damping) requirement.

SDP (mm WG)=Total pressure loss allowable across the silencer.

$f_{ign}$ (Hz)=Ignition frequency or firing frequency for the engine.

øD (mm)=Desired diameter of the outer casing corresponding to an area A (mm²).

ød (mm)=Diameter of pipes corresponding to areas a (mm²).

Q (m³/s)=Flow rate of exhaust gasses.

c (m/s)=Sound velocity.

The silencer 5 illustrated in FIG. 3 is substantially cylindrical and comprises an inlet pipe 6 leading exhaust gasses from a piston engine (not shown) into the silencer 5, an outer casing 7 and an outlet pipe 4 leading the silenced gasses out of the silencer 5 to the atmosphere.

The interior space defined by the outer casing 7 is subdivided into three chambers 1, 2 and 3 having axial lengths $L_1$, $L_2$ and $L_3$, respectively, by means of partitions 8 and 9.

A radial diffuser 10 with an outlet 10a is arranged as the outlet of an inlet passage (pipe) 11 to the first chamber 1. An axial diffuser 12 (i.e. a passage of a type characteristically different from the radial diffuser 10) consisting of a series of pipes 12 having an axial length $L_{12}$ approx. equal to 0.5 times $L_2$ and having outlets 12a with increasing diameter in the flow direction constitutes the passage from chamber 1 to chamber 2. A radial diffuser 13 with outlet 13a is arranged as the outlet of a passage (pipe) 14 having a length $L_{23}$ approx. equal to 0.5 times $L_3$ and leading from chamber 2 to chamber 3.

Sound damping material B such as mineral wool is arranged in the chambers adjacent to the pipes 11, 12 and 13.

SDB is often arrived at by means of a separate, conventional acoustic calculation based on the measured unattenuated noise at a certain distance from the outlet from the exhaust system correlated with a desired maximum noise level at another point in space.

$f_{char}$, which is often identical to $f_{ign}$ in the case of a piston engine, is determined by the rpm of the engine, the number of cylinders and the type of engine process (two-stroke or four-stroke). If the engine is coupled to the general power grid by means of a generator, the rpm will be given thereby. During start-up of such engines or in propulsion engines for ships, road vehicles and so on, the rpm is variable, and therefore the value of $f_{ign}$ in such cases must be estimated suitably low based on a rough estimate or on more detailed considerations, for instance based on acoustic-statistical calculations.

In some cases in connection with V-type cylinder arrangements, a frequency around half the value of the ignition frequency may be preponderant which may motivate utilizing this frequency as a basic parameter for the dimensioning and design according to the invention of the respective silencer according to the invention.

Q and c can be calculated from the given mass flow and temperature of the exhaust gasses.

SDP and øD are typically "semi-fixed" parameters. Often it is very desirable to limit each of them to a maximum value, but if SDB is already fixed then SDP and øD may not be determined freely. The bigger øD is chosen, the larger the sound attenuation will be. Therefore, it will often be a question of combining the design and dimensioning of the silencer with considerations regarding the interrelationship between silencing and øD including individually adapting the silencer structure to the geometrical constraints given by erection requirements, available space etc.

A typical procedure when carrying out the method of designing and/or dimensioning according to the invention is:

The number of chambers in the silencer is determined as n=|SDB/12.5 dB|

For instance: n=|40/12.5|=3.

Hereafter, the types of intermediate pipes (passages) and of diffusers are decided. A combination of different types may be chosen for maximum repression of chamber resonances. So as to further hinder or avoid resonances, rather different chamber lengths $L_1$–$L_3$ may be chosen. The outlets 10a, 12a and 13a of the diffusers 10, 12 and 13, respectively, are located at or near the axial centre of the respective chambers and at or near ⅔ of the radius corresponding to the pressure nodes of the respective chambers.

The relation A/a of the cross sectional areas may be tentatively chosen to be 10.

Typically, different chamber lengths are chosen, for instance:

$L_1$=0.6$L_3$ and $L_2$=0.8$L_3$.

Consideration of the local natural frequency for the system:

The two last chambers 2 and 3 with associated pipes 12 and 14, respectively, are dimensioned such that:

$f_{23}$=0.5$f_{ign}$ as A/a=10 so that D/$d_3$=√10 and therefore:

$$f_{23} = \frac{c}{2\pi} \frac{1}{\sqrt{10}} \frac{1}{\sqrt{0.5}} \sqrt{\left(\frac{1}{0.8}+1\right)} \frac{1}{L_3}$$

from which $L_3$ is determined. $L_1$ and $L_2$ are determined from this so that the total length of the silencer 5 is determined.

The other cross sectional areas of the connecting tubes 12 and 11 are determined such that the relations between the corresponding areas A and a are also approximately 10, the area a for the pipes 12 being the total cross sectional area of the pipes 12.

Now the total sound attenuation may be calculated as the sum of all ΔdB according to equation (7).

The total pressure loss may now be calculated by using a combination of known elementary formulas and a detailed knowledge of the efficiency of different diffuser types, consideration being given to the inlet flow profiles to the diffusers, the chosen detailed geometry and so on.

If one or more of the calculated values for $f_e$, degree of silencing or pressure drop differ from the desired values then one or more of øD, ød or L are adjusted and the calculations indicated above are repeated.

In cases where maximum compliance of a silencer with the given requirements is desired, the dimensioning indicated above is supplemented by an adjustment so that the "peaks" and "troughs" are adapted to the requirements. This is done by varying the dimensions (chamber lengths etc) and calculating the damping spectrum by means of impedance analysis and constants involved herein, the constants being determined by separate theoretical and empirical investigations.

Referring now to FIG. 4, a practical example of designing and dimensioning a silencer for a six-cylinder, four stroke engine is illustrated.

In FIG. 4, Ba indicates areas containing sound absorptive material, while the lengths and diameters LS1—LS9 and ød1–ød6, respectively, correspond to the lengths and diameters of FIG. 3. In particular, the following dimensions are indicated in FIG. 4, cf. Tables I–V:

LS1: Length of the passage leading to chamber#1,

LS2: Overall length of chambers and interconnecting passages,

LS3: Length of chamber#1,

LS4: Length of chamber#2,

LS5: Length of chamber#3,

LS6: Length of the passage leading to chamber#1,

LS7: Length of the passage interconnecting chamber#1 and chamber#2,

LS8: Length of the passage interconnecting chamber#2 and chamber#3,

LS9: Length of that part of the tail pipe which extends into chamber#3,

ød1: Stud diameter, inlet pipe,

ød2: Stud diameter, chamber#1 (diameter of the passage leading to chamber#1)

ød3: Stud diameter, chamber#2 (diameter of the passage interconnecting chamber#1 and chamber #2), ød4: Outer diameter, ød5: Stud diameter, chamber#3 (diameter of the passage interconnecting chamber#2 and chamber #3), ød6: Stud diameter, outlet pipe.

The parameters of interest are given at the top of Table I, it being furthermore given that the total sound attenuation SDB desired is 35 dB.

TABLE I

220 HP at 1800 rpm
Firing frequency 90 Hz
6 cylinders in R-form, 4 stroke natural aspiration
475 mmWG max. allowable backpressure
Exhaust gas massflow 227 g/s, 0,477793 m³/s
Exhaust gas temperature 470 Celcius
Density 0.475101 kg/m³
Sound vel. 546.5786 m/s
1.031818 g/s/HP
Drum diameter 250 mm
Drum length 2600 mm
Drum thickness 2 mm

| Chamber # | 0 | 1 | 2 | 3 | 0 | Total |
|---|---|---|---|---|---|---|
| Length [mm] |  | 867 | 867 | 867 | 867 |  |
| Stud diameter [mm] | 114.3 | 114.3 | 114.3 | 114.3 | 114.3 |  |

TABLE I-continued

| | | | | | |
|---|---|---|---|---|---|
| Stud thickness [mm] | 2 | 2 | 2 | 2 | 2 |
| Velocity in [m/s] | 50 | 50 | 50 | 50 | 50 |
| dyn press in [mmWG] | 60.6 | 60.6 | 60.6 | 60.6 | 60.6 |
| Diffusor data | | | | | |
| Inner Radius [mm] | | 23 | 23 | 23 | |
| Outer Radius [mm] | | 108 | 108 | 108 | |
| Width [mm] | | 25 | 25 | 25 | |
| Outer diameter [mm] | | 197 | 197 | 197 | |
| Area out [mm2] | | 14283 | 14283 | 14283 | |
| Area in [mm2] | | 9555 | 9555 | 9555 | |
| Area ratio | | 1.49 | 1.49 | 1.49 | |
| Eta diffusor | | −0.23 | −0.23 | −0.23 | |
| Zeta inlet | 0 | 0.05 | 1.05 | 1.05 | 1.05 |
| Press drop [mmWG] | 0 | −11 | 49.5 | 49.5 | 63.6 | 151.7 |
| dB | 0 | 4.4 | 8.7 | 8.7 | 4.4 | 26.1 |
| local frequency [Hz] | | | 90 | 90 | 45 |
| % F ignition | 50 | | | | |

The length of the drum (outer casing) is ideally desired to be 2600 mm but may be slightly larger if necessary.

The stud diameter minus stud thickness gives the internal diameter of the passage tubes and thereby the areas a. The drum diameter minus the drum thickness gives the area A.

In the initial calculation step, Table I, the number of chambers is chosen to be three and the chamber lengths are chosen equal, as are the pipe diameters (areas a). The tail pipe (outlet from the drum) is also involved in the dimensioning, the volume of the "chamber" constituted by the atmosphere being infinite. The length of the tail pipe is initially equal to the lengths of the other passage pipes.

The static pressure drop across a diffuser is negative and may be calculated as:

$$p_1 - p_2 = -\eta_d \tfrac{1}{2} \rho u_1^2, \quad (8)$$

$u_1$ being the mean flow velocity in the inlet passage to a chamber, and $\eta_d$ being a diffuser efficiency. In case of chambers being designed in a fluid-dynamically proper way and not being excessively long, such as, e.g., the chambers of the device of FIG. 4, the pressure drop within the chamber is approximately zero, i.e.:

$$p_2 - p_3 = 0, \quad (9)$$

$p_2$ and $p_3$ being the static pressure at the locations indicated in FIG. 4.

From the chamber inlet to the passage leading gas from the chamber the static pressure drop is:

$$p_3 - p_4 = (1 + k_e) \tfrac{1}{2} \rho u_2^2, \quad (10)$$

$p_3$ and $p_4$ being the static pressure at the locations indicated in FIG. 4, $k_e$ being a constant, the value of $k_e$ typically being 0.05 when the transition to the inlet of the passage(s) leading gas from the chamber is rounded off.

Pressure drops in passages of arbitrary cross section form may be calculated as:

$$p_4 - p_5 = \lambda \frac{L}{4\frac{a}{P}} \tfrac{1}{2} \rho u_2^2, \quad (11)$$

$p_4$ and $p_5$ being the static pressure at the locations indicated in FIG. 4, a being the cross-sectional area of the passage at a representative position and P being the perimeter of the passage at the same position. For a circular pipe (as in FIG. 4), the denominator becomes the diameter. λ depends on the pipe surface roughness and Reynolds number; a typical value is 0.02.

For various types of diffusers, pipe roughnesses, etc. appropriate values of the constants can be found in handbooks of flow dynamics.

The total pressure drop is calculated as 151.7 mmWG, i.e. well below the maximum back pressure of 475 mmWG allowable for the engine. The total sound attenuation is 26.1 dB, i.e. too small. The local natural frequency of the chamber system 1–2 and the chamber system 2–3 is too high, as it should be much nearer half the firing frequency, i.e. 45 Hz.

In Table II, the diameters of the tubes between chambers 1 and 2 and between chambers 2 and 3 are reduced by the same amount so as to increase the sound attenuation and lower the natural frequency of the two said chamber systems in accordance with the expressions for ΔdB and $f_e$.

TABLE II

| Chamber # | 0 | 1 | 2 | 3 | 0 | Total |
|---|---|---|---|---|---|---|
| Length [mm] | | 867 | 867 | 867 | 867 | |
| Stud diameter [mm] | 114.3 | 114.3 | 70 | 70 | 114.3 | |
| Stud thickness [mm] | 2 | 2 | 2 | 2 | 2 | |
| Velocity in [m/s] | 50 | 50 | 139.7 | 139.7 | 50 | |
| dyn press in [mmWG] | 60.6 | 60.6 | 472.5 | 472.5 | 60.6 | |
| Diffusor data | | | | | | |
| Inner Radius [mm] | | 23 | 13 | 13 | | |
| Outer Radius [mm] | | 108 | 64 | 64 | | |
| Width [mm] | | 25 | 15 | 15 | | |
| Outer diameter [mm] | | 197 | 197 | 197 | | |
| Area out [mm2] | | 14283 | 8779 | 8779 | | |
| Area in [mm2] | | 9555 | 3421 | 3421 | | |
| Area ratio | | 1.49 | 2.57 | 2.57 | | |
| Eta diffusor | | −0.23 | −0.47 | −0.47 | | |
| Zeta inlet | 0 | 0.05 | 1.05 | 1.05 | 1.05 | |
| Press drop [mmWG] | 0 | −11 | 274.7 | 274.7 | 63.6 | 602 |
| dB | 0 | 4.4 | 14.3 | 14.3 | 4.4 | 37.3 |
| local frequency [Hz] | | | 53.9 | 53.9 | 45 | |
| % F ignition | 50 | | | | | |

The sound attenuation is now 37.3 dB and the natural frequencies of the two chamber systems are much closer to 45 Hz and are considered to be acceptable, but the pressure drop of 602 mmWG is too high.

In Table III the diameter of the second and third pipes is increased by different values, while the diameter of the first pipe leading from the inlet of the silencer into the first chamber is decreased, resulting in a reduced pressure drop.

TABLE III

| Chamber # | 0 | 1 | 2 | 3 | 0 | Total |
|---|---|---|---|---|---|---|
| Length [mm] | | 867 | 867 | 867 | 867 | |
| Stud diameter [mm] | 114.3 | 88.9 | 88.9 | 76.1 | 114.3 | |
| Stud thickness [mm] | 2 | 2 | 2 | 2 | 2 | |
| Velocity in [m/s] | 50 | 84.4 | 84.4 | 117 | 50 | |
| dyn press in [mmWG] | 60.6 | 172.5 | 172.5 | 331.7 | 60.6 | |
| Diffusor data | | | | | | |
| Inner Radius [mm] | | 17 | 17 | 14 | | |
| Outer Radius [mm] | | 83 | 83 | 70 | | |
| Width [mm] | | 19 | 19 | 16 | | |
| Outer diameter [mm] | | 197 | 197 | 197 | | |
| Area out [mm2] | | 11165 | 11165 | 9555 | | |
| Area in [mm2] | | 5661 | 5661 | 4083 | | |
| Area ratio | | 1.97 | 1.97 | 2.34 | | |
| Eta diffusor | | −0.38 | −0.38 | −0.44 | | |
| Zeta inlet | 0 | 0.05 | 1.05 | 1.05 | 1.05 | |
| Press drop [mmWG] | 0 | 54.3 | 114.9 | 201.1 | 63.6 | 433.8 |
| dB | 1.420848 | 5.8 | 11.6 | 13.3 | 4.4 | 36.4 |
| local frequency [Hz] | | | 69.3 | 58.8 | 45 | |
| % F ignition | 50 | | | | | |

The sound attenuation is still high enough (36.43 dB) and the pressure drop is low enough (433.80 mm WG), but the local frequencies of the chamber systems are too high to satisfactorily attenuate the firing frequency of the engine, i.e. too far above 45 Hz.

In Table IV the lengths of the chambers 1–3 are changed as indicated, but as the resulting local natural frequencies of the chamber systems are still not satisfactory it is necessary to lengthen the drum by 300 mm to 2900 mm as shown in Table V.

TABLE IV

| Chamber # | 0 | 1 | 2 | 3 | 0 | Total |
|---|---|---|---|---|---|---|
| Length [mm] | | 600 | 1225 | 775 | 969 | |
| Stud diameter [mm] | 114.3 | 88.9 | 88.9 | 76.1 | 114.3 | |
| Stud thickness [mm] | 2 | 2 | 2 | 2 | 2 | |
| Velocity in [m/s] | 50 | 84.4 | 84.4 | 117 | 50 | |
| dyn press in [mmWG] | 60.6 | 172.5 | 172.5 | 331.7 | 60.6 | |
| Diffusor data | | | | | | |
| Inner Radius [mm] | | 17 | 17 | 14 | | |
| Outer Radius [mm] | | 83 | 83 | 70 | | |
| Width [mm] | | 19 | 19 | 16 | | |
| Outer diameter [mm] | | 197 | 197 | 197 | | |
| Area out [mm2] | | 11165 | 11165 | 9555 | | |
| Area in [mm2] | | 5661 | 5661 | 4083 | | |
| Area ratio | | 1.97 | 1.97 | 2.34 | | |
| Eta diffusor | | −0.38 | −0.38 | −0.44 | | |
| Zeta inlet | 0 | 0.05 | 1.05 | 1.05 | 1.05 | |
| Press drop [mmWG] | 0 | 54.3 | 114.9 | 201.1 | 63.6 | 433.8 |
| dB | 1.420848 | 5.8 | 11.6 | 13.3 | 4.4 | 36.4 |
| local frequency [Hz] | | | 60.4 | 59.4 | 45 | |
| % F ignition | 50 | | | | | |

TABLE V

| Chamber # | 0 | 1 | 2 | 3 | 0 | Total |
|---|---|---|---|---|---|---|
| Length [mm] | | 650 | 1400 | 850 | 884 | |
| Stud diameter [mm] | 114.3 | 88.9 | 88.9 | 76.1 | 114.3 | |
| Stud thickness [mm] | 2 | 2 | 2 | 2 | 2 | |
| Velocity in [m/s] | 50 | 84.4 | 84.4 | 117 | 50 | |
| dyn press in [mmWG] | 60.6 | 172.5 | 172.5 | 331.7 | 60.6 | |
| Diffusor data | | | | | | |
| Inner Radius [mm] | | 17 | 17 | 14 | | |
| Outer Radius [mm] | | 83 | 83 | 70 | | |
| Width [mm] | | 19 | 19 | 16 | | |

TABLE V-continued

| Chamber # | 0 | 1 | 2 | 3 | 0 | Total |
|---|---|---|---|---|---|---|
| Outer diameter [mm] |  | 197 | 197 | 197 |  |  |
| Area out [mm2] |  | 11165 | 11165 | 9555 |  |  |
| Area in [mm2] |  | 5661 | 5661 | 4083 |  |  |
| Area ratio |  | 1.97 | 1.97 | 2.34 |  |  |
| Eta diffusor |  | −0.38 | −0.38 | −0.44 |  |  |
| Zeta inlet | 0 | 0.05 | 1.05 | 1.05 | 1.05 |  |
| Press drop [mmWG] | 0 | 54.3 | 114.9 | 201.1 | 63.59463 | 433.8 |
| dB | 1.420848 | 5.8 | 11.6 | 13.3 | 4.4 | 36.4 |
| local frequency [Hz] |  |  | 53.9 | 53.8 | 45 |  |
| % F ignition | 50 |  |  |  |  |  |

Now the local frequencies are considered to be close enough to 45 Hz to give a satisfactory attenuation of the firing frequency of the engine.

Even though further optimization will be achievable such further improvement will be relatively small and without much practical value in the actual situation.

The example given above of an embodiment of a method according to the invention for designing and dimensioning a device for silencing a flow of exhaust gasses is directed to relatively simple and uncomplicated situations where the silencing, pressure loss and space constraints are not strict.

The passages between the chambers may be prolonged by several means either alone or in combination. The pipes may be prolonged backwards into the upstream chamber and forwards into the downstream chamber, or the pipes may be prolonged by adopting a helical design for same. If the pipes either alone or combined with a diffuser are prolonged both upstream and downstream, the outlet of the upstream pipe in a chamber may be downstream of the inlet of the downstream pipe, thereby twice reversing the direction of the main flow in said chamber. A diffuser having an umbrella-like shape with the convex surface thereof facing downstream will also have the effect of prolonging the passage and reversing the flow. Various types and shapes of baffle plates and guiding plates and bodies may be employed.

The design and dimensions of the diffusers are important for optimizing the pressure recovery thereof and thereby minimizing the pressure loss through the silencer. Each diffuser may be a radial diffuser or an axial diffuser or a circular conical diffuser or an annular diffuser or a multiplicity of conical diffusers arranged on a cylindrical surface or a diffuser for reversing the direction of flow or a double diversion diffuser or any other kind of diffuser.

All inlets of the passages should be suitably rounded so as to avoid vena contracta flow with associated vortices giving rise to pressure loss and noise that may be amplified in the passage by resonance.

The outlets of the diffusers should, if possible, be located at the centre of the longitudinal direction of the chamber relative to the main flow direction and/or at the pressure node of a transverse oscillation in the chamber. Hereby, the basic resonances of the chamber in the two directions is repressed.

The arrangement of any sound absorbing material in the silencer is important. Particularly in large silencers it should not be too thick or compact so as to not decrease the acoustic volume of the chambers.

Further embodiments of the invention rely on supplementing series connected acoustic filters by one or more side-branch chambers, acting as resonators, and in some cases being provided with built-in sound absorptive material.

Silencers relying solely on resonators are per se well-known from the prior art. A resonator can provide substantial attenuation around a selected center-frequency, which is determined by the dimensions of the device. However, a single resonator chamber cannot provide the broad-band attenuation achieved by devices according to the invention. In principle, many resonators with different center-frequencies can make up for this deficiency, but silencers of such a configuration become very bulky. An attractive feature of resonators is that they produce very little pressure loss, since the gas flow does not pass through them.

According to the invention, resonators are only used as supplements to achieve improved attenuation at and around selected frequencies which may need further attenuation after achieving otherwise good attenuation by adopting the series-type connection of acoustic filters according to the main principles of the invention.

As an example, an unattenuated sound spectrum of an engine exhaust may have, as previously described, a major peak at the ignition frequency, which can be efficiently dampened by the main method of the invention. But at twice this frequency a smaller peak may also be present, which can be targeted by a side-branch connected resonator.

Sometimes a combination of geometric restrictions for the silencing arrangement can be such that addition of a resonator according to the invention represents good economy with both available space and with pressure drop in the exhaust. For example, a tail pipe 3, leading gas from a silencer, may be prescribed to be positioned at a certain distance WD from a wall, as shown in FIG. 10a. A resonator 4 is here shown to be arranged as an appendix to a main silencer 1, i.e. as a separate container connected to a last chamber 2 of the main silencer 1 by means of a connecting pipe 5.

The resonator can be an empty chamber or contain a movable piston 6, as shown in FIG. 10a. In the first case the center frequency of the resonator will be fixed. In the second case the center frequency can be selected freely within a variation band, by moving the piston, whereby the attenuation spectrum can be optimized. This last facility can be convenient if the exact sound spectrum of the engine is not known, as often the case in practice, when engines and silencers are manufactured by different suppliers.

FIG. 10b shows an alternative embodiment of the invention, in which the resonator has been arranged as a direct extension of the last chamber of the main silencer. In this case, sound absorptive material Ba (e.g., basaltic mineral wool) has been inserted into the resonator.

The theory of resonators is well-known in acoustics and will therefore not be referred here, except for some main characteristics, as a guide for applying resonators according to the invention:

When the resonator is connected to the main silencer by means of pipe, as in FIG. 10a, the peak in the added attenuation spectrum will be more narrow and sharp, as compared to a configuration in which there is a direct connection without a 'neck', as shown in FIG. 10b. In the first case the center frequency is determined as the so-called Helmholz frequency, well-known in acoustics. When calculating this frequency, the acoustic 'stiffness' of the last chamber of the main silencer should be added to the acoustic stiffness of the resonator chamber. The resulting Helmholz frequency thus becomes higher than as given by the resonator itself. Acoustic wave phenomena within the resonance chamber will also influence the Helmholz frequency and should be taken into account in an accurate calculation. The center frequency of a resonator without a connecting pipe is approximately equal to the frequency corresponding to a quarter of a wavelength which is equal to the length of the full chamber.

According to the invention, resonators can also be built into the main silencer as an integrated feature of a chamber. FIG. 7, discussed in greater detail below, shows an example of this. Here, a cylindrical cavity 70 contained within the inner cylinder of the annular passage functions as a resonator, providing added attenuation with a center frequency which is approximately equal to the frequency corresponding to a quarter of a wavelength which is equal to the length of the cylindrical cavity.

FIG. 6 shows a preferred embodiment of a device according to the invention. Here, two chambers 1 and 2 are contained within a casing 7 and are separated by partition walls 8a and 8b. An inlet passage or pipe 6 passes the flow to a first chamber 1 via a radial diffuser 10. From a second chamber 2 the flow is passed to the outlet passage pipe 4 via an opening provided with a curvature 22 preventing flow separation.

The two chambers 1 and 2 are interconnected by an annular passage 12. The combination of the radial inlet diffuser and the annular passage as illustrated in FIG. 6 effectively prevents sound waves from 'short cutting' chamber 1 when passing from the inlet passage 6 to the annular passage 12, even though the distance D1 between the inlet to the annular passage 12 and the inlet to the first chamber 1 is relatively short. i.e., sound energy effectively fills the first chamber 1. The flow path from the inlet to the outlet of the second chamber 2 provides relatively small changes of flow direction. However, due to the relatively long distance D2, the tendency for sound waves to 'shortcut' the second chamber is rather small.

The inlet 12a to the annular passage 12 contains several features which contribute to make the inlet smooth so as to prevent pressure-loss associated vena contracta phenomena: Both of two cylinders 42 and 44 are extended by design parts into the first chamber 1, thus providing guidance for the flow accelerating into the annular passage 12. The inner cylinder 42 is extended to the left by a cylinder 41 which is non-perforated immediately upstream of the inlet to the annular passage 12, and which is perforated elsewhere and contains sound absorptive material Ba. The outer cylinder 44 is extended to the left by a conical cylinder 21, the extension providing a curvature 20 between the cylinder 21 and the cylinder 44. The outermost diameter of the conical cylinder 21 is large enough to provide sufficient guidance for the flow, i.e. the flow velocity at this diameter is much smaller than the flow velocity in the annular passage. However, the distance D3 between the conical cylinder 21 and the casing 7 is not unnecessarily small, since this would tend to acoustically isolate the right-hand, annular part of chamber 1.

An outlet 12d from an annular diffuser 12c passes the flow into an annular passage 30 inside the chamber 2, constituted by an inner, perforated cylinder 43 and an outer, likewise perforated cylinder 46. Sound absorptive materials Bd and Bc are placed inside the cylinder 43 and outside the cylinder 46, respectively. The width D4 of the passage 30 is chosen as a compromise between opposing demands: On the one hand, the smaller the size of D4 is, the more efficient sound absorption is achieved. On the other hand, D4 should not become so small that strong, turbulent noise is generated, or so small that strong fluid-mechanical forces, tending to abstract absorptive material, are generated.

Annular flow between sound absorbing walls is per se known as an acoustically efficient configuration.

The length $L_{12}$ of the connecting passage 12 is chosen to be long enough for the local natural frequency $f_e$ to become sufficiently low, as given by the method of the invention, cf. equation (3). When the total length of the casing 7 is given and is comparatively short, $L_{12}$ is chosen by balancing a number of demands: The distance D1 can be made rather small, e.g. in the order of half the diameter of the casing, depending upon a number of further geometric choices, among them the size of distance D3. Shortening distance D2 will cause a somewhat deteriorated acoustic function of chamber 2, but as a gradual function of D2. In general, it is desired that the level of the noise which may be generated due to turbulence should not, at any frequency, exceed the level of the noise created by the engine.

For a given length $L_{12}$, the annular passage type, the flow-friendly features of a smooth and guiding inlet and a diffuser outlet, allow for a comparatively low natural frequency $f_e$ and rather big, effective sound-reflective flow area ratios A/a.

From fluid-dynamic diffuser theory it is known that there exists a maximum angle α of divergence, indicated in FIG. 6, which, when exceeded, leads to flow separation inside the diffuser which is a non-optimal phenomenon which should be avoided. This maximum angle is relatively small, so that for a large outlet to inlet flow area ratio of the diffuser, the diffuser tends to become long. However, for given sizes of inlet and outlet cross-sectional areas, an annular diffuser allows for a shorter diffuser length than a conical diffuser. This means that, in an embodiment as shown in FIG. 6, even though a low flow velocity is desired at the outlet 12d, and a high flow velocity is desired in the constant flow area part 12b of the passage 12, the diffuser length $L_{12}$, can be chosen rather short, without causing flow separation. For a given total length $L_{12}$, this in turn means that the constant flow area part length $L_{12b}$ can be made rather long, so as to obtain a rather long L in equation (3), and so as to thereby obtain a rather low natural frequency, $f_e$. The acoustically effective area a of the interconnecting passage 12 is a weighted mean of all cross-sectional areas occurring from the inlet 12a to the outlet 12d. Therefore, it is acoustically favourable that the passage with the smallest area, i.e. the cross-sectional area of the constant-area part 12b, is comparatively long.

The silencer embodiment shown in FIG. 6 contains a rather simple, central body 40 which is securely and accurately fixed to the outer parts of the silencer via a number of flow-aligned arms or sheets 47, 48, and 49. For example, in the radial diffuser 10 there may be four arms or sheets 49, positioned along the periphery of the diffuser at an angular spacing of 90°. The total interface area between empty chamber volumes and volumes filled with sound absorptive material is big, providing a maximum of sound absorptive effect to assist sound reduction due to reflection at changes in cross-sectional area.

In the embodiment shown in FIG. 6, the flow occurring in the annular passage 12 is coherent all around the periphery of the annularity, apart from the small interruptions provided by the arms or sheets 47 and 48. For manufacturing reasons it may be expedient to adopt various types of peripheral segmentations of the annular passage. Thus, the arms or sheets 47 and 48 may be substituted by deformations which may be formed by pressing operations made on inner parts 42 and 43 and/or on outer parts 44 and 45 constituting the annular passage 12.

In bigger silencers, or when extreme outlet and/or inlet flow cross-sectional area ratios are wanted for the annular diffuser, it may be advisable to adopt a thorough peripheral segmentation of the annular passage, so as to prevent fluid-mechanical instability of the rotating stall type, well-known from turbo machinery. This can be done by inserting radial partition walls into the annular passage. An alternative is to split the annular passage into a multiplicity of flow-parallel pipes arranged with the centerlines of all pipes situated on a cylinder with a centerline coinciding with the centerline of the silencer as such. These pipes can be circular, in which case diffusing outlet parts will be conical diffusers. Many other cross-sectional shapes of pipes are also possible, e.g. squared cross-sections.

FIG. 7 shows another preferred embodiment of a device according to the invention. As in FIG. 6, an annular passage 12 connects two chambers 1 and 2. In FIG. 7, the casing is more elongated, the embodiment of FIG. 7 thus representing a typical vertical silencer for trucks, wherein the casing is rather long, and wherein the diameter of the casing is rather small.

The following differences compared to the embodiment of FIG. 6 are notable:

The distance $D_3$ has vanished, so that the conical cylinder 21 provides the partition wall 8b between the chambers 1 and 2, together with the rounded part 20 and central parts of the silencer. Still, the annular spacing 32 is not 'wasted' as an acoustic volume of the silencer, since it is a part of the chamber 2. Perforated cylinders 41 and 50 provide inner delimiters of the annular spaces 31 and 30, respectively. Whereas in FIG. 6, the annular space 30 is delimited by both the inner and the outer perforated cylinders 43 and 46, annular spaces 30 and 31 in FIG. 7 are outwardly delimited by the casing 7. Arms or sheets 51, 52, and 53 help fix cylinders 41 and 50, together with filled-in sound absorptive materials Ba and Bd. Whereas in FIG. 6, the outflow from the annular passage 12 passes directly into the passage 30, the outflow in FIG. 7 passes a short distance D5 before entering the annular passage 30.

A cylindrical cavity 70 acts as a built-in resonator, as explained above.

FIGS. 8a–8e show a preferred embodiment of the invention in which a helical passage 12 connects two chambers 1 and 2, contained within a cylindrical casing 7 and separated by an inner, flat partition wall 8. The helical passage is delimited by casing 7, by an inner cylinder 42, and by helically formed sheets 60 and 61. The helical passage 12 is subdivided into a constant flow-area part 12b and a diffuser part 12c, in which the flow area gradually widens in the gas flow direction, as given by a gradually widening distance between the sheets 60 and 61.

Both chambers 1 and 2 are partly filled with sound absorption material Ba, contained behind perforated plates 41 and 43. These plates are so formed and positioned that, together with the absorptive material, they help guide the flow inside the chambers 1 and 2 with low pressure drop while preventing unwanted flow swirling inside the chambers.

Gas flow is led to the silencer via an inlet pipe 6 and a conical diffuser 10, which recovers dynamic pressure and further helps to prevent unwanted swirl inside the chamber 1 by lowering the inlet flow velocity to the chamber. Here, the flow generally turns 180 degrees before entering the helical connecting passage 12 at 12a. Here, a cylindrical rod 21 has been fitted onto the inner cylinder 42 in order to improve inlet flow conditions, preventing vena contracta phenomena and inlet pressure losses. Inside the passage 12, the flow first passes the constant flow area part 12b and then the diffuser part 12c in which dynamic pressure is recovered. The flow leaves the passage 12 at the outlet 12d where it enters the chamber 2. Inside the second chamber 2, the general flow direction turns 90 degrees, both in plane AA and in plane CC, before entering an outlet pipe 4.

From the flow inlet 12a to the flow outlet 12d of the helical passage 12, the flow in total turns 360 degrees inside the silencer casing. Thus, the length of the passage is approximately $\pi$ times the casing diameter, contributing to a very low acoustical natural frequency $f_e$, constituted by the passage 12 and the chambers 1 and 2. In FIG. 8, the length of the casing 7 is only slightly in excess of the diameter. The embodiment thus demonstrates how, by adopting a helical passage between chambers according to the invention, it has become possible to achieve a much lower natural frequency than with a straight passage.

Examples of particularly relevant applications of the embodiment of FIG. 8 are silencers for buses or trucks where there is space for a rather big silencer volume, given by a casing of a rather big diameter but of a short length. Even though the flow turns considerably inside the casing, the associated pressure loss is remarkably low. In spite of the embodiment being truly three-dimensional, the essentially 1-dimensional dimensioning method of the invention applies. Naturally, an accurate description of the fluid-flow and acoustic properties of the silencer should be three-dimensional. However, this is also the case in silencers wherein the acoustic field and the flow field is substantially two-dimensional. It should also be pointed out that, in spite of the three-dimensional flow path through the embodiment of FIG. 8, the device can be manufactured by rather simple members and by simple methods like sheet pressing, rolling, welding, etc.

Many types of silencers with helical flow patterns inside the casing are known from the prior art. However, in known silencer embodiments, helical flows have been desired for reasons differing from those of the present invention. Thus, for example, very efficient sound absorption has been achieved by adopting helical channels made by perforated cylinders in contact with absorptive material. Another reason for adopting helical internal flow in silencers has been to achieve a spark-arresting effect by increasing the residence time for exhaust gasses inside a silencer.

The helical configuration of the invention allows the engineer to select the length of the connecting channel 12 very freely and to optimize this length according to the method of the invention. Thus, when a very low natural frequency is desired, even substantially more than 360 degrees turning of the passage will be beneficial in some cases. An example of this could be a truck application, for which it is desired to attenuate infra-sound created by the engine when running at low speed at engine start-up or at hauling operation of the truck. Attenuation of infra-sound is further relevant in connection with gas turbine power stations. In other cases, less than 360 degrees flow turning in the helical passage can be appropriate, e.g. with higher ignition frequencies of engines, and when it becomes essential not to create too low resonant frequencies of the helical passage.

To the silencer design engineer, it is obvious that the goals addressed by the embodiment shown in FIG. 8 can be achieved by many variations in design configuration. As an example, the flow-widening of the diffuser 12c can be achieved by varying the diameter of the inner cylinder 42. A helical passage can be fitted into a cubic casing instead of into a cylindrical casing. The wall 8, separating the chamber 1 from the chamber 2, can be a cylinder, and the chamber 2 can be arranged essentially outside the chamber 1, which is favourable from a shell noise emission point of view, since the sound level inside the chamber 1 is higher than inside the downstream chamber 2.

FIGS. 9a and 9b show an embodiment of a device according to the invention in which a monolith, e.g. a catalyser, is built into a two-chamber silencer with a helical passage connecting the two chambers. The first chamber 1 is a flat, cylinder-like volume at the top of the silencer. The second chamber is divided into two parts 2a and 2b, the division being established by an annular monolith 100. Sound absorbing material, Ba, is contained within a central cylinder 42, a perforated top sheet 41, and a solid bottom plate 8. The helical passage 12 is delimited by a cylindrical silencer casing 7, by the top part of the cylinder 42, and by two helical sheets 60 and 61. Usually, a catalytical monolith has rather thin walls, in which case it only to a very limited extent causes an acoustical subdivision of the second chamber of the silencer. Thus, the sub-chamber 2a, the sub-chamber 2b, and the gas part (the porosities) of monolith 100 together constitute a single silencer chamber from an acoustical point of view. This second chamber is separated from the first chamber by the plate 8, by the cylinder 42, and by the walls of helical passage 12, i.e. sound can only pass from the chamber 1 to the second chamber via the passage 12.

Gas enters chamber 1 from an inlet pipe 6 and a diffuser 10 and turns approximately 90 degrees around the vertical silencer axis before entering the helical passage 12 at the inlet 12a thereof. At this inlet, a cylindrical rod 21 is fitted onto helical sheet 60 so as to prevent 'vena contracts' inlet flow.

Within the helical passage 12, the flow rotates slightly more than 360 degrees around the silencer axis while flowing slightly downwards before leaving the passage 12 at the outlet 12d where it passes into the chamber 2a. Here, the flow is distributed around the annular inlet face of the monolith, at the same time changing its direction from tangential to axial flow due to the axial flow channels within the monolith. After leaving the monolith, the direction of the flow becomes tangential in the chamber 2b, from which the flow leaves the silencer by a pipe 4.

FIGS. 11a–j illustrate a number of variations of helical and spiral passage forms and embodiments incorporating helical passages, being special cases of curved passages.

Figure 11A:
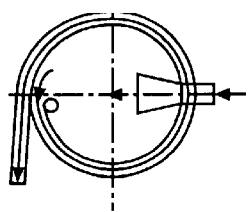
FIG. 11a shows a cross section of a cylindrical silencer with a tail pipe which is composed of a helical or spiral part and a short, straight part. The helical/spiral part is wound around the cylindrical casing.
Figure 11B:
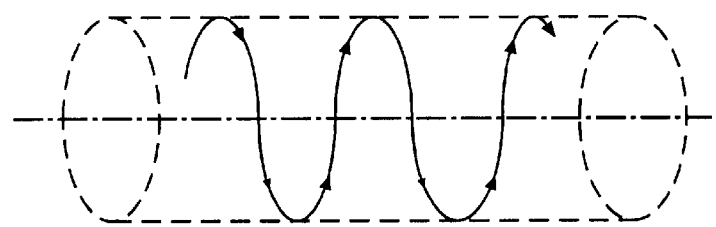
FIG. 11b shows a screw-like helical generatrix form of a passage.
Figure 11C:
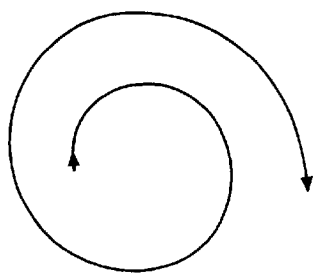
FIG. 11c shows a plane, spiral generatrix form of a passage.
Figure 11D:
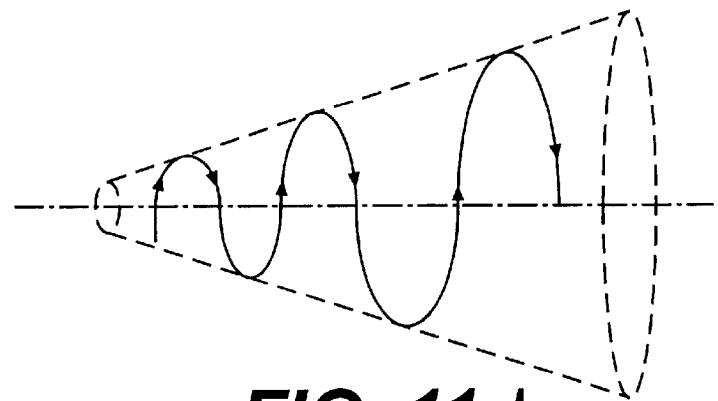
FIG. 11d shows a conical, screw-like generatrix form for a passage, as an example of the winding radius varying along the longitudinal direction.
Figure 11E:
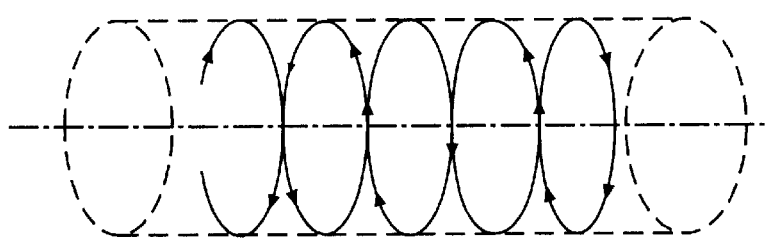
FIG. 11e shows a winding generatrix form for a passage, with an upstream part extending in one direction, and a downstream part extending in the opposite direction. This combination can be useful for a passage in a silencer for which the inlet and outlet passages of the silencer are placed at the same end of the casing.
Figure 11F:
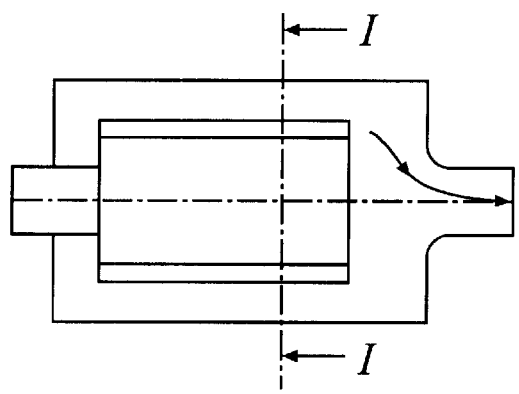
Figure 11G:
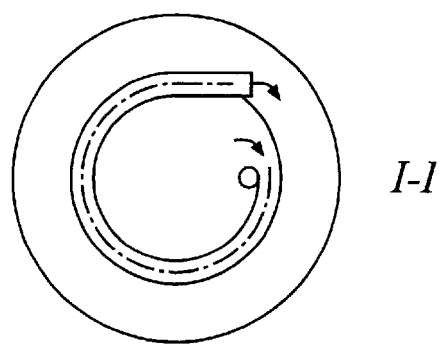

FIGS. 11f and 11g are sketches of an embodiment of a device according to the invention in which a first chamber is contained within a second chamber, the generatrix of the connecting passage being a plane spiral. In the drawing, the cross section of the passage is rather wide. Alternatively, the passage cross section (of area a) could be much more narrow, depending on the intended cross section area ratio A/a.

Figure 11H:
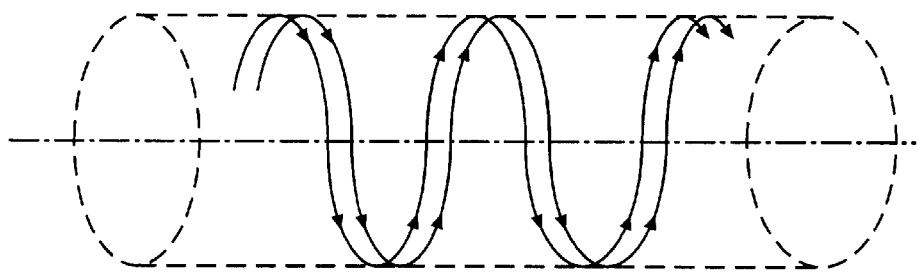

FIG. 11h shows two parallel, screw-like helical generatrix forms, which can be adopted for a helical passage being divided into two parallel passage parts.

Figure 11I:
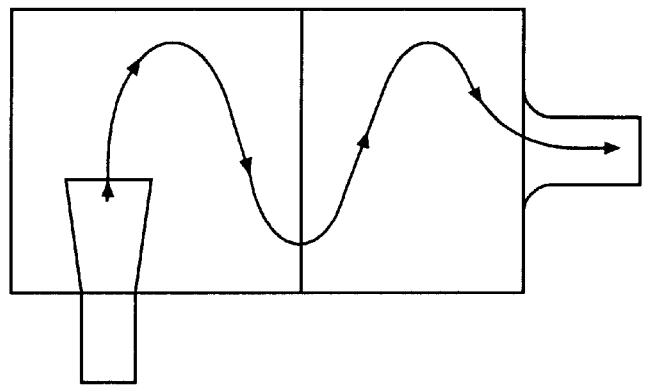

FIG. 11i illustrates how a curved passage form can be adopted, both for providing a prolonged passage, and for reducing the change of flow direction within a chamber. For example, this principle can be combined with a division into two or more parallel passages (as illustrated above), in case of an inlet passage being arranged sidewise onto a silencer casing of a rather small diameter. In this way, big pressure losses and swirl within the first chamber can be avoided.

Figure 9A:
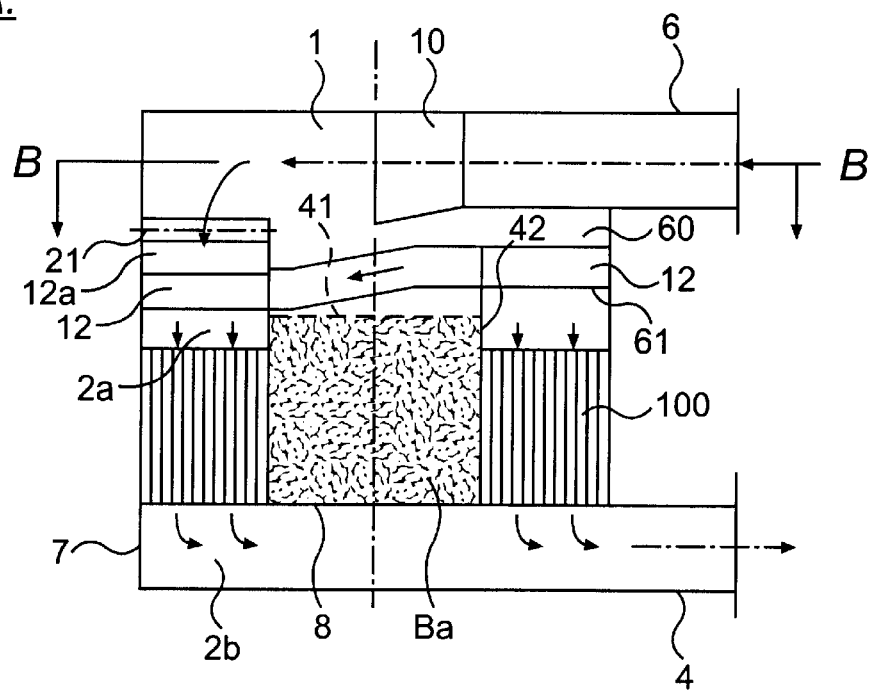
Figure 9A:
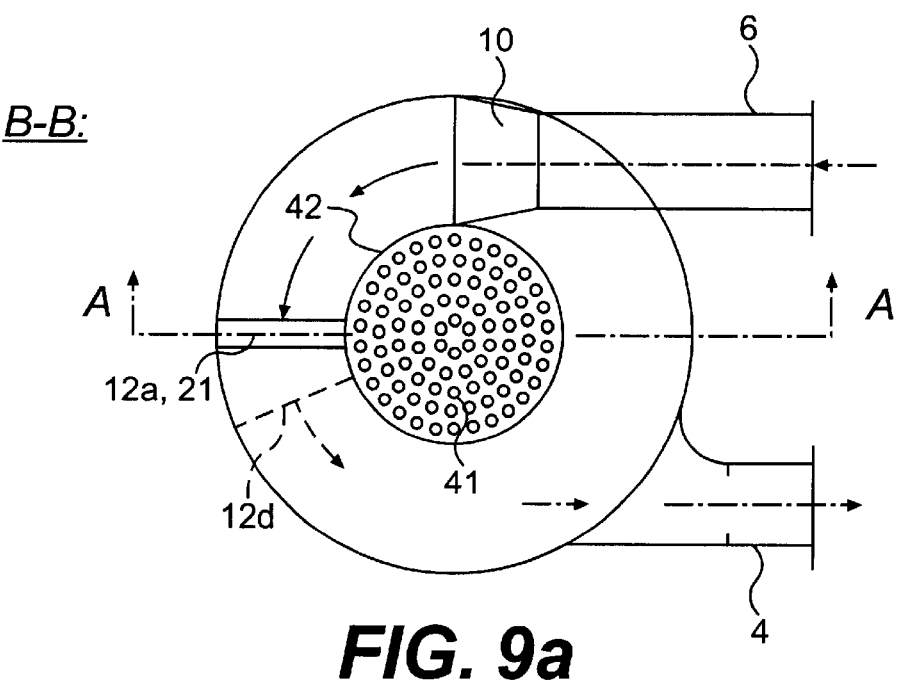
Figure 10A:
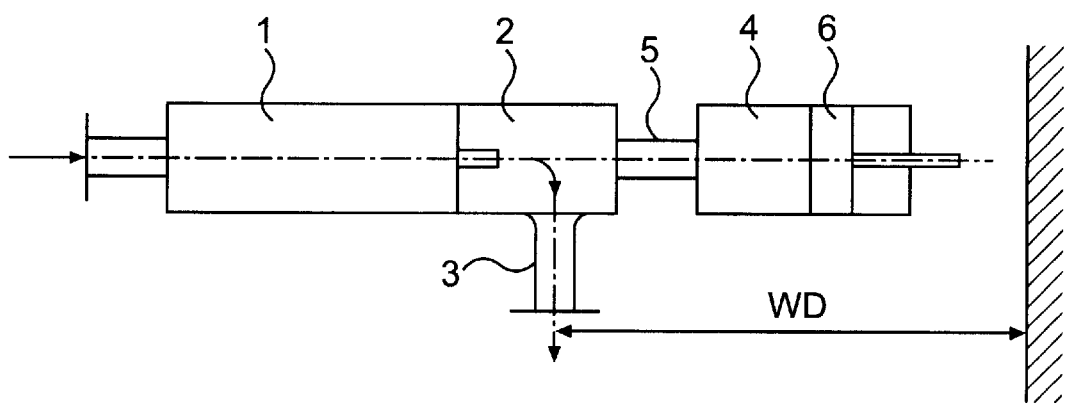
Figure 10B:
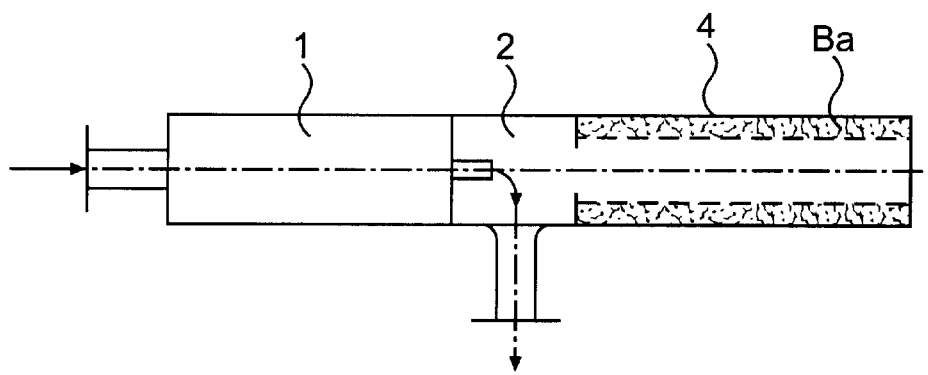
Figure 11J:
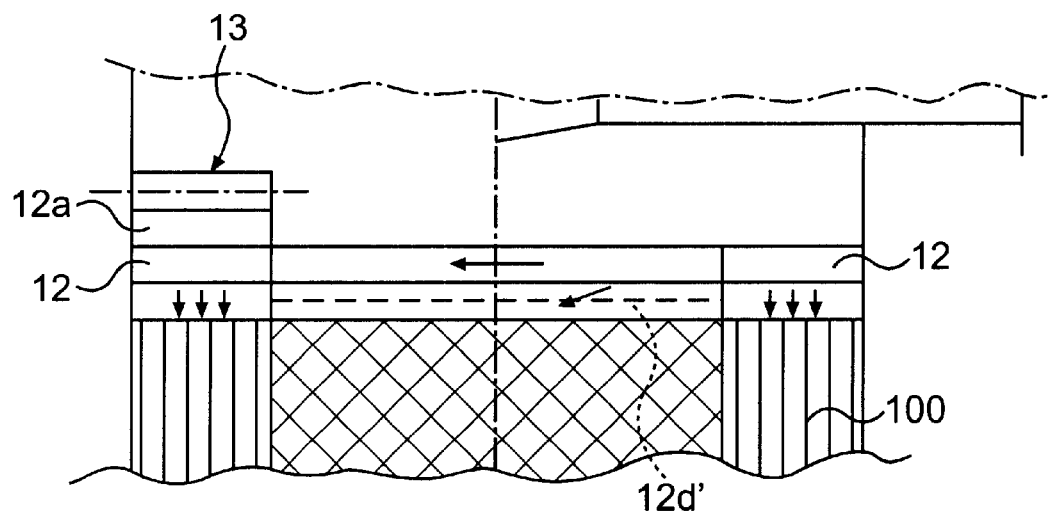

FIG. 11j shows a detail of an embodiment of the invention being a variation of the embodiment shown in FIG. 9. In addition to a helical passage outlet 12d, a secondary outlet 12d' has been added in FIG. 11j. Thus, part of the flow leaves the passage through the outlet 12d and the rest through the secondary outlet 12d'. Both flow parts leave the passage in a tangential direction within the annular spacing above the monolith 100. By adding the outlet 12d', the flow distribution to the face of the monolith can be improved. Further improvement in this respect can be achieved by adding further outlets to the passage.

As in the present embodiment demonstrates how a helical passage can be used to build in a long passage connecting two chambers of a rather short, cylindrical silencer. The tangential outflow at 12d ensures a very even flow distribution to the many, parallel channels of the monolith. Even though the total flow turning within the device is substantial, the pressure loss is rather small. The device is a very compact, flow-friendly silencer in which it has become possible to build in a monolith of a significant as in the preceding embodiment volume.

The principles of the invention allow the engineer to adopt many forms of chambers and connecting passages, retaining efficient damping of all sound frequencies, and in particular it provides the engineer with tools for obtaining sufficient damping of low frequencies, even when the available space is narrow. Exhaust system layouts may, e.g., differ substantially from one truck or bus model to another. Sometimes a silencer is required to be of a relatively small outer diameter, but may be allowed to be rather long. In other cases other requirements may exist: The silencer can be allowed to be of a relatively large outer diameter while its length is restricted. Sometimes pipes leading exhaust gas to and from a silencer are required to enter or leave at opposite ends, sometimes at the same end of the silencer, sometimes in line with the silencer, sometimes at an angle, etc.

In many cases, silencers are required to be of a cylindrical design, since this form is rather easy to manufacture. But other forms may also be appropriate, e.g. elliptical, squared or conical forms.

Below some general design principles are outlined, which will provide engineers with tools for retaining optimal silencer performance complying with a broad array of geometric conditions. Following this, the general principles will then be exemplified by specific design cases. There will be two points of focus for optimal design and dimensioning: Chambers and connecting passages.

Figure 1:
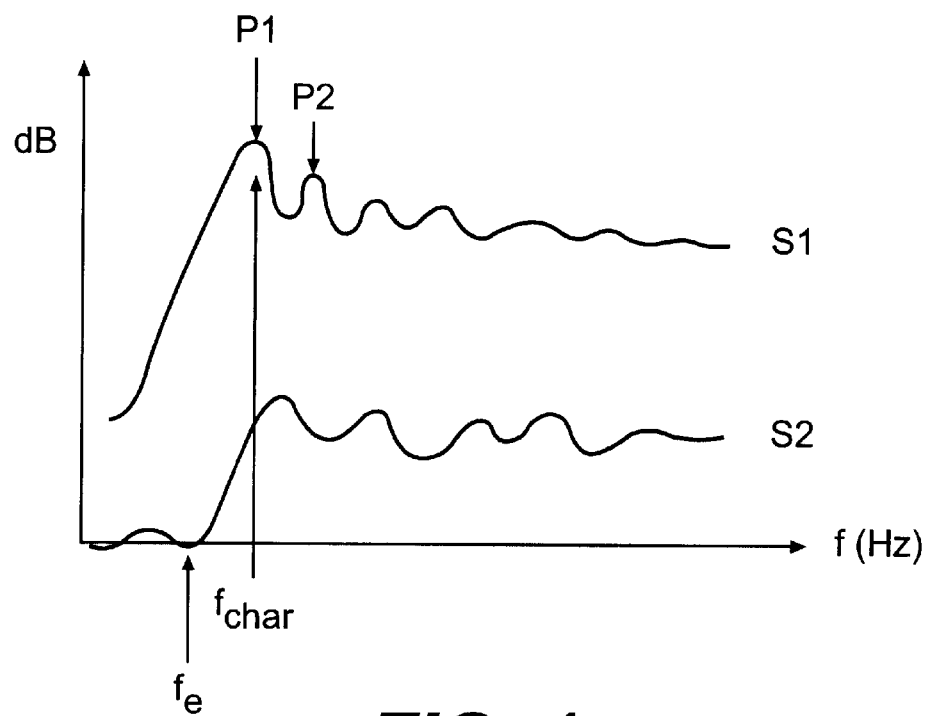
Figure 2:
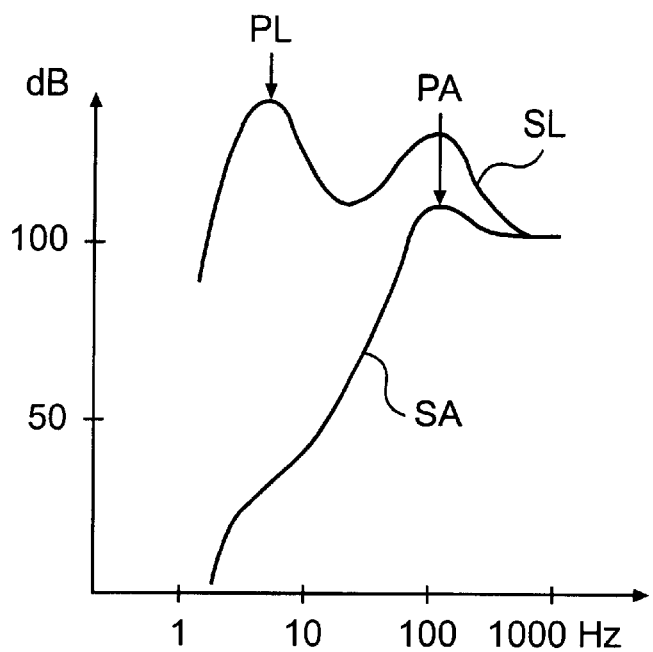
Figure 4:
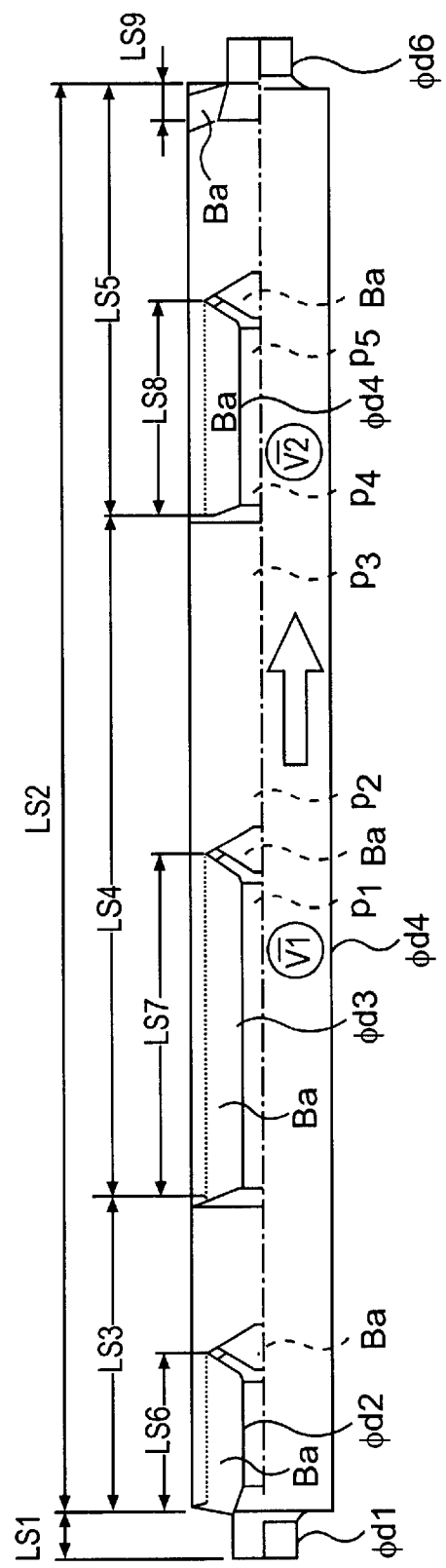
Figure 5:
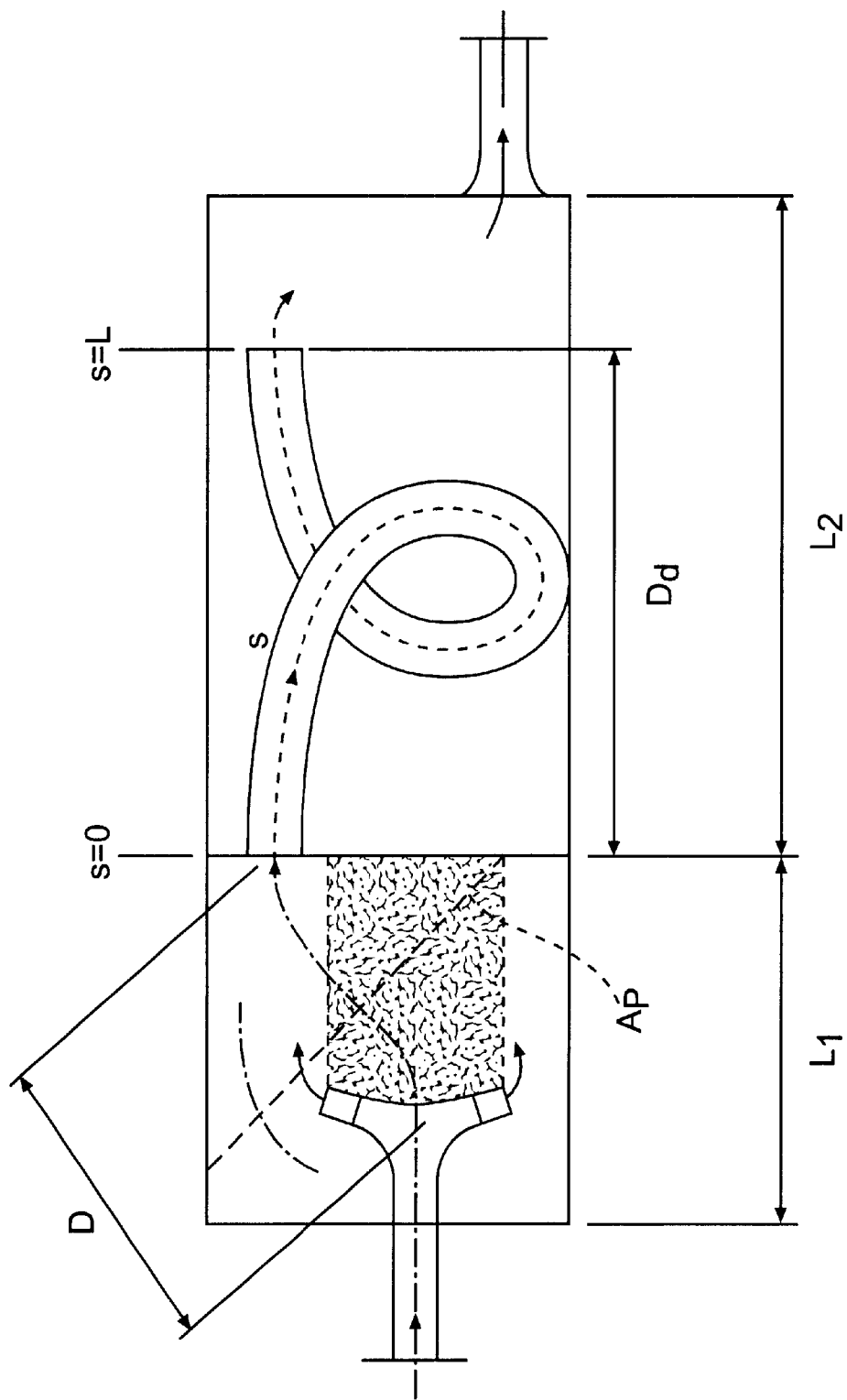
Figure 6:
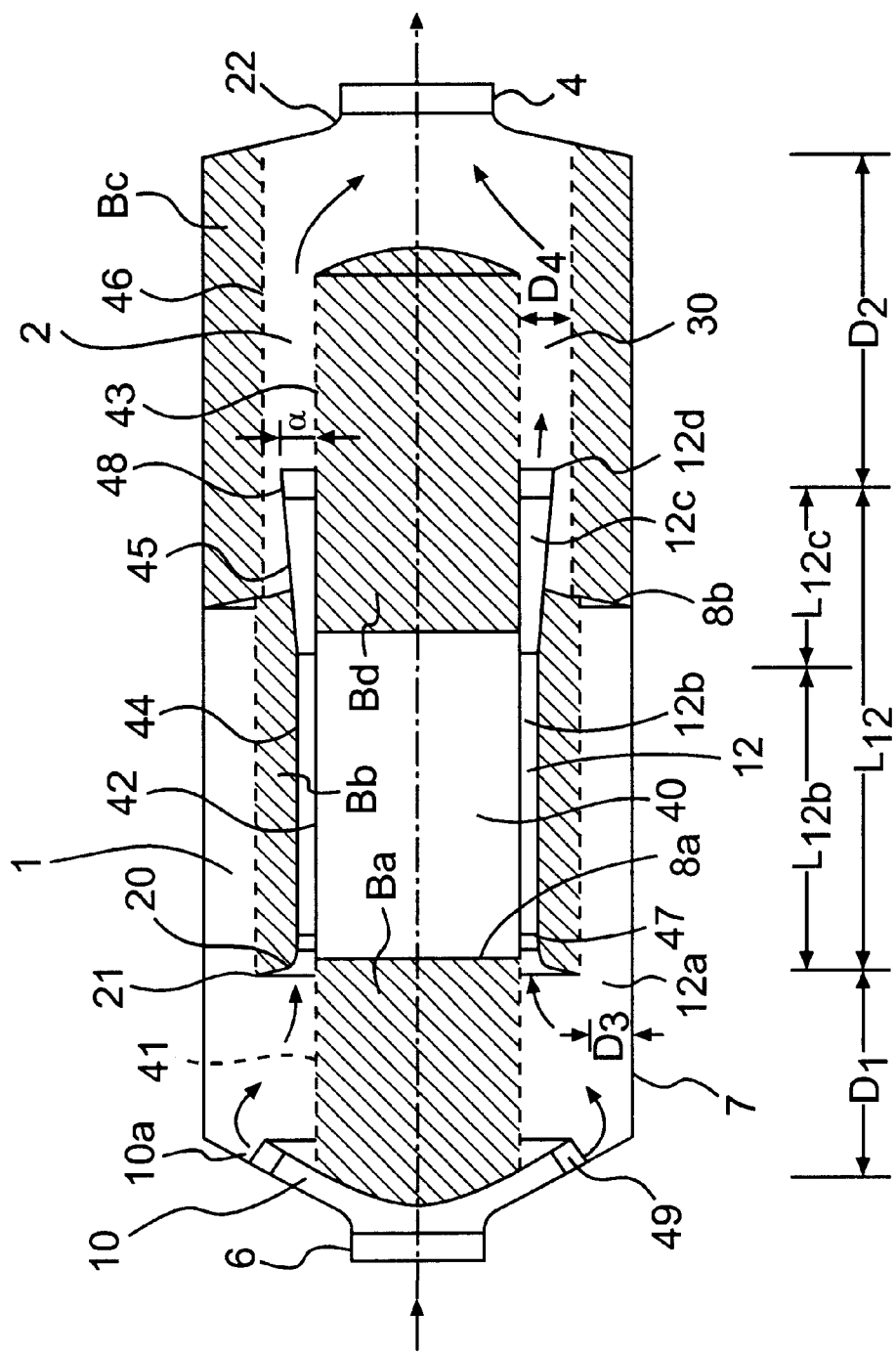

In the following, reference is made to FIG. 5. Here, $A_p$ is a chamber cross-section area, measured perpendicular to the main flow trajectory in the chamber. D is the straight line distance between the inlet to the chamber and the outlet from the chamber. s is a co-ordinate along the generatrix of a curved passage connecting two chambers. The passage length along the generatrix is L. $D_d$ is the direct straight line distance in space between passage inlet and outlet, obviously, $D_d$ is shorter than L. $L_1$ and $L_2$ are the lengths of the first and second chambers, respectively.

Chambers should be of a sufficient size and of an appropriate form for sound reflections to exist in an effective way at transitions of cross-sectional area and for avoiding major eddies or swirl which could otherwise cause excessive pressure drop and undesired self-generated noise.

If equation (3) is inspected in isolation, one might be led to the false conclusion that even with very small chambers it is possible to achieve an arbitrarily low natural frequency, provided the passage can be made arbitrarily long. This is, however, not true. The reason is that various phenomena, not included in the simple acoustic filter model underlying equation (3) will distort the damping effect. One problem is that small chambers may reduce or eliminate sound reflections at chamber inlets and chamber outlets. Another problem is that low-frequency resonance may be set up in connecting passages which may destroy low-frequency sound damping. Too small chambers will only serve as transfer elements which lead flow from one passage to another.

Devices according to the invention may include such small chambers, e.g., for the purpose of smoothly deflecting flow. But at least one, and often more, chambers in silencers should be sufficiently large to serve as effective elements in acoustic filters.

Accordingly, such chambers should fulfil the following two criteria:

(I) the mean cross section area A of a chamber should be at least 4 times the largest of the two cross section areas $a_1$ and $a_2$, respectively, of passages leading gas to and from the chamber, respectively, (II) the chamber volume V should at least be of the size:

$$V \geq 8(\sqrt{a_{1+a_2)/2}})^3.$$

Apart from this chambers may have many alternative forms for various applications.

When determining A and V, sound absorptive material should be regarded as empty space. The reason is that such material, for functioning properly as an absorbent, should not be packed too solidly or otherwise arranged in such a way that sound waves cannot enter the material rather freely. Thus, although the absorptive material is usually placed behind perforated plates for protection, the degree of perforation should not be too small.

In cases of complicated geometry, the cross section area A of the chamber should be interpreted as the mean value along the mean trajectory for sound waves travelling from chamber inlet to chamber outlet. Usually, this trajectory more or less coincides with the flow trajectory.

As a further guidance for interpreting A and V properly, it should be understood that all chamber parts in full acoustic communication with other parts of the chamber should be included. Thus, guide plates, various other chamber internals etc. should not cause a narrow restriction of A and V to such area and volume elements, respectively, which can be 'seen' directly from the trajectory through the chamber. In addition to the above-mentioned criteria, a third criterion can be added which, as has been exemplified above, in silencers according to the invention, is often applied to at least one chamber:

(III) the flow trajectory within a chamber should turn significantly.

Typically, this can be quantified as follows:

(III') the total change of flow direction from chamber inlet to chamber outlet should be at least 90 degrees.

Thereby sound waves are prevented from shortcutting the chamber, shortcutting being a acoustic field phenomenon which may more or less hamper the acoustic filter effect, depending upon the geometry. Significant shortcutting will occur if a chamber outlet is placed close to, and aligned with, the inlet to the chamber.

However, when the distance between inlet and outlet is big, the shortcutting effect becomes small.

Regarding pressure losses across a silencer, application of criterion (III) is admittedly negative. However, when the chamber is designed properly from a fluid-dynamical point of view, the added pressure loss associated with flow turning inside the chamber can be kept moderate and may be justified because of improved sound damping. Usually, more deflections or turnings are justified when silencers are applied to engines that are only moderately sensitive to backpressure. Thus, more turnings inside chambers will, e.g., be applied to silencers for reciprocating engines than for silencers applied to gas turbines.

Sometimes narrow space limitations for silencers and chambers create a desire for a short straight-line distance between chamber inlet and outlet. The detailed geometry is then to a great extent determined as a balancing between abruptness of turning (preventing acoustic shortcutting) and prevention of flow instabilities. For a given type of geometry, the distance can (in design considerations or in experiments) be shortened down to a certain threshold, below which moderate turbulence will rather quickly turn into major flow instability, with large eddies, flow separation, etc.

This leads to a further mandatory criterion for chambers:

(IV) For a chamber fulfilling criterion (III) and/or (III') and for which overall silencer design and dimensioning demands as short a straight-line distance D as possible between chamber inlet and outlet, D should be selected to the value below which flow instability occurs in the chamber, plus a reasonable safety margin, which can normally be set in the interval of 10–50% of said straight-line distance.

The safety margin allows for variation due to a number of factors which are difficult to control, such as: Varying gas temperature, manufacture tolerances, or non-linear and destabilizing effects of gas pulsation. Those familiar with modern fluid dynamic science will appreciate that flow instability to some extent escapes today's detailed physical understanding. Nevertheless, criterion (IV) can be handled by the practical engineer in systematic experiments.

It should be noted that insertion of a diffuser to the chamber inlet lessens the instability-driving forces inside the chamber and therefore eases the design task.

Sometimes guide plates or similar devices can be fitted into chambers to stabilize the flow and help it to turn or deflect in an ordered way, preventing instability. Guide plates should not be of such a size or placed in such a way that they will cause acoustical isolation of certain chamber elements or division of a chamber into two or more sub-chambers.

Apart from flow instability driven by strong flow turning inside a chamber, a second type of instability may occur in poorly designed silencer chambers: Major swirl following a round contour inside a chamber. In the case of a cylindrical chamber, the entire volume may be caused to rotate (swirl) around the axis of symmetry. Like all types of flow instability, this phenomenon may cause excessive pressure drop and self-generated noise.

The two main risk factors related to this such flow instability are:

the degree of 'roundness' of the chamber, the extent of provoking fluid-dynamic forces, mainly due to tangential in- and outlets.

The roundness can be lessened by modifying the chamber form or by fitting in plates or other components into the chamber. Sometimes appropriately formed sound absorptive elements, in the form of perforated plates protecting mineral wool, may serve the double purpose of adding sound absorption and making a cylinder less round. In some cases radially extending plates can be used for preventing swirl.

It is important that such elements do not pose major obstacles to the flow passing through the chamber. However, it is normally not difficult to avoid such major obstacles. The reason is that swirl of the described type generally is associated with flow directions which deviate strongly from the main trajectory of flow from inlet to outlet inside the chamber.

This has been illustrated above.

A fifth mandatory chamber design criterion can now be formulated:

(V) When there is a risk of major swirl occurring in a chamber, its geometry should be modified by inserting one or more elements which will pose one or more restrictions to such swirl. Such a modification of the geometry should be made in a way that it does not pose great obstacles to the flow from chamber inlet to chamber outlet.

Sometimes the general geometrical conditions allow the silencer designer to select the length of connecting passages rather freely. In other circumstances there is a strong impetus to find ways of making the length of a chamber-connecting passage or of a tail-pipe longer than what seems possible with known silencer geometries. An example of this is when two or more chambers are to be fitted into a rather short silencer casing, in which case it may seem difficult to avoid a short connecting passage, which leads to a rather high natural frequency and rather poor damping of low-frequent sound.

If the designer disregards pressure drops, it is not difficult for him to achieve long passages by adopting one or more sharp turnings of the passage. However, this seldom leads to good performance and is in accordance with the present invention.

Flow-friendly, long passages can be created by subdividing the passage into two or more, parallel passages, each having smaller transverse dimensions. For example, a circular pipe may be subdivided into several smaller-diameter pipes, whose aggregate cross-sectional areas equal the cross sectional area of the single, larger-diameter pipe. Smaller transverse dimensions allow for sharper turnings, since 'flow-friendliness' is very much related to the ratio between radius of curvature and transverse dimension.

As a general criterion, applicable to both single and multiple parallel silencer passages, the following may be prescribed:

(VI) When passages diverge from straight forms, causing the general flow trajectory within the passage to bend or turn, the passage form should be such that the radius of curvature of the trajectory nowhere along the trajectory, or at least almost nowhere, is smaller than the smallest transverse size of the passage, as measured perpendicular to the trajectory tangent at the point of inspection.

Subdivision of passages is feasible in some circumstances. Drawbacks with this route to prolonged passages are: Increased manufacturing costs and added skin friction pressure losses in the passages.

A way of increasing passage length, which deviates strongly from prior silencer art, but which can be very efficient, relies on utilizing the third dimension when selecting the form of a passage. In many cases, this can be done conveniently by selecting a helical form for the passage (as has been shown in detail above), but alternative forms are also possible.

The general idea is that the prolonged passage fulfils one of the following two criteria, or both:

(VII) the acoustically effective length L of the passage is at least 1.5 times the direct and straight distance in space between the passage inlet and outlet, (VIII) the acoustically effective length L of the passage is at least equal to:

in case the passage connects two chambers: the sum of the lengths of the two chambers, in case the passage is a tail pipe from a silencer: the length of the chamber being connected to the atmosphere by the tail-pipe.

Helical and other passage forms are in addition characterized in that:

(IX) the mean trajectory of the passage is not contained within a plane surface.

A necessary condition for a prolonged passage to provide effective low-frequency sound damping is that the chamber, or the chambers, to which the passage is connected, fulfils at least both above-mentioned criteria (I) and (II). Thus, helical or other prolonged passage forms should not be adopted in combination with inadequate chambers, as explained above.

Criteria (VII) and (VIII) are based on the concept of 'acoustically effective length L'. In principle, L should be measured along the mean trajectory for acoustic energy propagation within the passage. Usually, this will coincide more or less with the mean flow trajectory.

In most cases, prolonged passages according to the invention are made with solid walls, not allowing acoustic energy to deviate from the passage through the walls, since this would hamper the acoustic function of the passage in combination with the one or more chambers to which it is connected. However, to a limited extent perforations or other openings in the walls of the passage can be permitted, in particular when the passage is made longer than what is necessary to provide a sufficiently low natural frequency. Thus, a long passage could for instance have perforations along part of its length, combined with sound absorptive material being placed on the other side of the perforated part.

The principle of using a helical passage form can also be applied to the tail pipe, i.e. the pipe leading exhaust gas from a silencer to the exterior environment, such as the atmosphere. For example, a helical pipe can be wound round a cylindrical casing, ending up with a short straight end section of the tail pipe. The helical pipe may also be extended backwards, into the last chamber of the silencer, to provide a smooth outflow in tangential direction. This configuration can be used to achieve a low natural frequency of the system constituted by the tail pipe and the last chamber, even when the exhaust to the exterior environment is prescribed to be positioned close to the silencer. This is a frequent situation in trucks and busses with silencers placed close to a front wheel and with sidewise exhaust from the vehicle.

Figure 12:
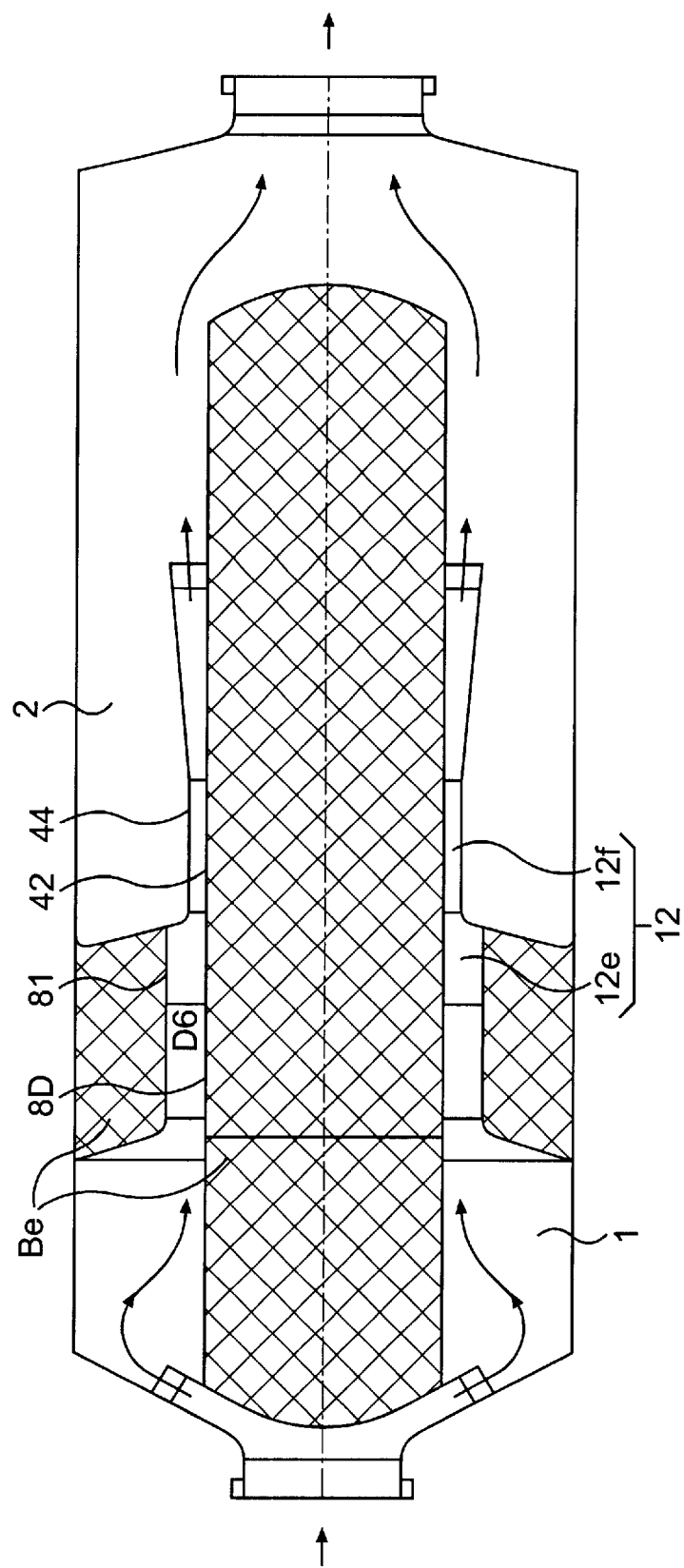

FIG. 12 shows a further embodiment of the invention in which an annular passage leading flow from a first chamber 1 to a second chamber 2 is made up of two main parts 12e and 12f, the first part being an annular passage confined within two perforated, cylindrical walls 80,81, both separating sound absorptive material (Be) from gas flow within said passage, the second passage part 12f being confined within gas-tight walls 42, 44. In the example of the figure, the second annular passage part is further subdivided into a first constant area flow part, and a second part in which the flow area increases in flow direction, thus forming a diffuser as in previously shown embodiments.

The first annular passage part 12e forms a per se well-known type of absorptive sound attenuating element. In such an element sound absorption increases with decreasing channel width, D6. On the other hand, this width cannot be made arbitrarily small, since a high gas flow velocity will cause sound absorptive material to become abstracted and may incur too big pressure losses. However, in the arrangement shown in FIG. 12 the dynamic pressure head at the exit from the absorptive, annular passage part 12e is essentially recovered in the downstream diffuser of the second passage part. Thus, the embodiment allows for a rather narrow passage width D6, increasing the effectiveness of the absorptive function of the absorptive element.

The silencing devices designed according to the principles disclosed herein open up new possibilities for realistically operating vehicles in a manner which is economically and environmentally more acceptable than was possible with conventional silencers, in that the new silencer designs make possible hitherto unattained combinations of small external dimensions, high sound-attenuation efficiency and low back pressure. In the following, aspects of the invention are discussed which relate to such new and advantageous ways of operating vehicles. As will be understood from the discussion and from the results of the experiments reported in the examples herein, the silencer design principles of the present invention, when suitably utilised in combination with either conventional engine systems or—especially—newer, more advanced engine systems, result in increased engine efficiency and improved engine economy. This is particularly true when the low or extremely low back pressure rendered possible by the new silencers is utilised by adapting the engine parameters thereto, by suitable engine system selection and/or suitable engine system regulation adapted to the new possibilities offered by the silencers.

One such aspect of the invention relates to a method of operating a vehicle comprising a combustion engine and a silencing system, the silencing system comprising a silencer, optionally an exhaust connecting pipe and optionally a tail pipe, said method comprising adapting the silencing system so that its maximum back pressure contributed by the silencing system is at most 1000 mmWG, the silencer being a silencer as defined in claim 142.

For passenger cars, however, where very high back pressures are conventionally accepted, even back pressures of 1500 mmWG or as high as 2000 mmWG will, in many instances, constitute valuable and relevant improvements compared to prior art technology.

It is preferred that the silencer is a silencer according to the present invention. In most cases, the maximum back pressure can be lower than mentioned above, and back pressures of at the most 800 mmWG, or more preferred at the most 700 mmWG, such as at the most 600 mmWG, at the most 500 mmWG or at the most 400 mmWG. Beneficially low back pressures which are obtainable in practice utilizing the new silencer principles are back pressures of at the most 380 mmWG, such as at the most 360 mmWG, at the most 340 mmWG, at the most 320 mmWG, or even at the most 300 mmWG or at the most 280 mmWG.

When the silencing system comprises a tail pipe, and a diffuser element is provided at or near the outlet of the tail pipe and/or at least part of the tail pipe constitutes a diffuser, the maximum back pressure may be as low as is at the most 200 mmWG or even as low as at the most 150 mmWG.

Advantages of operating a vehicle/silencer system at such a low back pressure are evident, cf., for instance, the data and comments given in the experimental examples which follow (bearing in mind that 1000 mmWG is about 10 kPa).

With the silencer devices according to the principles disclosed herein, the above low or extremely low back pressures are obtained at acceptable or better exhaust noise levels and at external dimensions of the silencers which are the same as or smaller than conventional silencers for the same purpose. Thus, in most cases, the total exhaust noise from, e.g., a heavy truck or a vehicle comparable therewith equipped with a silencer designed according to the principles disclosed herein is at the most 72 dB(A), the total exhaust noise being defined as the total exhaust noise generated exclusively by the exhaust system and measured according to ISO 362. However, the silencer design principles disclosed herein allow considerably lower noise ratios with retainment of low back pressures, such as a total exhaust noise level of at the most 69 dB(A), at the most 66 dB(A), at the most 63 dB(A), or even as low as at the most 60 dB(A), at the most 57 dB(A) or even at the most 54 dB(A). Vehicles which are comparable with a heavy truck are, e.g., a bus, and a military vehicle, such as a tank, or any other heavy power driven vehicle. When the vehicle is a passenger car or van, the total exhaust noise will normally be lower, such as is at the most 51 dB(A) or at the most 48 dB(A).

With respect to noise reduction, it is important to note that official directives will become more and more restrictive in the future, which means that the importance of the combination of low back pressure and efficient sound attenuation in silencers fulfilling all requirements with respect to external size will increase in the future. The invention will make it possible to obtain optimal silencer solutions also under more stringent requirements.

An example of official sound attenuation requirements appears from the below table, which shows requirements according to EEC Directive 92/97/EEC. The table shows sound level limiting values expressed in dB(A), measured according to ISO 362 as total noise. (As noted above, the values given in the foregoing for noise levels from exhaust systems of heavy trucks are based on the noise from the exhaust system exclusively and are therefore lower than the values given in the directive).

| Vehicle categories | Values expressed in dB(A) |
|---|---|
| Vehicles intended for the carriage of passengers, and comprising not more than nine seats including the driver's seat | 74 |
| Vehicles intended for the carriage of passengers and equipped with more than nine seats, including the driver's seat, and having a maximum permissible mass of more than 3, 5 tonnes and: | |
| with an engine power of less than 150 kW | 78 |
| with an engine power of not less than 150 kW | 80 |
| Vehicles intended for the carriage of passengers and equipped with more than nine seats including | |

-continued

| Vehicle categories | Values expressed in dB(A) |
|---|---|
| the driver's seat; vehicles intended for the carriage of goods: | |
| with a maximum permissible mass not exceeding 2 tonnes, | 76 |
| with a maximum permissible mass exceeding 2 tonnes but not exceeding 3, 5 tonnes Vehicles intended for the carriage of goods and having a maximum permissible mass exceeding 3, 5 tonnes: | 77 |
| with an engine power of less than 75 kW | 77 |
| with an engine power of not less than 75 kW but less than 150 kW | 78 |
| with an engine power of not less than 150 kW | 80 |

Utilising the principles of the present invention, it will be possible to keep total exhaust noise limits (that is, total exhaust noise deriving exclusively from the exhaust system and measured according to ISO standard 362) which are well below the limits given in the above table. Not only will it be possible to keep noise levels which are, say, at least 5, at least 8 or at least 11 dB below the values stated for the respective types of vehicles above. Based on experience with the systems designed according to the principles of the present invention, it will also be possible, without the size of the silencers becoming limiting or excessive and with no or moderate sacrifice in performance compared to the excellent values disclosed herein, to obtain noise values which are very much lower than the respective values in the table, such as at least 14 dB lower, or at least 17 dB or at least 20 dB lower, and even values which are at least 23 dB lower or at least 26 dB lower are possible utilising the silencer systems according to the invention.

The vehicle may be a hybrid which, in addition to the combustion engine, comprises electrical, hydraulic, or other drive means.

The combustion engine is normally a spark ignition engine or a compression ignition engine or a gas turbine engine. In a most interesting embodiment, the engine is a supercharged engine, such as a turbocharged engine, and the operation of the engine is improved by allowing the engine to utilise the improved air supply rendered possible through the relatively low back pressure. The lower back pressure permits a higher pressure drop across the turbine of the turbocharger, thereby allowing a higher boost pressure and/or an improved air supply rate. In many cases, this beneficial method of operating the engine will be performed "automatically" as soon as the combination of the engine system with the particular silencer system has been established, as the control systems of many modern engines will be capable of adapting its operation to the new operation conditions rendered possible through the lower back pressure. Thus, the lower back pressure will result in a lower load of the engine at constant torque and rpm, resulting in a lower specific fuel consumption. Another beneficial effect of the self-adaptation of the engine control system is the possibility of obtaining a higher power and/or torque from a particular engine size. When the engine is a supercharged engine, the lower back pressure will give rise to particularly improved operation.

However, the method of this aspect of the invention also opens up the possibility of performing modifications of the engine system specifically aimed at adapting the engine system to the possibilities made available through the lower back pressure. As examples of this may be mentioned increasing the maximum fuelling rate as allowed by the improved air supply by use of electric, electronic, mechanical, hydraulic or any other kind of engine control system and/or injection control system.

Thus, the maximum fuelling rate may be increased by adapting the engine operating conditions, such as one or more of the following conditions:

A constant excess air ratio (lambda) may be maintained by use of electric, electronic, mechanical, hydraulic or any other kind of engine control system and/or injection control system. The lambda value may be measured continuously by means of a lambda sond placed in the exhaust system, typically in the manifold immediately downstream of the engine. Hereby, the engine operation conditions may be optimised to the additional air supply which will be the result of the lower back pressure, in particular in a supercharged engine.

The fuel injection timing may be adapted, both with respect to the point in time when fuel injection is started and with respect to the duration of the fuel injection, by use of electric, electronic, mechanical, hydraulic or any other kind of engine control system and/or injection control system.

In some supercharged engines, the boost pressure that can or should be managed by the engine is limited compared to the inherent boost pressure capacity of the supercharger. In such cases, it is customary to supply the supercharger with a "waste gate", a safety valve which limits the boost pressure downstream of the charger. When operating the engine together with a silencer with a low back pressure in accordance with the present invention, the engine is subjected to a smaller load and can therefore handle a somewhat larger boost pressure, for which reason an embodiment of this aspect of the invention comprises adapting the waste gate to the higher pressure limit which can be handled by the engine.

When the compressor of the supercharger, e.g., the centrifugal compressor of a turbocharger, is provided with variably adjustable vane guides, these vane guides may be adjusted to optimise the turbocharger performance under the conditions, made possible by the low back pressure silencer, of higher available pressure difference across the turbine powering the compressor, In a spark ignition engine, the spark timing may be adapted by use of electric, electronic, mechanical, hydraulic or any other kind of engine and/or injection control system.

The fuel system can be replaced with a fuel system with increased capacity, such as a large pump displacement, or a common rail fuel system may be installed and/or adapted to the conditions made possible through the lower back pressure.

The engine may be a turbo compounded engine in which a turbine or other expansion device is utilised to convert exhaust energy to mechanical work, such as mechanical work for driving one or more generators for generating electrical energy and/or supplying additional mechanical energy to the engine output shaft.

A type of engine which will benefit much from the method of the invention is a multiple stage turbocharged engine using two or optionally more turbochargers operating in series and/or in parallel.

The engine may be an engine which utilises recirculation of exhaust gasses for the purpose of reduction of harmful exhaust emissions, such as oxides of nitrogen.

It may be advantageous to adjust the engine displacement volume in accordance with the improved air supply by one or more of the following measures:

- replacing the engine with another engine having a smaller displacement volume,
- reducing the displacement volume of the engine by means of a reduction of the engine stroke,
- reducing the displacement volume of the engine by means a reduction in the cylinder bore diameter and piston diameter.

Another interesting measure which becomes realistic due to the present invention is to adapt the gear ratios in a power transmission system of the vehicle in accordance with the improved engine efficiency resulting from the reduction in back pressure.

The reduction in back pressure will result in a reduction of the specific fuel consumption of the engine, provided the engine is run under otherwise substantially comparable conditions (it should be noted, however, that the reduction in back pressure will result in a reduction of the specific fuel consumption and an increase of maximum output).

Thus, the specific fuel consumption of the engine at full load may be reduced by at least 1% per 1000 mmWG reduction in back pressure, such as at least 1.5% per 1000 mmWG reduction in back pressure or at least 2% per 1000 mmWG reduction in back pressure or at least 2.5% per 1000 mmWG reduction in back pressure. Fuel consumption reductions of at least 3%, at least 3.5%, at least 4%, at least 4.25%, at least 4.5%, at least 5% or at least 5.5% per 1000 mmWG reduction in back pressure are also realistically obtainable in the method of the invention.

Expressed in another way, by the method of the invention, the specific fuel consumption of the engine at full load is may be reduced by at least 1% per 1000 mmWG reduction in back pressure at substantially constant fuel flow rate. This reduction may be at least 1.5% per 1000 mmWG reduction in back pressure at substantially constant fuel flow rate, or at least 2% per 1000 mmWG reduction in back pressure at substantially constant fuel flow rate, at least 2.5% per 1000 mmWG reduction in back pressure at substantially constant fuel flow rate or at least 3% per 1000 mmWG reduction in back pressure at substantially constant fuel flow rate.

As mentioned above, the power output of the engine will be improved due to a lower back pressure. Thus, the power output of the engine may be improved by at least 5% per 1000 mmWG reduction in back pressure while maintaining the same excess air ratio at maximum load. Higher values, such as improvements of at least 7.5%, at least 8%, at least 9%, at least 10% or even at least 11% per 1000 mmWG reduction in back pressure while maintaining the same excess air ratio at maximum load are obtainable using the method of the invention.

The invention also relates to a method of operating a spark-ignited or compression-ignited engine and a silencing system, the silencing system comprising a silencer, optionally an exhaust connecting pipe and optionally a tail pipe, the engine being a stationary engine or an engine placed on a ship, an oil-rig or a barge, said method comprising adapting the silencing system so that its maximum back pressure contributed by the silencing system is at most 400 mmWG, the silencing system being a system as defined in claim 211. Lower values of the maximum back pressure may be obtained in these cases, such as at the most 300 mmWG, at the most 200 mmWG, at the most 100 mmWG or even at the most 50 mmWG.

The total exhaust noise in connection with these systems run according to the method of the invention, as measured at a specified measurement point according to noise limits specified for exterior noise at buildings and other premises inhabited by people, may be at the most 50 dB(A), such as at the most 45 dB(A), at the most 40 dB(A), at the most 35 dB(A), at the most 30 dB(A), at the most 25 dB(A) and as low as at the most 20 dB(A).

Also in this case, the engine is suitably a supercharged engine, such as a turbocharged engine, and the method comprises allowing the engine to utilise the improved air supply rendered possible through the relatively low back pressure. The maximum fuelling rate may be increased as allowed by the improved air supply by use of electric, electronic, mechanical, hydraulic or any other kind of engine control system and/or injection control system, using measures comprising adapting the engine operating conditions, such as one or more of the following conditions:

- maintaining a constant excess air ratio (lambda) by use of electric, mechanic, hydraulic or any other kind of engine control system and/or injection control system,
- adapting the fuel injection timing by use of electric, mechanic, hydraulic or any other kind of engine control system and/or injection control system,
- adapting, where applicable, the adjustment of a possible waste gate,
- varying adjustment of optional variable vane guides provided in the turbine of a turbocharger, so as to optimize turbocharger performance,
- adapting, in a spark ignition engine, the spark timing by use of electric, mechanic, hydraulic or any other kind of engine and/or injection control system,
- using a fuel system with increased capacity, such as a large pump displacement, or installing or adapting a common rail fuel system.

Like in connection with the vehicles mentioned further above, the engine may also in these cases be a turbo compounded engine in which a turbine or other expansion device is utilised to convert exhaust energy to mechanical work, such as mechanical work for driving one or more generators for generating electrical energy and/or supplying additional mechanical energy to the engine output shaft. The engine may advantageously be a multiple stage turbocharged engine using two or optionally more turbocharges operating in series and/or in parallel. The engine may be an engine which utilises recirculation of exhaust gasses for the purpose of reduction of harmful exhaust emissions, such as oxides of nitrogen.

The engine displacement volume may be adapted in accordance with the improved air supply by one or more of the following steps:

- replacing the engine with another engine having a smaller displacement volume,
- reducing the displacement volume of the engine by means of a reduction of in the engine stroke,
- reducing the displacement volume of the engine by means a reduction in the cylinder bore diameter and piston diameter.

The gear ratios in a power transmission system may be adapted in accordance with improved engine efficiency resulting from the reduction in back pressure.

Also for these types of engines, important reductions in specific fuel consumption are obtainable. Thus, the specific fuel consumption of the engine at full load may be reduced by at least 1% per 1000 mmWG reduction in back pressure, such as by at least 1.5% per 1000 mmWG reduction in back pressure, e.g., at least 2% per 1000 mmWG reduction in back pressure or at least 2.5% or at least 3%, at least 3.5%, at least 4%, at least 4.25% or even at least 4.5%, at least 5% or at least 5.5% per 1000 mmWG reduction in back pressure.

In these systems, the specific fuel consumption of the engine at full load may be reduced by at least 1% per 1000 mmWG reduction in back pressure at substantially constant fuel flow rate, such as at least 1.5%, at least 2%, at least 2.5%, at least 3%, at least 5% or even at least 7.5%, at least 8%, at least 9%, at least 10% or at least 11% per 1000 mmWG reduction in back pressure at substantially constant fuel flow rate.

The invention also relates to a method for controlling one or several function parameters of a combustion engine, the method comprising:

continuously or intermittently measuring the back pressure generated by at least a back-pressure generating part of the exhaust system connected to the engine, generating a signal representative of the back pressure, passing the signal to a processing unit which controls at least the spark ignition time of the cylinders, determining, in the processing unit, at least one of the one or more function parameters as a function of at least the signal representative of the back pressure.

The function parameters may comprise one or more of the following parameters: pressure in the fuel supply system, spark ignition time, fuel injection valve opening time, exhaust valve opening time and/or inlet valve opening time (both the exact time at which the exhaust and/or inlet valve and/or the fuel injection valve open and/or close and the time span during which the valves are open), air-fuel ratio, pressure in the air inlet system, idle rpm.

When the combustion engine is spark ignited, one interesting function parameter is the spark ignition time of individual cylinders, and the method may further comprise causing spark ignition in response to the determined spark ignition time.

Another aspect of the invention is a method for adjusting one or more function parameters of a combustion engine connected to an exhaust system comprising a catalyst monolith and/or a particle filter monolith, the method comprising continuously or intermittently monitoring the increase of mean value back pressure at least partly caused by depositions in the monolith(s) and intermittently or continuously adapting the one or more function parameters to the increased back pressure.

Of course, the signal or signals derived from the monitoring of the increase of the mean value back pressure may also be used to generate an alert signal or message indicating that the monolith is due for exchange or cleaning within a particular time frame In a four-stroke engine, the relatively low back pressure is beneficial with respect to the work consumed (or, in the case of a supercharged engine, the work generated) by the engine during the exhaust cycle.

EXAMPLE 1

FIGS. 13–15 are tables showing effects of varying exhaust back pressure on a turbocharged 180 kW Scania DS908 diesel engine loaded in a test rig.

It can be seen from the tables that increased back pressure will adversely affect static engine performance parameters. Maximum output decreases, whereas specific fuel consumption increases, exhaust gas temperature increases (causing increased mechanical loading) and Bosch smoke numbers increase. It is known from the literature that engines in general, and in particular turbocharged engines, are sensitive to back pressure. Depending on the engine type, 100 mbar increased back pressure will typically cause up to around 4% increase in specific fuel consumption.

It shoud noted that increased back pressure at higher rpms significanly reduces the charge (or boost) pressure delivered by the turbocharger compressor. Since charging increases engine output and in general improves fuel economy, this observation explains why turbocharged engines are particularly sensitive to back pressure.

In the experiments illustrated in FIG. 14, the fuel/air ratio was kept constant while varying the back pressure. It can be observed that with this type of fuel control, maximum engine output at higher rpms drops severely at increased back pressure. This is particularly interesting, since modern diesel engines with electronically controlled fuel injection equipment have boost pressure and exhaust temperature sensors fitted as standard inputs to the control system. Such equipment allows the engine to run at pre-set fuel/air ratio, thereby optimising performance.

It is, furthermore, common to equip modern diesel engines with a manifold compensator (LDA) device, which at low loads restricts injector pump delivery at low boost pressures and progressively increases delivery as boost pressure rises. Under transient conditions, this will result in increased benefit from lower engine back pressure, due to time lag in turbocharger performance. Thus, if an output increase is required, e.g., when a vehicle accelerates, boost pressure will increase faster, whereby engine output and acceleration both increase. It can also be assumed that under transient conditions, additional back pressure influence on specific fuel consumption will be seen.

Also, there are indications that at transient operating conditions there may be an enhanced improvement in specific fuel consumption of lowered back pressure, as compared to static conditions.

The silencer of the invention has proved to be capable of reducing back pressures dramatically, when compared to state-of-the-art silencers in comparable circumstances. For example, with the same silencer volume, the pressure drop across the silencer can be reduced from 2000 mm wg by more than 50%, with even better silencing effect. The resulting improvement in engine performance can be estimated to be equivalent to the extent of improvement obtainable over several years by improving engine technology, resulting from massive development efforts on the part of the world's major engine manufacturers.

EXAMPLE 2

An engine test was carried out at The Centre for Automotive Engineering of the University of Stellenbosch to quantify the advantages of reducing the exhaust back pressure using a silencer designed according to the principles of the present invention. A turbo-charged ADE 366T which was equipped with a silencer of the type described herein was used for the tests. Back pressure was progressively increased with the aid of a flow control valve between the engine and the silencer while the performance was measured.

Exhaust back pressure was found to have a significant effect of engine power output, specific fuel consumption and exhaust gas temperatures. An increase in exhaust back pressure from 0.5 kPa to 12.3 kPa was found to reduce power output at maximum torque by as much as 3.2% while the specific fuel consumption rose by as much as 3.9%. The increased back pressure was responsible for an increase in exhaust temperature of as much as 34° C. which can be expected to have a detrimental effect on engine durability.

The results thus clearly illustrate that reduced exhaust back pressure is desirable and can significantly reduce engine running costs.

Details of the Testing

An ADE 366TI engine was installed on an engine test stand and equipped with a variety of measurement and control systems to enable the engine to be operated in an exactly controlled manner while the exhaust back pressure was varied. The ADE 366TI engine is a six cylinder, six liter turbo-charged engine rated at 125 kW at 2600 rpm. The engine was known to be in good condition with a correctly calibrated injection delivery pump. The exhaust system was equipped with a silencer unit of the type illustrated in FIG. 7 and having an outer diameter of 5" which resulted in a relatively low exhaust back pressure. In addition to the silencer a back pressure control valve was fitted between the silencer and the engine to enable the back-pressure to be increased artificially to levels well above those which resulted from the silencer.

The engine was then operated at two different speeds while at full load while the exhaust back pressure was increased progressively. The effect of the increasing back pressure on engine performance was then recorded. The tests were carried out at 2600 rpm (rpm) where the engine develops rated power and at 1560 rpm which is in the region where the engine develops maximum torque. Exhaust back pressure was varied from the value that resulted from the natural back pressure of the Silentor silencer unit up to values as high as 12 kPa.

A second evaluation was carried out in which the engine was held at the constant speed of 1600 rpm while the torque was varied from 50% of the full load at 1600 rpm to full load in a rapid transition similar to the driver of a vehicle applying the accelerator in a rapid manner. The increase in torque and other parameters was then measured. This transition test was carried out with the natural back pressure of the silencer which in this test set-up was determined to be 0.5 kPa at full load at 1600 rpm as well as with the maximum back pressure set at 10 kPa. The effect of the increased back pressure on the response of the turbo-charger and engine was then compared.

Results

The first observation that can be made is the fact that the normal back pressure that resulted from the silencer alone, with the back pressure valve fully opened, was relatively low being 0.5 kPa at 1560 rpm and 1.8 kPa at 2600 rpm. This was not surprising since the unit was expected to have low back pressure and since the unit used was of dimensions more suited for use with an engine developing over 250 kW. The advantage of the low natural back pressure was that the pressure could be adjusted through a wide range. The maximum value of 12 kPa that was achieved through the use of the back pressure control valve was not unrealistic since many vehicle operate with far higher back pressures.

Figure 16:
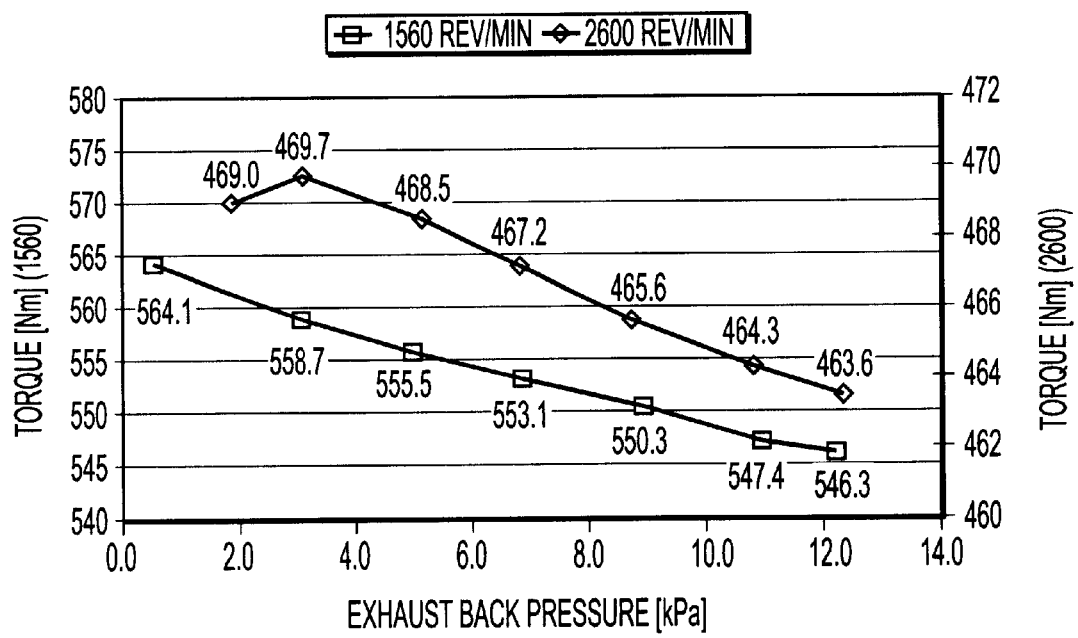

FIG. 16 (torque variation at two engine speeds with increasing exhaust back pressure) illustrates the response of torque to increasing exhaust back pressure from the minimum values resulting from the silencer to the maximum value achieved by closing the back pressure control valve. Torque clearly decreased as a result of the increasing exhaust back pressure with the decrease being 1.3% at rated speed and 3.2% at the mid speed and maximum torque condition. Rated power would thus be reduced by 1.3% while the power available in the mid speed region where the engine are typically utilised would be reduced by 3.2%.

Figure 17:
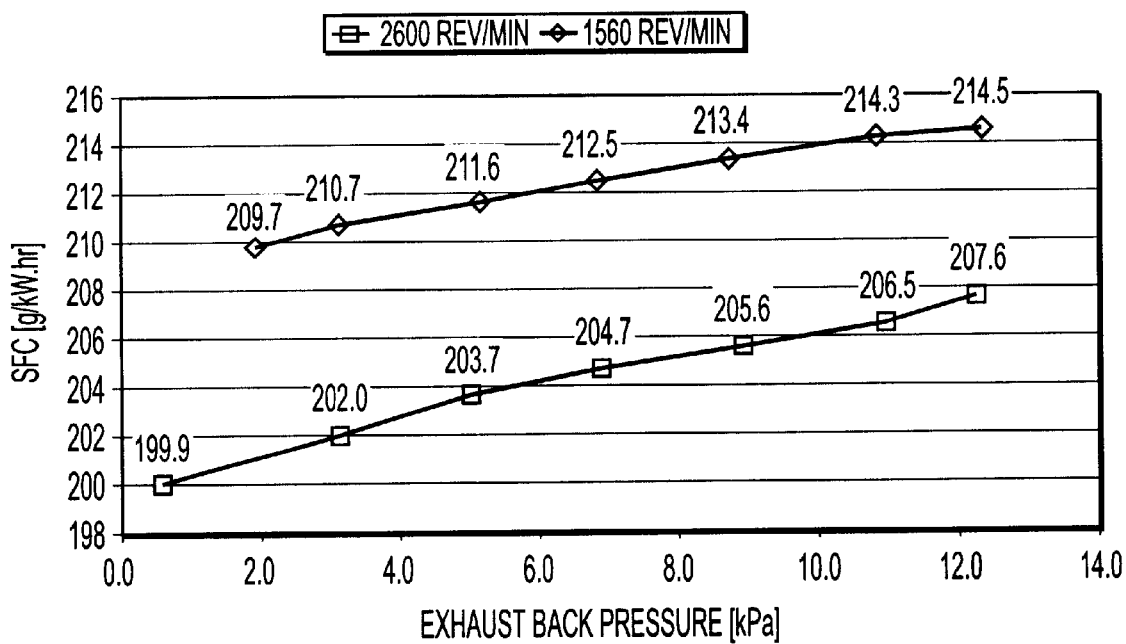

FIG. 17 (variation in Specific Fuel Consumption (SFC) with increasing exhaust back pressure at two engine speeds) illustrates that the Specific Fuel Consumption (SFC) increased in a consistent manner by a significant amount as the exhaust back pressure was increased. At rated speed the increase in exhaust back pressure from 1.8 kPa to 12.4 kPa resulted in an increase in the specific fuel consumption of 2.3%. At 1560 rpm the increase in exhaust back pressure from 0.5 kPa to 12.3 kPa resulted in an increase in SFC of as much as 3.9%. An increase in SFC of 3.9% in the mid speed region, where engines are most typically utilised, is extremely significant and would translate to a significant running cost penalty. Conversely, a reduction in exhaust back pressure could yield a significant improvement in vehicle running cost.

Figure 18:
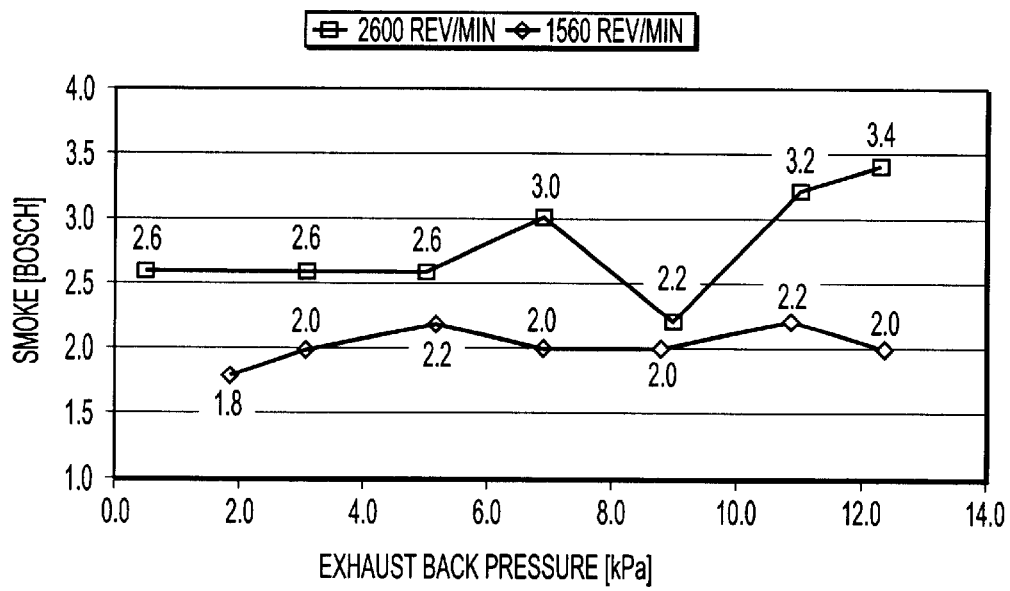

FIG. 18 (Exhaust smoke emission at two engine speeds with varying exhaust back pressure) illustrates that exhaust back pressure did not have a very significant or consistent effect on the exhaust smoke emission.

Figure 19:
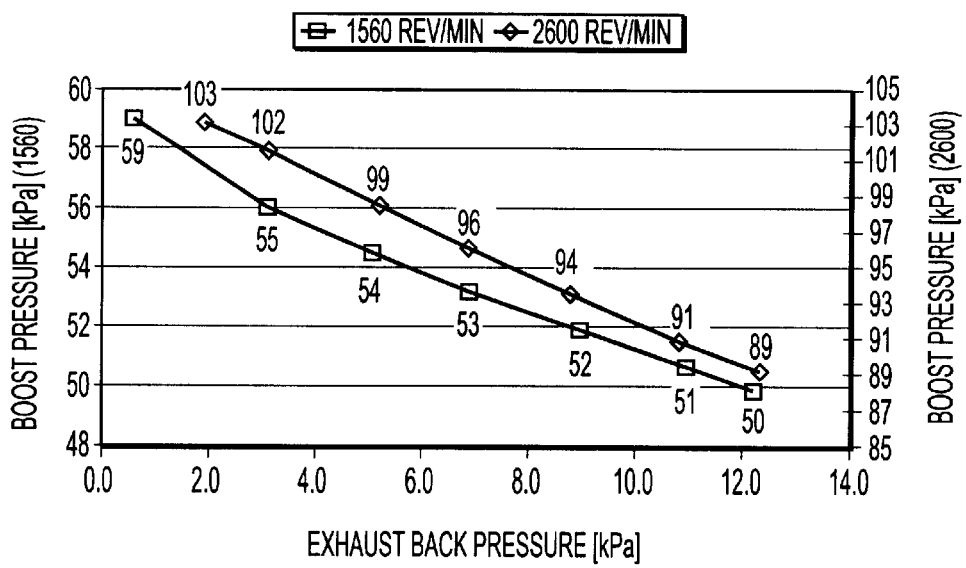

An explanation for the loss of efficiency of the engine with increasing back pressure can be found in FIG. 19 (turbo-charger boost pressure with varying back pressure). It can be seen that boost pressure decreased by 15% at 1560 rpm and 14% at 2600 rpm. Any loss in boost pressure is expected to result in an increase in SFC thus explaining the trends shown in FIG. 17. The reduced boost pressure and the accompanying decrease in air mass flow rate indicate a dramatic decrease in the turbo-charger power development which resulted from the increased back pressure.

Figure 20:
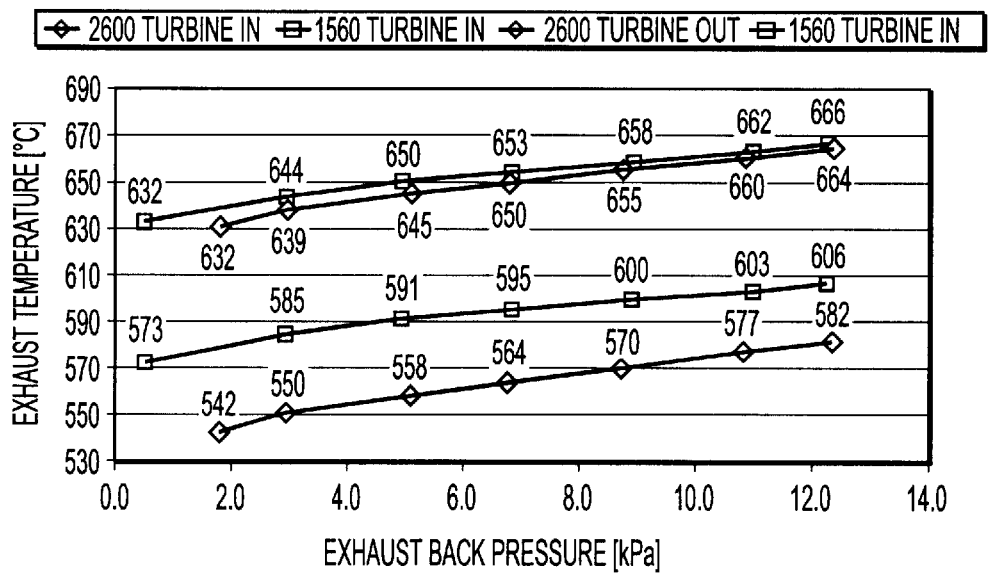

FIG. 20 illustrates that the exhaust gas temperature increased significantly with the increase in exhaust back pressure. The reason for the increased exhaust gas temperature is related to the reduced boost pressure which would have resulted in a reduced air throughput through the engine which would have reduced the air/fuel ratio. The increased exhaust gas temperature would be responsible for a significant increase in the thermal stresses in the cylinder head and the valves and would detract from durability.

Figure 21:
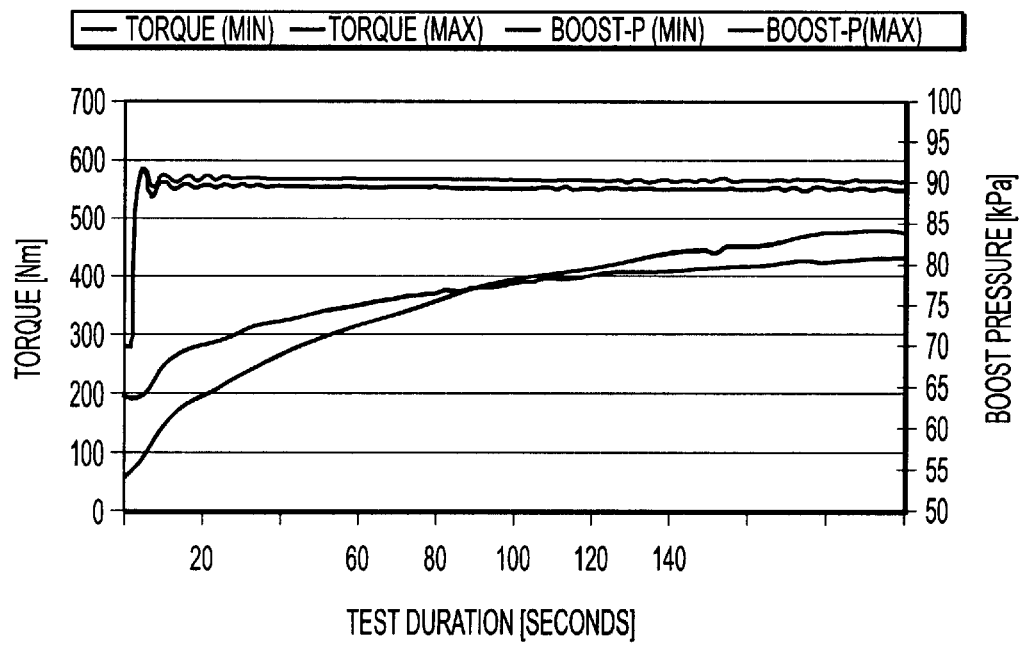

FIG. 21 illustrates the response of the engine with low and high back pressure during the transient test. Unfortunately the engine used for the evaluation has a relatively low boost pressure requirement for the injection pump to deliver maximum delivery and thus did not illustrate the full benefit of rapid turbo-charger response on transition. The two boost pressure curves illustrate a significant difference in the turbo-charger response with the low and high exhaust back pressure. In the case with the high back pressure the engine required higher boost pressure to achieve the 50% load condition thus started out with a higher initial pressure. When the load was increased the turbocharger responded slowly by only increasing the boost pressure by 20 kPa in approximately 200 seconds while in the test with the low back pressure the boost rose by almost 30 kPa in the same time. Since the fuel injection pump required less than 50 kPa of boost to achieve full fuelling the torque rose sharply despite the fact that boost pressure was still rising. Had the engine had a higher boost pressure requirement to enable full fuelling, as is the case with more modern and more powerful engines then the torque would have followed the boost pressure curve with the high back pressure delaying the development of full torque. It is nevertheless evident that the equilibrium boost pressure and torque are significantly reduced by high back pressure.

It is concluded that the exhaust back pressure had a significant effect on the, performance of the ADE 366T engine. The effect of back pressure on transient response has been shown to be more pronounced than the effect on equilibrium steady state operation. It is also concluded that the effect of varying back pressure on any turbo-charged engine would be of a similar magnitude thus the results are considered to be representative of the trends that can be expected for most diesel engines. More modern and higher performing engines are expected to be more sensitive to back pressure under transient conditions than the engines with lower boost pressures.

EXAMPLE 3

A test was performed at The Centre for Automotive Engineering of the University of Stellenbosch to assess the performance of a silencer designed according to the principles of the present invention fitted to a standard vehicle.

A test vehicle, a commercial turbo-diesel transport van, was equipped with a variety of instruments to enable the operation of the engine, the turborcharger and the waste gate systems to be monitored at a variety of speeds and loads. A series of chassis dynamometer tests were then carried out to identify typical values for all relevant parameters.

Figure 7:
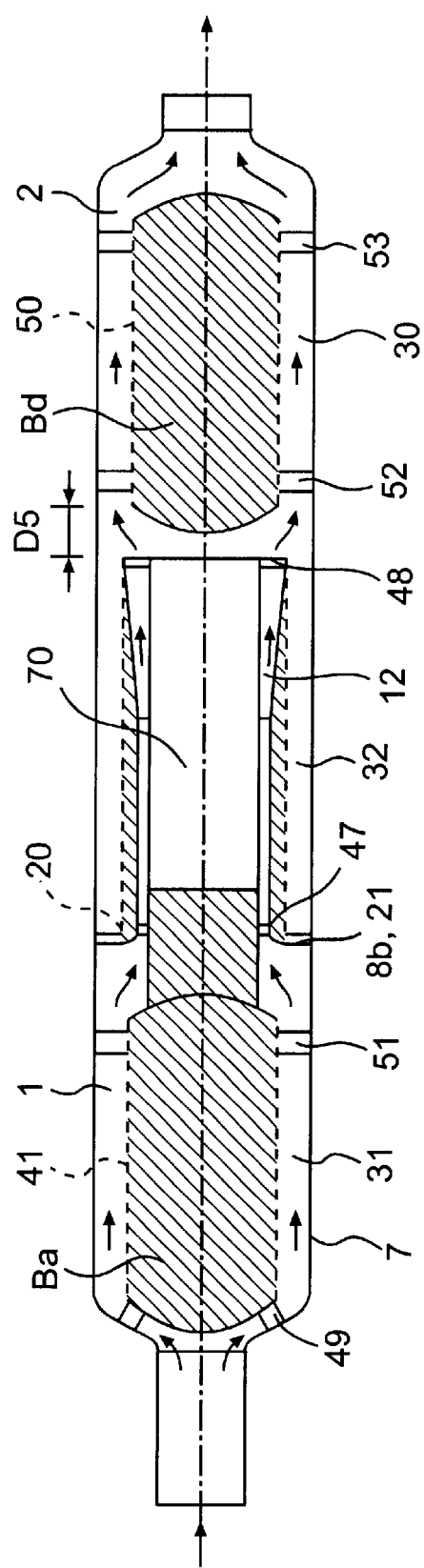
Figure 8A:
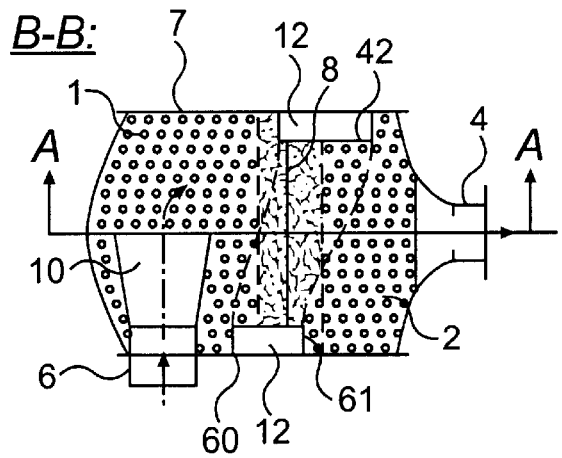
Figure 8B:
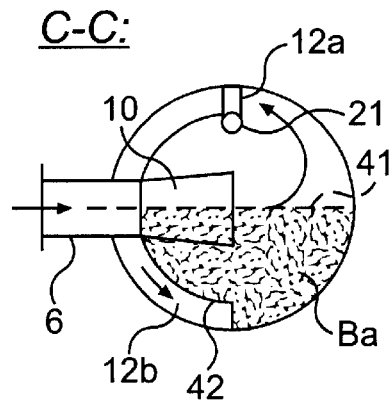
Figure 8C:
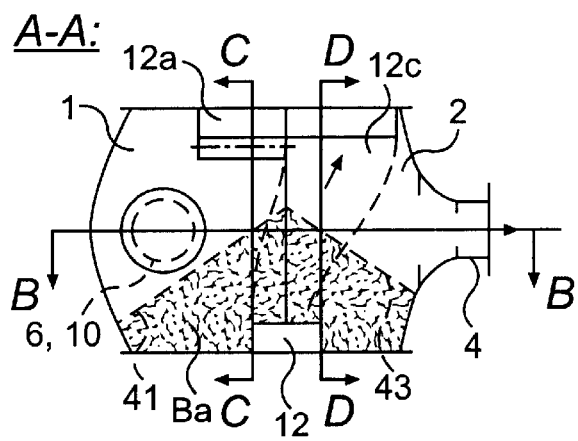
Figure 8D:
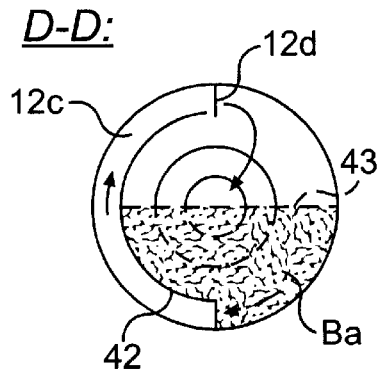
Figure 8E:
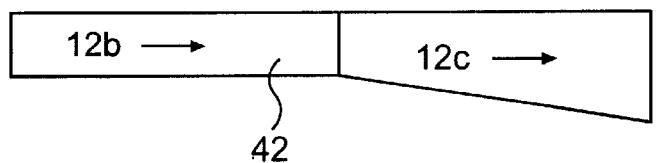

Tests were conducted to evaluate the performance of a silencer designed according to the principles of the invention, the silencer being a silencer as shown in FIG. 7 and being of a size suitable for the type of engine of the test vehicle. Two different tests where then carried out on the vehicle. Firstly, dynamometer tests were done to compare engine parameters such as exhaust temperatures, performance, smoke, etc. Secondly, the accelerations of the vehicle fitted with the different exhaust systems were compared on the road in an attempt to determine any differences in road performance.

Figure 22:
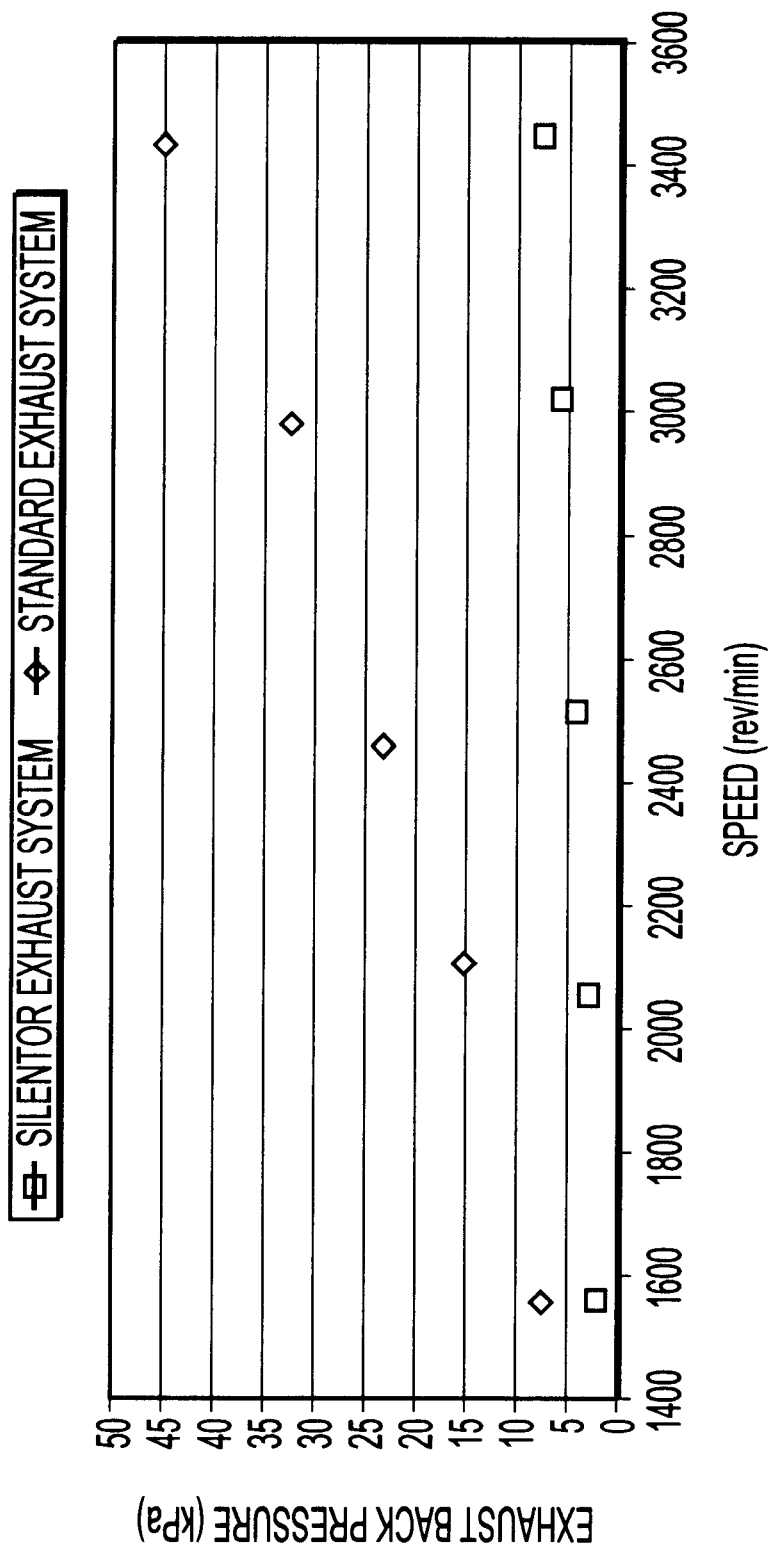

The results of these tests were excellent and indicated that the exhaust back-pressure on the vehicle fitted with the silencer designed according to the principles of the invention is significantly lower, as indicated in FIG. 22, which shows the exhaust back pressure of the exhaust system according to the invention and the standard exhaust system, respectively, throughout the speed range at full load.

What is claimed is:

1. A device for silencing a gas flow directed therethrough and being adapted for installation in a flow system, said device comprising:

a casing, at least one acoustic chamber and contained in the casing, said chamber being through-flowed by gas, at least one inlet pipe for leading gas into one of said at least one acoustic chamber, at least one passage of a length L and of a representative cross-sectional area a for leading gas from each one of the at least one acoustic chamber to another of the at least one acoustic chamber or to an exterior environment or an exterior chamber, optionally one or more monolithic bodies comprised in each of one or more of said at least one acoustic chamber, said device showing at least two through-flowed transitions of cross-sectional area for the flow of the gas between a relatively lower cross-sectional area $a_i$ and a relatively higher cross-sectional area $A_i$, the device fulfilling the following criteria:

(i) the average sound attenuation $\overline{\Delta dB}$ conferred by each transition of cross-sectional area, approximated by the following expression:

$$\overline{\Delta dB} = \frac{1}{n} k \sum_{i=1}^{n} \log_{10} \frac{A_i}{a_i},$$

n being the total number of transitions of cross-sectional area of the device, $A_i$ being the relatively higher cross-sectional area at the i'th transition of cross-sectional area of the gas flow, $a_i$ being the relatively lower cross-sectional area at the i'th change of cross-sectional area of the gas flow, k being a constant of the value 6.25 dB, is at least 8.0 dB when the device comprises no more than two acoustic chambers, 6.0 dB when the device comprises three acoustic chambers, 5.0 dB when the device comprises 4 or more acoustic chambers, (ii) the pressure loss across each acoustic chamber expressed as the dimensionless parameter $\zeta_j'$, defined as the ratio between the static pressure loss over the chamber and the dynamic pressure at a location in said passage:

$$\zeta_j' = \frac{\Delta p_j}{\frac{1}{2}\rho u^2},$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is at the most 1.0.

2. A device according to claim 1, the number of acoustic chambers within the device being denoted $\underline{m}$, wherein the approximated average sound attenuation $\overline{\Delta dB}$ conferred by each transition of cross-sectional area is at least 10.0 dB for m=2, 8.0 dB for m=3, 7.0 dB for m>3.

3. A device according to claim 2, the number of acoustic chambers within the device being denoted $\underline{m}$, wherein the approximated average sound attenuation $\overline{\Delta dB}$ conferred by each transition of cross-sectional area is at least 11.0 dB for m=2, 8.5 dB for m=3, 8.0 dB for m>3.

4. A device according to claim 3, the number of acoustic chambers within the device being denoted $\underline{m}$, wherein the approximated average sound attenuation $\overline{\Delta dB}$ conferred by each transition of cross-sectional area is at least 12.0 dB for m=2, 9.5 dB for m=3;

9.0 dB for m>3.

5. A device according to claim 1, wherein the approximated average sound attenuation $\overline{\Delta dB}$ conferred by each transition of cross-sectional area is at least 6 dB.

6. A device according to claim 1, wherein the approximated average sound attenuation $\overline{\Delta dB}$ conferred by each transition of cross-sectional area is at least 8 dB.

7. A device according to claim 1, wherein the approximated average sound attenuation $\overline{\Delta dB}$ conferred by each transition of cross-sectional area is at least 10 dB.

8. A device according to claim 1, wherein the approximated average sound attenuation $\overline{\Delta dB}$ conferred by each transition of cross-sectional area is at least 11 dB.

9. A device according to claim 1, wherein the approximated average sound attenuation $\overline{\Delta dB}$ conferred by each transition of cross-sectional area is at least 12 dB.

10. A device according to claim 1, comprising an absorption element having substantially no transitions of cross-sectional area contributing to sound attenuation, said absorption element contributing further to the sound attenuation conferred by the device.

11. A device according to claim 1, wherein sound absorptive material is provided within at least one of the at least one acoustic chamber.

12. A device according to claim 1, further comprising at least one diffuser for diffusing at least part of said gas flow through at least one of said at least one passage.

13. A device according to claim 1, wherein sound absorptive material is provided within each of the at least one acoustic chamber.

14. A device according to claim 1, wherein the local natural frequency, $f_e$, of at least one system comprising the gas of two consecutive acoustic chambers $AC_j$ and $AC_{j+1}$ and the gas of the passage interconnecting said two acoustic chambers, approximated by the following expression:

$$f_e = \frac{c}{2\pi} \sqrt{\frac{a}{L}\left(\frac{1}{V_j} + \frac{1}{V_{j+1}}\right)},$$

$V_j$ and $V_{j+1}$ being the volumes of the chambers $AC_j$ and $AC_{j+1}$ respectively, a being a representative cross-sectional area of the passage interconnecting the two consecutive acoustic chambers, L being the length of the passage, and c being the local sound velocity, is above 0.75 and at the most 0.95 times a characteristic frequency of the flow system.

15. A device according to claim 1, wherein the local natural frequency, $f_e$, of at least one system comprising the gas of two consecutive acoustic chambers $AC_j$ and $AC_{j+1}$ and the gas of the passage interconnecting said two acoustic chambers, approximated by the following expression:

$$f_e = \frac{c}{2\pi} \sqrt{\frac{a}{L}\left(\frac{1}{V_j} + \frac{1}{V_{j+1}}\right)},$$

$V_j$ and $V_{j+1}$ being the volumes of the chambers $AC_j$ and $AC_{j+1}$ respectively (the volume $V_{j+1}$ being set to infinite when the chamber $AC_j$ is connected to an exterior environment or an exterior chamber in a downstream direction), a being a representative cross-sectional area of the passage interconnecting the two consecutive acoustic chambers, L being the length of the passage, and c being the local sound velocity, is at the most 0.75 times a characteristic frequency of the flow system.

16. A device according to claim 15, wherein said local natural frequency is at the most 0.5 times the characteristic frequency of the flow system.

17. A device according to claim 16, wherein said local natural frequency is at the most 0.4 times the characteristic frequency of the flow system.

18. A device according to claim 17, wherein said local natural frequency is at the most 0.3 times the characteristic frequency of the flow system.

19. A device according to claim 18, wherein said local natural frequency is at the most 0.25 times the characteristic frequency of the flow system.

20. A device according to claim 19, wherein said local natural frequency is at the most 0.2 times the characteristic frequency of the flow system.

21. A device according to claim 20, wherein said local natural frequency is at the most 0.15 times the characteristic frequency of the flow system.

22. A device according to claim 21, wherein said local natural frequency is at the most 0.1 times the characteristic frequency of the flow system.

23. A device according to claim 14, wherein the characteristic frequency of the flow system is more than 400 Hz.

24. A device according to claim 23, wherein the characteristic frequency of the flow system is in the range between 5 Hz and 400 Hz.

25. A device according to claim 14, wherein the characteristic frequency of the flow system is in the range between 200 Hz and 400 Hz.

26. A device according to claim 14, wherein the characteristic frequency of the flow system is in the range between 100 Hz and 200 Hz.

27. A device according to claim 14, wherein the characteristic frequency of the flow system is in the range between 50 Hz and 100 Hz.

28. A device according to claim 14, wherein the characteristic frequency of the flow system is in the range between 30 Hz and 50 Hz.

29. A device according to claim 14, wherein the characteristic frequency of the flow system is in the range between 20 Hz and 30 Hz.

30. A device according to claim 14, wherein the characteristic frequency of the flow system is in the range between 15 Hz and 20 Hz.

31. A device according to claim 14, wherein the characteristic frequency of the flow system is in the range between 10 Hz and 15 Hz.

32. A device according to claim 14, wherein the characteristic frequency of the flow system is in the range between 5 Hz and 10 Hz.

33. A device according to claim 14, wherein the characteristic frequency of the flow system is less than 5 Hz.

34. A device according to claim 1, wherein $\zeta_j'$ over at least one acoustic chamber is at the most 0.75.

35. A device according to claim 34, wherein $\zeta_j'$ over at least one acoustic chamber is at the most 0.5.

36. A device according to claim 35, wherein $\zeta_j'$ over at least one acoustic chamber is at the most 0.25.

37. A device according to claim 36, wherein $\zeta_j'$ over at least one acoustic chamber is at the most 0.

38. A device according to claim 36, wherein $\zeta_j'$ over at least one acoustic chamber is less than 0.

39. A device according to claim 1, wherein the following applies to each of at least m−1 of the acoustic chambers:

the pressure loss across the chamber expressed as $\zeta_j'$ is less than or equal to 0.5, the approximated average sound attenuation $\overline{\Delta dB}$ conferred by each transition of cross-sectional area is at least 6 dB.

40. A device according to claim 39, wherein for each of at least m−1 of the acoustic chambers, the relationship between $\zeta_j'$ and $\overline{\Delta dB}$ is as indicated in the following table:

| $\zeta_j'$ | ≦0.5 | ≦0.5 | ≦0.5 | ≦0.5 | ≦0.3 | ≦0.3 | ≦0.3 | ≦0.3 |
|---|---|---|---|---|---|---|---|---|

-continued

| $\overline{\text{AdB}}$ | ≥6 | ≥8 | ≥10 | ≥12 | ≥6 | ≥8 | ≥10 | ≥12 |
|---|---|---|---|---|---|---|---|---|

41. A device according to claim 1, wherein curvatures, preventing flow separation, are applied to at least part of the contour of at least one of the at least one passage and/or the inlet pipe.

42. A device according to claim 1, comprising one or more radial diffusers and/or one or more axial diffusers and/or one or more circular conical diffusers and/or, one or more annular diffusers and/or a plurality of conical diffusers arranged on a substantially cylindrical surface and/or one or more diffusers for reversing the direction of flow and/or one or more double diversion diffusers.

43. A device according to claim 42, wherein each of the at least one acoustic chamber is substantially cylindrical, and wherein one or more outlets from said at least one diffuser are located substantially at the axial centre of the chamber associated with said diffuser.

44. A device according to claim 1, wherein each of the at least one acoustic chamber is substantially cylindrical, said chamber thereby defining a cylinder axis, and wherein one or more outlets from said least one diffuser are located at a distance from the cylinder axis of approximately two thirds of the radius of the acoustic chamber.

45. A device according to claim 14, comprising m acoustic chambers, m being at least 2, wherein the following applies to each of at least m−1 of the acoustic chambers:
   the inlet passage leading gas to the chamber is provided with a diffuser or a diffuser element,
   a curvature or curvatures, preventing flow separation, are applied to at least part of the contour of all or substantially all passages leading gas out of the chamber,
   the pressure loss across the chamber expressed as $\zeta_j'$ is less than or equal to 1.5,
   the approximated average sound attenuation $\overline{\text{AdB}}$ conferred by each transition of cross-sectional area is at least:
      2.9 dB for m=2,
      1.8 dB for m=3,
      1.1 dB for m>3,
and wherein the following applies to each of at least m−2 of the passages interconnecting two consecutive acoustic chambers or interconnecting an acoustic chamber and the exterior environment or chamber:
   the approximated local natural frequency, $f_e$, is at the most 0.75 times a characteristic frequency of the flow system.

46. A device according to claim 45, wherein the following applies to each of at least m−1 of the acoustic chambers:
   the pressure loss across the chamber expressed as $\zeta_j'$ is less than or equal to 1.0,
   the approximated average sound attenuation $\overline{\text{AdB}}$ conferred by each transition of cross-sectional area is at least:
      3.7 dB for m=2,
      2.9 dB for m=3,
      1.8 dB for m>3.

47. A device according to claim 45, wherein, for each of a least m−1 of the acoustic chambers, the relationship between $\zeta_j'$ and $\overline{\text{AdB}}$ is as indicated in the below table:

| $\zeta_j'$ | ≤1.0 | ≤0.5 | ≤0.5 | ≤0.5 | ≤0.5 | ≤0.3 | ≤0.3 | ≤0.3 |
|---|---|---|---|---|---|---|---|---|
| $\overline{\text{AdB}}$, m = 2 | ≥5.6 | ≥5.6 | ≥8 | ≥10 | ≥12 | ≥8 | ≥10 | ≥12 |
| $\overline{\text{AdB}}$, m = 3 | ≥4.8 | ≥4.8 | ≥6 | ≥8 | ≥10 | ≥6 | ≥8 | ≥10 |
| $\overline{\text{AdB}}$, m > 3 | ≥3.7 | ≥3.7 | ≥4 | ≥6 | ≥8 | ≥4 | ≥6 | ≥8 |

48. A device according to claim 45, wherein the following applies to each of at least m−1 of the acoustic chambers:
   the pressure loss across the chamber expressed as $\zeta_j'$ is less than or equal to 0.5,
   the approximated average sound attenuation $\overline{\text{AdB}}$ conferred by each transition of cross-sectional area is at least 6 dB.

49. A device according to claim 45, wherein, for each of at least m−1 of the acoustic chambers, the relationship between $\zeta_j'$ and $\overline{\text{AdB}}$ is as indicated in the following table:

| $\zeta_j'$ | ≤0.5 | ≤0.5 | ≤0.5 | ≤0.5 | ≤0.3 | ≤0.3 | ≤0.3 | ≤0.3 |
|---|---|---|---|---|---|---|---|---|
| $\overline{\text{AdB}}$ | ≥6 | ≥8 | ≥10 | ≥12 | ≥6 | ≥8 | ≥10 | ≥12 |

50. A device according to claim 45, wherein the following applies to each of at least m−2 of the passages interconnecting two consecutive acoustic chambers or interconnecting an acoustic chamber and the exterior environment or chamber:
   the approximated local natural frequency, $f_e$, is at the most 0.5 times a characteristic frequency of the flow system.

51. A device according to claim 45, wherein the criteria of any of claims 27–29 apply to all acoustic chambers and to all passages.

52. A device according to claim 45, the number of acoustic chambers within the device being denoted m, wherein the approximated average sound attenuation $\overline{\text{AdB}}$ conferred by each transition of cross-sectional area is at least
   6.0 dB for m=2,
   5.0 dB for m=3,
   4.0 dB for m>3.

53. A device according to claim 52, the number of acoustic chambers within the device being denoted m, wherein the approximated average sound attenuation $\overline{\text{AdB}}$ conferred by each transition of cross-sectional area is at least
   8.0 dB for m=2,
   6.0 dB for m=3,
   5.0 dB for m>3.

54. A device according to claim 53, the number of acoustic chambers within the device being denoted m, wherein the approximated average sound attenuation $\overline{\text{AdB}}$ conferred by each transition of cross-sectional area is at least
   10.0 dB for m=2,
   8.0 dB for m=3,
   7.0 dB for m>3.

55. A device according to claim 54, the number of acoustic chambers within the device being denoted m, wherein the approximated average sound attenuation $\overline{\text{AdB}}$ conferred by each transition of cross-sectional area is at least
   11.0 dB for m=2,
   8.5 dB for m=3,
   8.0 dB for m>3.

56. A device according to claim 55, the number of acoustic chambers within the device being denoted m, wherein the approximated average sound attenuation $\overline{\text{AdB}}$ conferred by each transition of cross-sectional area is at least 12.0 dB for m=2,
9.5 dB for m=3,
9.0 dB for m>3.

57. A device according to claim 45, wherein the approximated average sound attenuation $\overline{\Delta dB}$ conferred by each transition of cross-sectional area is at least 6 dB.

58. A device according to claim 45, wherein the approximated average sound attenuation $\overline{\Delta dB}$ conferred by each transition of cross-sectional area is at least 8 dB.

59. A device according to claim 45, wherein the approximated average sound attenuation $\overline{\Delta dB}$ conferred by each transition of cross-sectional area is at least 10 dB.

60. A device according to claim 45, wherein the approximated average sound attenuation $\overline{\Delta dB}$ conferred by each transition of cross-sectional area is at least 11 dB.

61. A device according to claim 45, wherein the approximated average sound attenuation $\overline{\Delta dB}$ conferred by each transition of cross-sectional area is at least 12 dB.

62. A device according to claim 1, wherein curvatures, preventing flow separation, are applied to at least part of the contour of the outlet and/or inlet of a pipe or passage of the device, said passage being the inlet pipe or its extension into the device and/or the outlet pipe or its extension into the device and/or a passage connecting two chambers.

63. A device according to claim 1, wherein at least one passage is annular, constituted by an inner cylinder and by an outer cylinder.

64. A device according to claim 63, wherein at least one of the at least one passage which is annular is a passage connecting two chambers.

65. A device according to claim 63, wherein the at least one passage which is annular constitutes a flow cross sectional area increase in the flow direction.

66. A device according to claim 63, in which said annular passage comprises a constant flow area part and an outlet diffuser part.

67. A device according to claim 63, in which said inner cylinder extends into said first chamber by a cylinder of substantially the same diameter as said inner cylinder, and said outer cylinder is connected to a flow-guiding body with a curvature.

68. A device according to claim 63, in which sound absorptive material is contained within said cylinder (42, 43) and/or within a continuation cylinder (41) extending into said first chamber (1) and/or within a continuation cylinder (43) extending into said second chamber (2).

69. A device according to claim 63, wherein said at least one annular passage comprises a first part and a second part, said first part comprising an inner cylinder and an outer cylinder, one or both of said cylinders being perforated and adapted to separate sound absorptive material from gas flow within said first annular passage part, and said second annular passage part comprising an inner cylinder and an outer cylinder, both said cylinders being completely or substantially gas-tight.

70. A device according to claim 68, wherein at least part of the continuation cylinder is perforated.

71. A device according to claim 63, in which the outflow from said connecting passage passes into an annular passage inside said second chamber, said annular passage comprising at least a perforated portion of an inner cylinder and an outer, perforated cylinder, both said cylinders separating sound absorptive materials from gas flow within said second chamber.

72. A device according to claim 63, in which the outflow from said connecting passage passes directly into an annular passage.

73. A device according to claim 63, in which the distance between the inlet to said first chamber and the inlet to said annular passage is so large that substantially no unstable flow occurs in the chamber.

74. A device according to claim 71, wherein the inner cylinder has a substantially non-perforated portion which constitutes at least part of the inner cylinder constituting an inner wall of the outlet diffusor part.

75. A device according to claim 71, wherein the substantially non-perforated portion of the inner cylinder constitutes at least part of an inner wall of the chamber.

76. A device according to claim 1, wherein at least one of the at least one passage is provided with a diffuser or a diffuser element at its outlet.

77. A device according to claim 1, and comprising at least one monolithic body positioned upstream or downstream of an inlet passage and/or an outlet passage of the one or more chambers.

78. A device according to claim 77, wherein said at least one monolithic body is positioned substantially immediately upstream or substantially immediately downstream of said inlet passage and/or said outlet passage of the one or more chambers.

79. A device according to claim 77, wherein the at least one monolithic body if of an annular form.

80. A device according to claim 77, wherein the gas flow leaves the passage in a tangential direction at least two locations along the passage.

81. A device according to claim 1, further comprising at least one resonance chamber which is not through-flowed with or without a therein enclosed sound absorptive material and communicating with one of said at least one acoustic chamber through at least one communication passage, the volume of the at least one resonance chamber and the geometric configuration of the at least one resonance chamber and the communication passage or passages being designed to have a selected center attenuation frequency so as to supplement the sound attenuation achieved with said acoustic chamber or chambers at frequencies of said flow system around said center attenuation frequency.

82. A device according to claim 81, wherein the volume of the at least one resonance chamber is adjustable for instance by means of displaceable adjustment means so as to allow for a variable center attenuation frequency.

83. A device according to claim 81, wherein one or more resonant chambers are contained in said casing with the aim off providing added sound attenuation, said resonance chambers being designed as resonators with selected center frequencies.

84. A device according to claim 1, wherein the following applies to at least one selected chamber selected from said at least one acoustic chamber:

the mean cross-sectional area $A_j$ of each of said selected chamber is at least four times the largest of:
the sum of all cross-sectional areas of passages leading gas to the selected chamber, $a_1$, and
the sum of all cross-sectional areas of passages leading gas from the selected chamber, $a_2$,
the mean cross-sectional area, $A_j$, being defined as the mean value of all cross-sectional areas along a mean trajectory for sound waves travelling from across the selected chamber,
the volume of the at least one selected chamber, $V_j$, is at least $0.5*8(\sqrt{(a_1+a_2)/2})^3$, $a_1$ and $a_2$ being defined as stated above,
the cross-sectional area, $A_j$, and the volume, $V_j$, including any elements belonging to sound absorptive material inside the selected chamber and any other parts being in acoustic communication with the selected chamber.

85. A device according to claim 84, wherein the volume of the at least one selected chamber, $V_j$, is at least $8(\sqrt{(a_1+a_2)/2})^3$.

86. A device according to claim 84, wherein the volume of the at least one selected chamber, $V_j$, is at least $16(\sqrt{(a_1+a_2)/2})^3$.

87. A device according to claim 84, wherein the volume of the at least one selected chamber, $V_j$, is at least $2*16(\sqrt{(a_1+a_2)/2})^3$.

88. A device according to claim 84, wherein at least one of said at least one selected chamber comprises deflecting means for deflecting the flow inside the chamber.

89. A device according to claim 88, wherein the deflecting means are formed so as to deflect the flow inside said at least one selected chamber at least 90 degrees.

90. A device according to claim 1, said at least one acoustic chamber having an inlet and one outlet, the distance between said inlet and said outlet, D, being so large that substantially no unstable flow occurs inside said selected chamber.

91. A device according to claim 90, in which, with the aim of preventing unstable flow in said at least one acoustic chamber, said distance D is 10–50% larger than the distance at which substantially unstable flow would occur.

92. A device according to claim 1, wherein chambers with swirl-provoking passage inlet and/or passage outlet flow directions are formed in such a way and/or provided with such internal guides, e.g., guide plates, that essentially no major swirl occurs in the selected chamber.

93. A device according to claim 92, wherein said guides are designed and dimensioned so that flow resistance caused by the guides is minimised.

94. A device according to claim 84, comprising at least one selected chamber from which at least one passage leads gas from the selected chamber to the exterior environment or chamber, said passage(s) each having an acoustically effective length L, which is at least the direct and straight distance in space between passage inlet and passage outlet.

95. A device according to claim 84, comprising at least two selected chambers fulfilling the criteria of claim 84 and being interconnected by one or more passages each having an acoustically effective length L which is at least the direct and straight distance in space between passage inlet and passage outlet.

96. A device according to claim 94, wherein said acoustically effective length is at least 1.25 times the direct and straight distance in space between passage inlet and passage outlet.

97. A device according to claim 94, wherein said acoustically effective length is at least 1.5 times the direct and straight distance in space between passage inlet and passage outlet.

98. A device according to claim 94, wherein said acoustically effective length is at least 1.75 times the direct and straight distance in space between passage inlet and passage outlet.

99. A device according to claim 94, wherein said acoustically effective length is at least 2 times the direct and straight distance in space between passage inlet and passage outlet.

100. A device according to claim 84, comprising at least one selected chamber from which at least one passage leads gas from the chamber to the exterior environment or chamber and said passage or passages all have an acoustically effective length L, which is at least equal to the length of said at least one selected chamber.

101. A device according to claim 84, the device comprising at least two selected chambers fulfilling the criteria of claim 84 and being connected by one or more passages each having an acoustically effective length L which is at least equal to the sum of the lengths of said two selected chambers, $L_1$ and $L_2$.

102. A device according to claim 1, each of said passages having forms causing a flow trajectory within the passage or passages to deflect, the passage form(s) being such that the radius of curvature of the trajectory at most points is greater than or equal to the transverse straight-line distance across the passage when measured perpendicular to the trajectory tangent at said points.

103. A device for silencing a gas flow directed therethrough and being adapted for installation in a flow system, said device comprising:

a casing, at least one acoustic chamber contained in the casing, said chamber being through-flowed by gas, at least one inlet pipe for leading gas into one of said at least one acoustic chamber, at least one, passage of a length L and of a representative cross-sectional area a for leading gas from each one of the at least one acoustic chamber to another of the at least one acoustic chamber or to an exterior environment or an exterior chamber, optionally one or more monolithic bodies comprised in each of one or more of said at least one acoustic chamber, said device showing at least two transitions of cross-sectional area for the flow of the gas between a relatively lower cross-sectional area $a_i$ and a relatively higher cross-sectional area $A_j$, at least one passage selected from said at least one passage being curved, wherein the following applies to at least one selected chamber selected from said at least one acoustic chamber:

the mean cross-sectional area $A_j$ of each of said selected chamber is at least four times the largest of:
the sum of all cross-sectional areas of passages leading gas to the selected chamber, $a_1$, and
the sum of all cross-sectional areas of passages leading gas from the selected chamber, $a_2$,
the mean cross-sectional area, $A_j$, being defined as the mean value of all cross-sectional areas along a mean trajectory for sound waves travelling from across the selected chamber, the volume of the at least one selected chamber, $V_j$, is at least $8(\sqrt{(a_1+a_2)/2})^3$, $a_1$ and $a_2$ being defined as stated above, the cross-sectional area, $A_j$, and the volume, $V_j$, including any elements belonging to sound absorptive material inside the selected chamber and any other parts being in acoustic communication with the selected chamber, said at least one passage being curved having an acoustically effective length L which is at least 1.50 times the direct and straight distance in space between passage inlet and passage outlet.

104. A device according to claim 103, wherein the at least one passage being curved has an acoustically effective length L which is at least 2 times the direct and straight distance in space between passage inlet and passage outlet.

105. A device according to claim 103, wherein at least part of the at least one curved passage extends over an angle of more than 180 degrees and closer to the envelope part of the silencer or of a chamber than to the centre part of the silencer or the chamber.

106. A device according to claim 105, wherein at least part of the at least one curved passage extends over an angle of more than 180 degrees and adjacent to the envelope part of the silencer or of a chamber.

107. A device according to claim 103, wherein the at least one curved passage connects a chamber with the exterior, environment and occupies a volume which is smaller than the volume of said chamber.

108. A device according to claim 103, wherein the at least one curved passage connects two chambers and occupies a volume which is smaller than the volume of the smaller of the two chambers.

109. A device according to claim 103, wherein substantially all cross-sections of said at least one curved passage are of such a shape that the cross-section in no direction extends over the full extension of the silencer in the particular direction.

110. A device according to claim 103, with the proviso that substantially no cross-section of the at least one curved passage is of such a shape that the ratio between the smallest cross-section dimension and the largest cross-section dimension is very small.

111. A device according to claim 110, wherein substantially no cross-section of the at least one curved passage is of such a shape that the ratio between the smallest cross-section dimension and the largest cross-section dimension is 1/50 or less.

112. A device according to claim 103, wherein the ratio between the smallest cross-section dimension of the at least one curved passage and the largest cross-section dimension of the passage is at least 0.1.

113. A device according to claim 103, wherein pressure loss across each acoustic chamber expressed as the dimensionless parameter $\zeta_j'$, defined as the ratio between the static pressure loss over the chamber and the dynamic pressure at a location in said passage:

$$\zeta_j' = \frac{\Delta p_j}{\frac{1}{2}\rho u^2},$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is at the most 3.

114. A device according to claim 113, wherein wherein $\zeta_j'$ across each acoustic chamber is at the most 2.5.

115. A device according to claim 113, wherein $\zeta_j'$ across each acoustic chamber is at the most 2.

116. A device according to claim 113, wherein $\zeta_j'$ across each acoustic chamber is at the most 1.5.

117. A device according to claim 113, wherein $\zeta_j'$ across each acoustic chamber is at the most 1.0.

118. A device according to claim 103 and comprising m acoustic chambers, wherein the pressure loss across each chamber expressed as $\zeta_j'$ as defined as the ratio between the static pressure loss over the chamber and the dynamic pressure at a location in said passage:

$$\zeta_j' = \frac{\Delta p_j}{\frac{1}{2}\rho u^2},$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is less than or equal to 1.0, and wherein the following applies to each of at least m−1 of the acoustic chambers:

the approximated average sound attenuation $\overline{AdB}$ conferred by each transition of cross-sectional area is at least:
3.7 dB for m=2,
2.9 dB for m=3,
1.8 dB for m>3.

119. A device according to claim 118, wherein, for each of at least m−1 of the acoustic chambers, the relationship between $\zeta_j'$ and $\overline{AdB}$ is as indicated in the following table:

| $\zeta_j'$ | ≤1.0 | ≤0.5 | ≤0.5 | ≤0.5 | ≤0.5 | ≤0.3 | ≤0.3 | ≤0.3 |
|---|---|---|---|---|---|---|---|---|
| $\overline{AdB}$, m = 2 | ≥5.6 | ≥5.6 | ≥8 | ≥10 | ≥12 | ≥8 | ≥10 | ≥12 |
| $\overline{AdB}$, m = 3 | ≥4.8 | ≥4.8 | ≥6 | ≥8 | ≥10 | ≥6 | ≥8 | ≥10 |
| $\overline{AdB}$, m > 3 | ≥3.7 | ≥3.7 | ≥4 | ≥6 | ≥8 | ≥4 | ≥6 | ≥8 |

120. A device according to claim 103, wherein the generatrix of at least part of at least one curved passage selected from said at least one passage is wound in a peripheral direction.

121. A device according to claim 120, wherein at least part of the curved passage has a plane spiral form.

122. A device according to claim 120, wherein at least a part of the curved passage extends in a longitudinal direction, so as to form a screw-like helical form.

123. A device according to claim 120, wherein the curved part of the curved passage extends over an angle between 0° and 90°.

124. A device according to claim 120, wherein the curved part of the curved passage extends over an angle between 90° and 180°.

125. A device according to claim 120, wherein the curved part of the curved passage extends over an angle between 180° and 270°.

126. A device according to claim 120, wherein the curved part of the curved passage extends over an angle between 270° and 360°.

127. A device according to claim 120, wherein the curved part of the curved passage extends over an angle between 360° and 720°.

128. A device according to claim 120, wherein the curved part of the curved passage extends over an angle of 720° or more.

129. A device according to claim 103, comprising at least two acoustic chambers, wherein the curved passage interconnects two chambers, a first of which surrounds a second one.

130. A device according to claim 103, wherein the generatrix of the curved part of the passage extends along a surface of revolution.

131. A device according to claim 130, wherein at least part of the surface of revolution is conical.

132. A device according to claim 103, wherein a first part of the curved passage extends in a first longitudinal direction and a second part of the curved passage extends in a second longitudinal direction which is opposite to said first longitudinal direction.

133. A device according to claim 103, wherein the at least one curved passage consitutes a tail pipe interconnecting one of said at least one acoustic chamber and an exterior environment or an exterior chamber, and wherein at least part of the curved passage is wound around said casing on an outer surface of the casing.

134. A device according to claim 103, wherein the volume of the at least one selected chamber, $V_j$, is at least $16(\sqrt{(a_1+a_2)/2})^3$.

135. A device according to claim 103, wherein the volume of the at least one selected chamber, $V_j$, is at least $2*16(\sqrt{(a_1+a_2)/2})^3$.

136. A device according to claim 103, wherein at least one of said at least one selected chamber comprises deflecting means for deflecting the flow inside the chamber.

137. A device according to claim 136, wherein the deflecting means are formed so as to deflect the flow inside said at least one selected chamber at least 90 degrees.

138. A device according to claim 103, said at least one acoustic chamber having an inlet and one outlet, the distance between said inlet and said outlet, D, being so large that substantially no unstable flow occurs inside said selected chamber.

139. A device according to claim 138, in which, with the aim of preventing unstable flow in said at least one acoustic chamber, said distance D is 10–50% larger than the distance at which substantially unstable flow would occur.

140. A device according to claim 103, wherein chambers with swirl-provoking passage inlet and/or passage outlet flow directions are formed in such a way and/or provided with such internal guides, e.g., guide plates, that essentially no major swirl occurs in the selected chamber.

141. A device according to claim 140, wherein said guides are designed and dimensioned so that flow resistance caused by the guides is minimised.

142. A device according to claim 103, comprising at least one selected chamber from which at least one passage leads gas from the selected chamber to the exterior environment or chamber, said passage(s) each having an acoustically effective length L, which is at least the direct and straight distance in space between passage inlet and passage outlet.

143. A device according to claim 103, comprising at least two selected chambers being interconnected by one or more passages each having an acoustically effective length L which is at least the direct and straight distance in space between passage inlet and passage outlet.

144. A device according to claim 143, wherein said acoustically effective length is at least 1.25 times the direct and straight distance in space between passage inlet and passage outlet.

145. A device according to claim 143, wherein said acoustically effective length is at least 1.5 times the direct and straight distance in space between passage inlet and passage outlet.

146. A device according to claim 143, wherein said acoustically effective length is at least 1.75 times the direct and straight distance in space between passage inlet and passage outlet.

147. A device according to claim 143, wherein said acoustically effective length is at least 2 times the direct and straight distance in space between passage inlet and passage outlet.

148. A device according to claim 103, comprising at least one selected chamber from which at least one passage leads gas from the chamber to the exterior environment or chamber and said passage or passages all have an acoustically effective length L, which is at least equal to the length of said at least one selected chamber.

149. A device according to claim 103, the device comprising at least two selected chambers being interconnected by one or more passages each having an acoustically effective length L which is at least equal to the sum of the lengths of said two selected chambers, $L_1$ and $L_2$.

150. A device according to claim 103, each of said passages having forms causing a flow trajectory within the passage or passages to deflect, the passage form(s) being such that the radius of curvature of the trajectory at most points is greater than or equal to the transverse straight-line distance across the passage when measured perpendicular to the trajectory tangent at said points.

151. A device according to claim 103, wherein the local natural frequency, $f_e$, of at least one system comprising the gas of two consecutive acoustic chambers $AC_j$ and $AC_{j+1}$ and the gas of the passage interconnecting said two acoustic chambers, approximated by the following expression:

$$f_e = \frac{c}{2\pi}\sqrt{\frac{a}{L}\left(\frac{1}{V_j} + \frac{1}{V_{j+1}}\right)},$$

$V_j$ and $V_{j+1}$ being the volumes of the chambers $AC_j$ and $AC_{j+1}$ respectively, a being a representative cross-sectional area of the passage interconnecting the two consecutive acoustic chambers, L being the length of the passage, and c being the local sound velocity, is above 0.75 and at the most 0.95 times a characteristic frequency of the flow system.

152. A device according to claim 103, wherein the local natural frequency, $f_e$, of at least one system comprising the gas of two consecutive acoustic chambers $AC_j$ and $AC_{j+1}$ and the gas of the passage interconnecting said two acoustic chambers, approximated by the following expression:

$$f_e = \frac{c}{2\pi}\sqrt{\frac{a}{L}\left(\frac{1}{V_j} + \frac{1}{V_{j+1}}\right)},$$

$V_j$ and $V_{j+1}$ being the volumes of the chambers $AC_j$ and $AC_{j+1}$ respectively, a being a representative cross-sectional area of the passage interconnecting the two consecutive acoustic chambers, L being the length of the passage, and c being the local sound velocity, is at the most 0.75 times a characteristic frequency of the flow system.

153. A device for silencing a gas flow directed therethrough and being adapted for installation in a flow system, said device comprising:

a casing, at least two acoustic chambers contained in the casing, said chambers being through-flowed by gas, at least one inlet pipe for leading gas into one of said at least two acoustic chambers, at least one passage of a length L and of a representative cross-sectional area a for leading gas from each one of the at least two acoustic chambers to another of the at least two acoustic chambers or to an exterior environment or an exterior chamber, optionally one or more monolithic bodies comprised in each of one or more of said at least two acoustic chambers, said device showing at least two through-flowed transitions of cross-sectional area for the flow of the gas between a relatively lower cross-sectional area $a_i$ and a relatively higher cross-sectional area $A_i$, said inlet pipe being continued by a flow deflecting element causing the gas to flow with a radial component and for causing pressure recovery to the flow upstream of a first one of said at least two acoustic chambers, wherein said passage comprises at least one diffuser for leading the gas flow into a second one of said at least two acoustic chambers, the diffuser of said passage being of an annular diffuser, wherein the average sound attenuation $\overline{\Delta dB}$ conferred by each transition of cross-sectional area, approximated by the following expression:

$$\overline{\Delta dB} = \frac{1}{n} k \sum_{i=1}^{n} \log_{10} \frac{A_i}{a_i},$$

n being the total number of transitions of cross-sectional area of the device, $A_i$ being the relatively higher cross-sectional area at the i'th transition of cross-sectional area of the gas flow, $a_i$ being the relatively lower cross-sectional area at the i'th change of cross-sectional area of the gas flow, k being a constant of the value 6.25 dB, is at least
- 6.0 dB when the device comprises no more than two acoustic chambers,
- 5.0 dB when the device comprises three acoustic chambers,
- 4.0 dB when the device comprises 4 or more acoustic chambers.

154. A device according to claim 153, the number of acoustic chambers within the device being denoted m, wherein the approximated average sound attenuation $\overline{\Delta dB}$ conferred by each transition of cross-sectional area is at least
- 8.0 dB for m=2,
- 6.0 dB for m=3,
- 5.0 dB for m>3.

155. A device according to claim 153, wherein the annular diffuser is constituted by an inner cylinder and by an outer cylinder.

156. A device according to claim 155 in which the annular diffuser comprises a constant flow area part and an outlet diffuser part.

157. A device according to claim 155 in which said inner cylinder extends into said first chamber by a cylinder of substantially the same diameter as said inner cylinder, and said outer cylinder is connected to a flow-guiding body with a curvature.

158. A device according to claim 155, in which sound absorptive material is contained within one of said cylinders and/or within a continuation cylinder extending into said first chamber and/or within a continuation cylinder extending into said second chamber.

159. A device according to claim 153, wherein said annular diffuser comprises a first part and a second part, said first part comprising a first inner cylinder and a first outer cylinder, one or both of said first inner and outer cylinders being perforated and adapted to separate sound absorptive material from gas flow within said first annular passage part, and said second annular passage part comprising a second inner cylinder and a second outer cylinder, both said second cylinders being completely or substantially gas-tight.

160. A device according to claim 158, wherein at least part of the continuation cylinder is perforated.

161. A device according to claim 153, wherein at least one of the at least one passage constitutes a connecting passage interconnecting a first one of the at least one acoustic chamber to a second one of the at least one acoustic chamber, and wherein the outflow from said connecting passage passes into an annular passage inside said second chamber, said annular passage comprising at least a perforated portion of an inner cylinder and an outer, perforated cylinder, both said cylinders separating sound absorptive materials from gas flow within said second chamber.

162. A device according to claim 161, in which the outflow from said connecting passage passes directly into an annular passage.

163. A device according to claim 161, in which the distance between the inlet to said first chamber and the inlet to said annular passage is so large that substantially no unstable flow occurs in the chamber.

164. A device according to claim 161, wherein the inner cylinder has a substantially non-perforated portion which constitutes at least part of the inner cylinder constituting an inner wall of the outlet diffusor part.

165. A device according to claim 164, wherein the substantially non-perforated portion of the inner cylinder constitutes at least part of an inner wall of at least one of the first and the second chamber.

166. A flow system comprising at least one device according to claim 1.

167. A flow system according to claim 165, and comprising an internal combustion engine, the characteristic frequency of the flow system being the firing frequency of the engine.

168. A flow system according to claim 165, and comprising a gas turbine and/or a compressor.

169. A flow system according to claim 168, the characteristic frequency of the gas turbine or the compressor being a predominant low-frequent peak sound level frequency, determinable by measurement or from known design features, and/or a mid-octave band frequency which is lower than the measure peak sound level octave band and below which frequency the sound level generally falls of with further lowered frequency.

170. A flow system comprising at least one device according to claim 103.

171. A flow system comprising at least one device according to claim 153.

172. A vehicle comprising a combustion engine, such as a diesel engine a petrol engine or a gas engine, and/or a gas turbine and/or a compressor and at least one device according to claim 1, the at least one device being comprised in the exhaust system of the vehicle.

173. A vehicle according to claim 172, the vehicle being a ship or boat.

174. A vehicle comprising at least one device according to claim 103.

175. A vehicle comprising at least one device according to claim 153.

176. A stationary plant comprising a combustion engine, such as a diesel engine, a petrol engine or a gas engine, and/or a gas turbine and/or a compressor and at least one device according to claim 1.

177. A stationary plant comprising at least one device according to claim 103.

178. A stationary plant comprising at least one device according to claim 153.

179. A method of operating a vehicle comprising a combustion engine and a silencing system, the silencing system comprising a silencer, optionally an exhaust connecting pipe and optionally a tail pipe, said method comprising adapting the silencing system so that its maximum back pressure contributed by the silencing system is at most 1000 mmWG, the silencer being a silencer selected from (A) a silencer comprising:

a casing, at least one acoustic chamber and contained in the casing, said chamber being through-flowed by gas, at least one inlet pipe for leading gas into one of said at least one acoustic chamber, at least one passage of a length L and of a representative cross-sectional area a for leading gas from each one of the at least one acoustic chamber to another of the at least one acoustic chamber or to an exterior environment or an exterior chamber, optionally one or more monolithic bodies comprised in each of one or more of said at least one acoustic chamber, said silencer showing at least two through-flowed transitions of cross-sectional area for the flow of the gas between a relatively lower cross-sectional area $a_i$ and a relatively higher cross-sectional area $A_i$, the silencer fulfilling the following criteria:

the average sound attenuation $\overline{AdB}$ conferred by each transition of cross-sectional area, approximated by the following expression:

$$\overline{AdB} = \frac{1}{n} k \sum_{i=1}^{n} \log_{10} \frac{A_i}{a_i},$$

n being the total number of transitions of cross-sectional area of the silencer, $A_i$ being the relatively higher cross-sectional area at the i'th transition of cross-sectional area of the gas flow, $a_i$ being the relatively lower cross-sectional area at the i'th change of cross-sectional area of the gas flow, k being a constant of the value 6.25 dB, is at least 2.9 dB when the device comprises no more than two acoustic chambers, 1.8 dB when the device comprises three acoustic chambers, 1.1 dB when the device comprises 4 or more acoustic chambers, the pressure loss across each acoustic chamber expressed as the dimensionless parameter $\zeta_j'$, defined as the ratio between the static pressure loss over the chamber and the dynamic pressure at a location in said passage:

$$\zeta_j' = \frac{\Delta p_j}{\frac{1}{2}\rho u^2},$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is at the most 1.5, (B) a silencer comprising a casing, at least one acoustic chamber contained in the casing, said chamber being through-flowed by gas, at least one inlet pipe for leading gas into one of said at least one acoustic chamber, at least one passage of a length L and of a representative cross-sectional area a for leading gas from each one of the at least one acoustic chamber to another of the at least one acoustic chamber or to an exterior environment or an exterior chamber, optionally one or more monolithic bodies comprised in each of one or more of said at least one acoustic chamber, said silencer showing at least two transitions of cross-sectional area for the flow of the gas between a relatively lower cross-sectional area $a_i$ and a relatively higher cross-sectional area $A_i$, at least one passage selected from said at least one passage being curved, wherein the following applies to at least one selected chamber selected from said at least one acoustic chamber:

the mean cross-sectional area $A_j$ of each of said selected chamber is at least four times the largest of:

the sum of all cross-sectional areas of passages leading gas to the selected chamber, $a_1$, and the sum of all cross-sectional areas of passages leading gas from the selected chamber, $a_2$, the mean cross-sectional area, $A_j$, being defined as the mean value of all cross-sectional areas along a mean trajectory for sound waves travelling from across the selected chamber, the volume of the at least one selected chamber, $V_j$, is at least $8(\sqrt{(a_1+a_2)/2})^3$, $a_1$ and $a_2$ being defined as stated above, the cross-sectional area, $A_j$, and the volume, $V_j$, including any elements belonging to sound absorptive material inside the selected chamber and any other parts which are in acoustic communication with the selected chamber, (C) a silencer comprising a casing, at least two acoustic chambers contained in the casing, said chambers being through-flowed by gas, at least one inlet pipe for leading gas into one of said at least two acoustic chambers, at least one passage of a length L and of a representative cross-sectional area a for leading gas from each one of the at least two acoustic chambers to another of the at least two acoustic chambers or to an exterior environment or an exterior chamber, optionally one or more monolithic bodies comprised in each of one or more of said at least two acoustic chambers, said silencer showing at least two through-flowed transitions of cross-sectional area for the flow of the gas between a relatively lower; cross-sectional area $a_i$ and a relatively higher cross-sectional area $A_i$, said inlet pipe being continued by a flow deflecting element causing the gas to flow with a radial component and for causing pressure recovery to the flow upstream of a first one of said at least two acoustic chambers, wherein said passage comprises at least one diffuser for leading the gas flow into a second, one of said at least two acoustic chambers, the diffuser of said passage being of a different type than a radial diffuser.

180. A method according to claim 179, with the modification that the vehicle is a passenger car, and the maximum back pressure is at the most 2000 mmWG, such as at the most 1500 mmWG.

181. A method according to claim 179, wherein said maximum back pressure is at the most 800 mmWG.

182. A method according to claim 181, wherein said maximum back pressure is at the most 700 mmWG.

183. A method according to claim 181, wherein said maximum back pressure is at the most 600 mmWG.

184. A method according to claim 181, wherein said maximum back pressure is at the most 500 mmWG.

185. A method according to claim 181, wherein said maximum back pressure is at the most 400 mmWG.

186. A method according to claim 181, wherein said maximum back pressure is at the most 380 mmWG.

187. A method according to claim 181, wherein said maximum back pressure is at the most 360 mmWG.

188. A method according to claim 181, wherein said maximum back pressure is at the most 340 mmWG.

189. A method according to claim 181, wherein said maximum back pressure is at the most 320 mmWG.

190. A method according to claim 181, wherein said maximum back pressure is at the most 300 mmWG.

191. A method according to claim 181, wherein said maximum back pressure is at the most 280 mmWG.

192. A method according to claim 181, wherein the silencing system comprises a tail pipe, and a diffuser element is provided at or near the outlet of the tail pipe and/or at least part of the tail pipe constitutes a diffuser, and wherein said maximum back pressure is at the most 200 mmWG.

193. A method according to claim 181, wherein said maximum back pressure is at the most 150 mmWG.

194. A method according to claim 179, wherein the vehicle is a heavy truck, and total exhaust noise is at the most 72 dB(A).

195. A method according to claim 194, wherein the total exhaust noise is defined as the total exhaust noise deriving exclusively from the exhaust system and measured according to ISO standard 362.

196. A method according to claim 194, wherein the total exhaust noise is at the most 69 dB(A).

197. A method according to claim 196, wherein the total exhaust noise is at the most 66 dB(A).

198. A method according to claim 196, wherein the total exhaust noise is at the most 63 dB(A).

199. A method according to claim 196, wherein the total exhaust noise is at the most 60 dB(A).

200. A method according to claim 196, wherein the total exhaust noise is at the most 57 dB(A).

201. A method according to claim 196, wherein the total exhaust noise is at the most 54 dB(A).

202. A method according to claim 179, wherein the vehicle is a passenger car or van, and the total exhaust noise is at the most 51 dB(A).

203. A method according to claim 202, wherein the total exhaust noise is at the most 48 dB(A).

204. A method according to claim 179, wherein the vehicle is any of the vehicles defined in the EEC 92/97 directive table shown in the description, and the total exhaust noise from the vehicle is at least 5 dB lower than the value stated in the table for the respective vehicle.

205. A method according to claim 204, wherein the total exhaust noise from the vehicle is at least 8 dB lower than the value stated in the table for the respective vehicle.

206. A method according to claim 204, wherein the total exhaust noise from the vehicle is at least 11 dB lower than the value stated in the table for the respective vehicle.

207. A method according to claim 204, wherein the total exhaust noise from the vehicle is at least 14 dB lower than the value stated in the table for the respective vehicle.

208. A method according to claim 204, wherein the total exhaust noise from the vehicle is at least 17 dB lower than the value stated in the table for the respective vehicle.

209. A method according to claim 204, wherein the total exhaust noise from the vehicle is at least 20 dB lower than the value stated in the table for the respective vehicle.

210. A method according to claim 204, wherein the total exhaust noise from the vehicle is at least 23 dB lower than the value stated in the table for the respective vehicle.

211. A method according to claim 204, wherein the total exhaust noise from the vehicle is at least 26 dB lower than the value stated in the table for the respective vehicle.

212. A method according to claim 179, wherein the vehicle is a hybrid comprising in addition to said combustion engine electrical, hydraulic, or other drive means.

213. A method according to claim 179, wherein the combustion engine is a spark ignition engine or a compression ignition engine or a gas turbine engine.

214. A method according to claim 179, wherein the engine is a supercharged engine, such as a turbocharged engine, said method comprising allowing the engine to utilise the improved air supply rendered possible through the relatively low back pressure.

215. A method according to claim 214, wherein the maximum fuelling rate is increased as allowed by the improved air supply by use of electric, mechanic, hydraulic or any other kind of engine control system and/or injection control system.

216. A method according to claim 215, wherein the maximum fuelling rate is increased by adapting the engine operating conditions, such as by one or more of the following conditions:
maintaining a constant excess air ratio (lambda) by use of electric, mechanic, hydraulic or any other kind of engine control system and/or injection control system,
adapting the fuel injection timing by use of electric, mechanic, hydraulic or any other kind of engine control system and/or injection control system,
adapting, where applicable, the adjustment of a possible waste gate,
varying adjustment of optional variable vane guides provided in the turbine of a turbocharger, so as to optimize turbocharger performance,
adapting, in a spark ignition engine, the spark timing by use of electric, mechanic, hydraulic or any other kind of engine and/or injection control system,
using a fuel system with increased capacity, such as a large pump displacement, or installing or adapting a common rail fuel system.

217. A method according to claim 179, wherein the engine is a turbo compounded engine in which a turbine or other expansion device is utilised to convert exhaust energy to mechanical work, such as mechanical work for driving one or more generators for generating electrical energy and/or supplying additional mechanical energy to the engine output shaft.

218. A method according to claim 179, wherein the engine is a multiple stage turbocharged engine using two or optionally more turbocharges operating in series and/or in parallel.

219. A method according to claim 179, wherein the engine utilises recirculation of exhaust gasses for the purpose of reduction of harmful exhaust emissions, such as oxides of nitrogen.

220. A method according to claim 179, comprising adjustment of the engine displacement volume in accordance with the improved air supply by one or more of the following steps:
replacing the engine with another engine having a smaller displacement volume,
reducing the displacement volume of the engine by means of a reduction of in the engine stroke,
reducing the displacement volume of the engine by means a reduction in the cylinder bore diameter and piston diameter.

221. A method according to claim 179, comprising adaptation of the gear ratios in a power transmission system of the vehicle in accordance with improved engine efficiency resulting from the reduction in back pressure.

222. A method according to claim 179, wherein the specific fuel consumption of the engine at full load is reduced by at least 1% per 1000 mmWG reduction in back pressure.

223. A method according to claim 221, wherein the specific fuel consumption of the engine at full load is reduced by at least 1.5% per 1000 mmWG reduction in back pressure.

224. A method according to, claim 221, wherein the specific fuel consumption of the engine at full load is reduced by at least 2% per 1000 mmWG reduction in back pressure.

225. A method according to claim 221, wherein the specific fuel consumption of the engine at full load is reduced by at least 2.5% per 1000 mmWG reduction in back pressure.

226. A method according to claim 221, wherein the specific fuel consumption of the engine at full load is reduced by at least 3% per 1000 mmWG reduction in back pressure.

227. A method according to claim 221, wherein the specific fuel consumption of the engine at full load is reduced by at least 3.5% per 1000 mmWG reduction in back pressure.

228. A method according to claim 221, wherein the specific fuel consumption of the engine at full load is reduced by at least 4% per 1000 mmWG reduction in back pressure.

229. A method according to claim 221, wherein the specific fuel consumption of the engine at full load is reduced by at least 4.25% per 1000 mmWG reduction in back pressure.

230. A method according to claim 221, wherein the specific fuel consumption of the engine at full load is reduced by at least 4.5% per 1000 mmWG reduction in back pressure.

231. A method according to claim 221, wherein the specific fuel consumption of the engine at full load is reduced by at least 5% per 1000 mmWG reduction in back pressure.

232. A method according to claim 221, wherein the specific fuel consumption of the engine at full load is reduced by at least 5.5% per 1000 mmWG reduction in back pressure.

233. A method according to claim 179, wherein the specific fuel consumption of the engine at full load is reduced by at least 1% per 1000 mmWG reduction in back pressure at substantially constant fuel flow rate.

234. A method according to claim 233, wherein the specific fuel consumption of the engine at full load is reduced by at least 1.5% per 1000 mmWG reduction in back pressure at substantially constant fuel flow rate.

235. A method according to claim 233, wherein the specific fuel consumption of the engine at full load is reduced by at least 2% per 1000 mmWG reduction in back pressure at substantially constant fuel flow rate.

236. A method according to claim 233, wherein the specific fuel consumption of the engine at full load is reduced by at least 2.5% per 1000 mmWG reduction in back pressure at substantially constant fuel flow rate.

237. A method according to claim 233, wherein the specific fuel consumption of the engine at full load is reduced by at least 3% per 1000 mmWG reduction in back pressure at substantially constant fuel flow rate.

238. A method according to claim 179, wherein the power output of the engine is improved by at least 5% per 1000 mmWG reduction in back pressure while maintaining the same excess air ratio at maximum load.

239. A method according to claim 179, wherein the power output of the engine is improved by at least 7.5% per 1000 mmWG reduction in back pressure while maintaining the same excess air ratio at maximum load.

240. A method according to claim 179, wherein the power output of the engine is improved by at least 8% per 1000 mmWG reduction in back pressure while maintaining the same excess air ratio at maximum load.

241. A method according to claim 179, wherein the power output of the engine is improved by at least 9% per 1000 mmWG reduction in back pressure while maintaining the same excess air ratio at maximum load.

242. A method according to claim 179, wherein the power output of the engine is improved by at least 10% per 1000 mmWG reduction in back pressure while maintaining the same excess air ratio at maximum load.

243. A method according to claim 179, wherein the power output of the engine is improved by at least 11% per 1000 mmWG reduction in back pressure while maintaining the same excess air ratio at maximum load.

244. A method of operating a spark-ignited or compression-ignited engine and a silencing system, the silencing system comprising a silencer, optionally an exhaust connecting pipe and optionally a tail pipe, the engine being a stationary engine or an engine placed on a ship, an oil-rig or a barge, said method comprising adapting the silencing system so that its maximum back pressure contributed by the silencing system is at most 400 mmWG, the silencer being a silencer selected from (A) a silencer comprising:
a casing,
at least one acoustic chamber and contained in the casing, said chamber being through-flowed by gas,
at least one inlet pipe for leading gas into one of said at least one acoustic chamber,
at least one passage of a length L and of a representative cross-sectional area a for leading gas from each one of the at least one acoustic chamber to another of the at least one acoustic chamber or to an exterior environment or an exterior chamber,
optionally one or more monolithic bodies comprised in each of one or more of said at least one acoustic chamber,
said silencer showing at least two through-flowed transitions of cross-sectional area for the flow of the gas between a relatively lower cross-sectional area $a_i$ and a relatively higher cross-sectional area $A_i$, the silencer fulfilling the following criteria:
the average sound attenuation $\overline{\Delta dB}$ conferred by each transition of cross-sectional area, approximated by the following expression:

$$\overline{\Delta dB} = \frac{1}{n} k \sum_{i=1}^{n} \log_{10} \frac{A_i}{a_i},$$

n being the total number of transitions of cross-sectional area of the silencer, $A_i$ being the relatively higher cross-sectional area at the i'th transition of cross-sectional area of the gas flow, $a_i$ being the relatively lower cross-sectional area at the i'th change of cross-sectional area of the gas flow, k being a constant of the value 6.25 dB,
is at least
- 2.9 dB when the device comprises no more than two acoustic chambers,
- 1.8 dB when the device comprises three acoustic chambers,
- 1.1 dB when the device comprises 4 or more acoustic chambers, the pressure loss across each acoustic chamber expressed as the dimensionless parameter $\zeta_j'$, defined as the ratio between the static pressure loss over the chamber and the dynamic pressure at a location in said passage:

$$\zeta_j' = \frac{\Delta p_j}{\frac{1}{2}\rho u^2},$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is at the most 1.5, (B) a silencer comprising
a casing,
at least one acoustic chamber contained in the casing, said chamber being through-flowed by gas,
at least one inlet pipe for leading gas into one of said at least one acoustic chamber,
at least one passage of a length L and of a representative cross-sectional area a for leading gas from each one of the at least one acoustic chamber to another of the at least one acoustic chamber or to an exterior environment or an exterior chamber,
optionally one or more monolithic bodies comprised in each of one or more of said at least one acoustic chamber,
said silencer showing at least two transitions of cross-sectional area for the flow of the gas between a relatively lower cross-sectional area $a_i$ and a relatively higher cross-sectional area $A_i$,
at least one passage selected from said at least one passage being curved,
wherein the following applies to at least one selected chamber selected from said at least one acoustic chamber:
the mean cross-sectional area $A_j$ of each of said selected chamber is at least four times the largest of:
the sum of all cross-sectional areas of passages leading gas to the selected chamber, $a_1$, and
the sum of all cross-sectional areas of passages leading gas from the selected chamber, $a_2$,
the mean cross-sectional area, $A_j$, being defined as the mean value of all cross-sectional areas along a mean trajectory for sound waves travelling from across the selected chamber,
the volume of the at least one selected chamber, $V_j$, is at least $8(\sqrt{(a_1+a_2)/2})^3$, $a_1$ and $a_2$ being defined as stated above;
the cross-sectional area, $A_j$, and the volume, $V_j$, including any elements belonging to sound absorptive material inside the selected chamber and any other parts which are in acoustic communication with the selected chamber, (C) a silencer comprising
a casing,
at least two acoustic chambers contained in the casing, said chambers being through-flowed by gas,
at least one inlet pipe for leading gas into one of said at least two acoustic chambers,
at least one passage of a length L and of a representative cross-sectional area a for leading gas from each one of the at least two acoustic chambers to another of the at least two acoustic chambers or to an exterior environment or an exterior chamber,
optionally one or more monolithic bodies comprised in each of one or more of said at least two acoustic chambers,
said silencer showing at least two through-flowed transitions of cross-sectional area for the flow of the gas between a relatively lower cross-sectional area $a_i$ and a relatively higher cross-sectional area $A_i$,
said inlet pipe being continued by a flow deflecting element causing the gas to flow with a radial component and for causing pressure recovery to the flow upstream of a first one of said at least two acoustic chambers, wherein said passage comprises at least one diffuser for leading the gas flow into a second one of said at least two acoustic chambers, the diffuser of said passage being of a different type than a radial diffuser.

245. A method according to claim 244, wherein said maximum back pressure is at the most 300 mmWG.

246. A method according to claim 244, wherein said maximum back pressure is at the most 200 mmWG.

247. A method according to claim 244, wherein said maximum back pressure is at the most 100 mmWG.

248. A method according to claim 244, wherein said maximum back pressure is at the most 50 mmWG.

249. A method according to claim 244, wherein the total exhaust noise, as measured at a specified measurement point according to noise limits specified for exterior noise at buildings and other premises inhabited by people, is at the most 50 dB(A).

250. A method according to claim 249, wherein the total exhaust noise is at the most 45 dB(A).

251. A method according to claim 249, wherein the total exhaust noise is at the most 40 dB(A).

252. A method according to claim 249, wherein the total exhaust noise is at the most 35 dB(A).

253. A method according to claim 249, wherein the total exhaust noise is at the most 30 dB(A).

254. A method according to claim 249, wherein the total exhaust noise is at the most 25 dB(A).

255. A method according to claim 249, wherein the total exhaust noise is at the most 20 dB(A).

256. A method according to claim 244, wherein the engine is a supercharged engine, such as a turbocharged engine, said method comprising allowing the engine to utilise the improved air supply rendered possible through the relatively low back pressure.

257. A method according to claim 256, wherein the maximum fuelling rate is increased as allowed by the improved air supply by use of electric, electronic, mechanical, hydraulic or any other kind of engine control system and/or injection control system.

258. A method according to claim 257, wherein the maximum fuelling rate is increased by adapting the engine operating conditions, such as one or more of the following conditions:
- maintaining a constant excess air ratio (lambda) by use of electric, mechanic, hydraulic or any other kind of engine control system and/or injection control system,
- adapting the fuel injection timing by use of electric, mechanic, hydraulic or any other kind of engine control system and/or injection control system,
- adapting, where applicable, the adjustment of a possible waste gate,
- varying adjustment of optional variable vane guides provided in the turbine of a turbocharger, so as to optimize turbocharger performance,
- adapting, in a spark ignition engine, the spark timing by use of electric, mechanic, hydraulic or any other kind of engine and/or injection control system,
- using a fuel system with increased capacity, such as a large pump displacement, or installing or adapting a common rail fuel system.

259. A method according to claim 244, wherein the engine is a turbo compounded engine in which a turbine or other expansion device is utilised to convert exhaust energy to mechanical work, such as mechanical work for driving one or more generators for generating electrical energy and/or supplying additional mechanical energy to the engine output shaft.

260. A method according to claim 244, wherein the engine is a multiple stage turbocharged engine using two or optionally more turbocharges operating in series and/or in parallel.

261. A method according to claim 244, wherein the engine utilises recirculation of exhaust gasses for the purpose of reduction of harmful exhaust emissions, such as oxides of nitrogen.

262. A method according to claim 244, comprising adjusting of the engine displacement volume in accordance with the improved air supply by one or more of the following steps:
- replacing the engine with another engine having a smaller displacement volume,
- reducing the displacement volume of the engine by means of a reduction of in the engine stroke,
- reducing the displacement volume of the engine by means a reduction in the cylinder bore diameter and piston diameter.

263. A method according to claim 244, comprising adaptation of the gear ratios in a power transmission system of the vehicle in accordance with improved engine efficiency resulting from the reduction in back pressure.

264. A method according to claim 244, wherein the specific fuel consumption of the engine at full load is reduced by at least 1% per 1000 mmWG reduction in back pressure.

265. A method according to claim 264, wherein the specific fuel consumption of the engine at full load is reduced by at least 1.5% per 1000 mmWG reduction in back pressure.

266. A method according to claim 264, wherein the specific fuel consumption of the engine at full load is reduced by at least 2% per 1000 mmWG reduction in back pressure.

267. A method according to claim 264, wherein the specific fuel consumption of the engine at full load is reduced by at least 2.5% per 1000 mmWG reduction in back pressure.

268. A method according to claim 264, wherein the specific fuel consumption of the engine at full load is reduced by at least 3% per 1000 mmWG reduction in back pressure.

269. A method according to claim 264, wherein the specific fuel consumption of the engine at full load is reduced by at least 3.5% per 1000 mmWG reduction in back pressure.

270. A method according to claim 264, wherein the specific fuel consumption of the engine at full load is reduced by at least 4% per 1000 mmWG reduction in back pressure.

271. A method according to claim 264, wherein the specific fuel consumption of the engine at full load is reduced by at least 4.25% per 1000 mmWG reduction in back pressure.

272. A method according to claim 264, wherein the specific fuel consumption of the engine at full load is reduced by at least 4.5% per 1000 mmWG reduction in backpressure.

273. A method according to claim 264, wherein the specific fuel consumption of the engine at full load is reduced by at least 5% per 1000 mmWG reduction in back pressure.

274. A method according to claim 264, wherein the specific fuel consumption of the engine at full load is reduced by at least 5.5% per 1000 mmWG reduction in back pressure.

275. A method according to claim 244, wherein the specific fuel consumption of the engine at full load is reduced by at least 1% per 1000 mmWG reduction in back pressure at substantially constant fuel flow rate.

276. A method according to claim 275, wherein the specific fuel consumption of the engine at full load is reduced by at least 1.5% per 1000 mmWG reduction in back pressure at substantially constant fuel flow rate.

277. A method according to claim 275, wherein the specific fuel consumption of the engine at full load is reduced by at least 2% per 1000 mmWG reduction in back pressure at substantially constant fuel flow rate.

278. A method according to claim 275, wherein the specific fuel consumption of the engine at full load is reduced by at least 2.5% per 1000 mmWG reduction in back pressure at substantially constant fuel flow rate.

279. A method according to claim 275, wherein the specific fuel consumption of the engine at full load is reduced by at least 3% per 1000 mmWG reduction in back pressure at substantially constant fuel flow rate.

280. A method according to claim 244, wherein the power output of the engine is improved by at least 5% per 1000 mmWG reduction in back pressure while maintaining the same excess air ratio at maximum load.

281. A method according to claim 244, wherein the power output of the engine is improved by at least 7.5% per 1000 mmWG reduction in back pressure while maintaining the same excess air ratio at maximum load.

282. A method according to claim 244, wherein the power output of the engine is improved by at least 8% per 1000 mmWG reduction in back pressure while maintaining the same excess air ratio at maximum load.

283. A method according to claim 244, wherein the power output of the engine is improved by at least 9% per 1000 mmWG reduction in back pressure while maintaining the same excess air ratio at maximum load.

284. A method according to claim 244, wherein the power output of the engine is improved by at least 10% per 1000 mmWG reduction in back pressure while maintaining the same excess air ratio at maximum load.

285. A method according to claim 244, wherein the power output of the engine is improved by at least 11% per 1000 mmWG reduction in back pressure while maintaining the same excess air ratio at maximum load.

* * * * *